(12) United States Patent
Gonzalez de los Santo et al.

(10) Patent No.: US 12,225,972 B2
(45) Date of Patent: Feb. 18, 2025

(54) DEBONDABLE ADHESIVES AND USES THEREOF

(71) Applicant: NIKE, Inc., Beaverton, OR (US)

(72) Inventors: Eduardo Alberto Gonzalez de los Santo, Beaverton, OR (US); Kethinni Chittibabu, Shrewsbury, MA (US); Debora Marcela Martino, Bedford, MA (US); Sofia Trakhtenberg, Newton, MA (US); John C. Warner, Wilmington, MA (US)

(73) Assignee: NIKE, Inc., Beaverton, OR (US)

( * ) Notice: Subject to any disclaimer, the term of this patent is extended or adjusted under 35 U.S.C. 154(b) by 62 days.

(21) Appl. No.: 18/336,090

(22) Filed: Jun. 16, 2023

(65) Prior Publication Data

US 2023/0320459 A1 Oct. 12, 2023

Related U.S. Application Data

(63) Continuation of application No. 17/070,342, filed on Oct. 14, 2020, now Pat. No. 11,717,053, which is a continuation of application No. 15/898,496, filed on Feb. 17, 2018, now Pat. No. 10,827,799.

(60) Provisional application No. 62/462,843, filed on Feb. 23, 2017.

(51) Int. Cl.
| | |
|---|---|
| *A43B 13/32* | (2006.01) |
| *A43B 9/12* | (2006.01) |
| *A43B 13/12* | (2006.01) |
| *C08K 5/092* | (2006.01) |
| *C09J 5/06* | (2006.01) |
| *C09J 11/06* | (2006.01) |
| *C09J 175/04* | (2006.01) |
| *C08K 5/09* | (2006.01) |

(52) U.S. Cl.
CPC ............ *A43B 13/32* (2013.01); *A43B 9/12* (2013.01); *A43B 13/12* (2013.01); *C08K 5/092* (2013.01); *C09J 5/06* (2013.01); *C09J 11/06* (2013.01); *C09J 175/04* (2013.01); *C08K 5/09* (2013.01); *C09J 2301/416* (2020.08); *C09J 2301/502* (2020.08)

(58) Field of Classification Search
CPC ..... A43B 13/32; A43B 13/12; C09J 2301/416
See application file for complete search history.

(56) References Cited

U.S. PATENT DOCUMENTS

| | | | |
|---|---|---|---|
| 3,806,486 | A | 4/1974 | Endriss et al. |
| 2011/0160353 | A1 | 6/2011 | Hardy et al. |
| 2015/0056879 | A1 | 2/2015 | Malofsky et al. |
| 2016/0289503 | A1 | 10/2016 | Park |
| 2016/0298004 | A1* | 10/2016 | Kim ............... C09J 129/04 |

FOREIGN PATENT DOCUMENTS

| | | | |
|---|---|---|---|
| CN | 104119806 A | * | 10/2014 |
| CN | 106256866 A | | 12/2016 |
| CN | 108329850 A | | 7/2018 |
| GB | 2175489 A | | 12/1986 |
| JP | S5052209 A | | 5/1975 |
| JP | 2002003797 A2 | | 1/2002 |
| KR | 20160087070 A | | 7/2016 |
| WO | 2015107149 A1 | | 7/2015 |

OTHER PUBLICATIONS

International Preliminary Report on Patentability for PCT/US2018/019109 mailed Aug. 8, 2019.
International Preliminary Report on Patentability for PCT/US2018/019109 mailed Jun. 28, 2019.
Written Opinion of the International Preliminary Examining Authority for PCT/US2018/019109 mailed Jan. 24, 2019.
International Search Report and Written Opinion for PCT/US2018/019109 of Jun. 12, 2018.

* cited by examiner

*Primary Examiner* — Gregory Listvoyb
(74) *Attorney, Agent, or Firm* — SHOOK, HARDY & BACON L.L.P.

(57) ABSTRACT

Debondable adhesive compositions are provided. This disclosure also provides articles of footwear and components for articles of footwear including a debondable adhesive matrix. The debondable adhesive matrix can allow for the bonding and debonding of two substrates in the article of footwear or component thereof. This disclosure also provides methods of making the debondable adhesive compositions and methods of using said compositions for bonding and debonding the substrates, e.g. for bonding and debonding of an upper and an outsole in an article of footwear.

19 Claims, 38 Drawing Sheets

DEBONDABLE ADHESIVES AND USES THEREOF

CROSS-REFERENCE TO RELATED APPLICATIONS

This application claims priority to, and the benefit of, U.S. nonprovisional application entitled "DEBONDABLE ADHESIVES AND USES THEREOF" having Ser. No. 17/070,342 filed Oct. 14, 2020, which claims priority to, and the benefit of, U.S. nonprovisional application entitled "DEBONDABLE ADHESIVES AND USES THEREOF" having Ser. No. 15/898,496 filed Feb. 17, 2018, now issued as U.S. Pat. No. 10,827,799, which claims priority to, and the benefit of, U.S. provisional application entitled "DEBONDABLE ADHESIVES AND USES THEREOF" having Ser. No. 62/462,843 filed Feb. 23, 2017, the contents of which are incorporated by reference in their entirety.

TECHNICAL FIELD

The present disclosure generally relates to adhesives, and in particular to adhesives for use in the footwear industry.

BACKGROUND

More than 19 billion pairs of footwear are consumed worldwide each year, a rate of about 2.5 pairs/capita/annum. US consumers bought 7.5 pairs of shoes per capita per year in 2013, according to a report by the American Apparel & Footwear Association (AAFA). The number of footwear sold is expected to cross 30 billion pairs in the next decade. This creates an enormous amount of post-consumer (end-of-life) shoe waste that is currently being disposed in landfill sites around the world.

The footwear industry has put a significant effort in the past two decades in improving material efficiency during the production phase, and reducing/eliminating the use of hazardous materials in shoe production. Unfortunately, the environmental gains made with production improvement is offset by the considerable increase in the demand for footwear products. The useful life of shoes is getting relatively short and continuously decreasing due to rapid changes in market and consumer fashion trends. This has generated a large waste stream at the end of the functional life of shoes, which are often being disposed in landfills.

Recycled shoe components are mainly used in low end, low value products. The recent changes in fashion and high per capita consumption of footwear suggest most shoes are sparingly used and hardly exposed to very long term outdoor conditions. Mechanical properties of individual polymeric materials are likely maintained with minimal degradation and if individual components are separated they can be blended with virgin polymeric materials offering sustainable and high value proposition.

BRIEF DESCRIPTION OF THE DRAWINGS

Further aspects of the present disclosure will be readily appreciated upon review of the detailed description of its various aspects, described below, when taken in conjunction with the accompanying drawings.

FIG. 5A is an exemplary stress-strain curve of an epoxy bonded thermoplastic polyurethane (TPU) foam aged for 24 hours. FIG. 5B is an exemplary stress-strain curve of a "GORILLA GLUE" bonded thermoplastic polyurethane (TPU) foam aged for 24 hours.

DESCRIPTION

There remains a need for improved materials and methods in the footwear industry that facilitate the recycling of shoe components.

Adhesives and formulations for forming adhesives are provided. Articles of footwear and components thereof are also provided including one or more of the adhesives. Methods of using the adhesives and formulations for forming adhesives are also provided, for example to bond two components of an article of footwear. The adhesive and formulations can be used to bond footwear components in a manner that facilitates ease of debonding the components, which in turn can facilitate recycling of the shoe components.

In various aspects, the adhesive can be used to bond surfaces in a shoe that is formed of multiple components. In some aspects, the adhesives bond two sole components such as an outsole and a midsole. In some aspects, the adhesives bond a sole or sole component to an upper (or to a component of the upper). In some aspects, the upper component is a vamp or a quarter.

Figure 1:
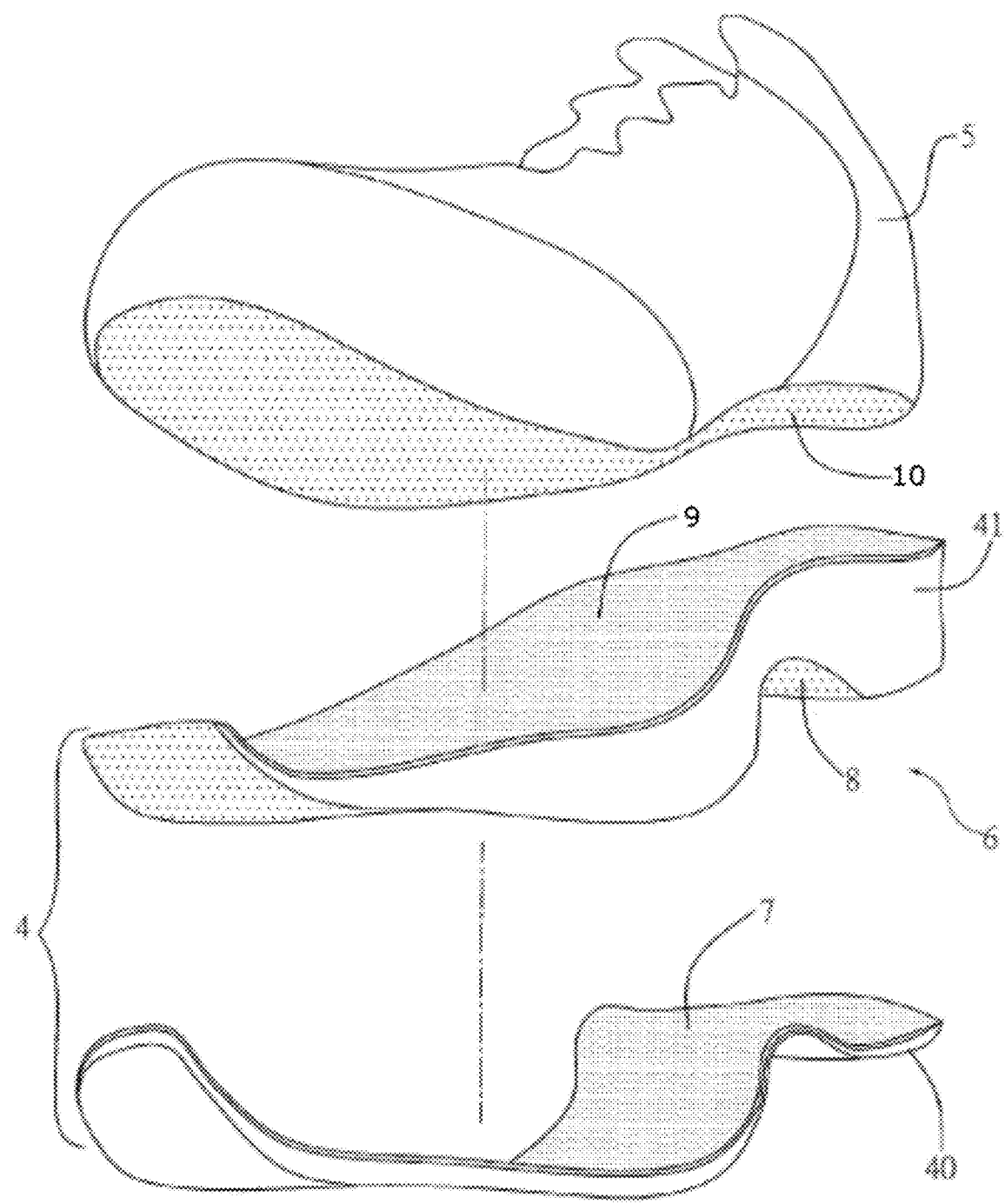
FIG. 1 is a perspective view showing the exploded components of an exemplary shoe showing both the sole components and the upper.

FIG. 1 depicts an exemplary shoe 6 having a sole structure 4 composed of an outsole 40 and midsole 41. The sole structure 4 can be bonded with the upper 5 in order to form the shoe 6. An exemplary adhesive described herein can be used to bond an upper surface 7 of the outsole 40 to a lower surface 8 of the midsole 41. This will allow for easier debonding of the outsole 40 and midsole 41. An exemplary adhesive described herein can be used to bond an upper surface 9 of the midsole 41 to a lower surface 10 of the upper 5. This ow for easier debonding of the sole structure 4 from the upper 5.

Figure 2:
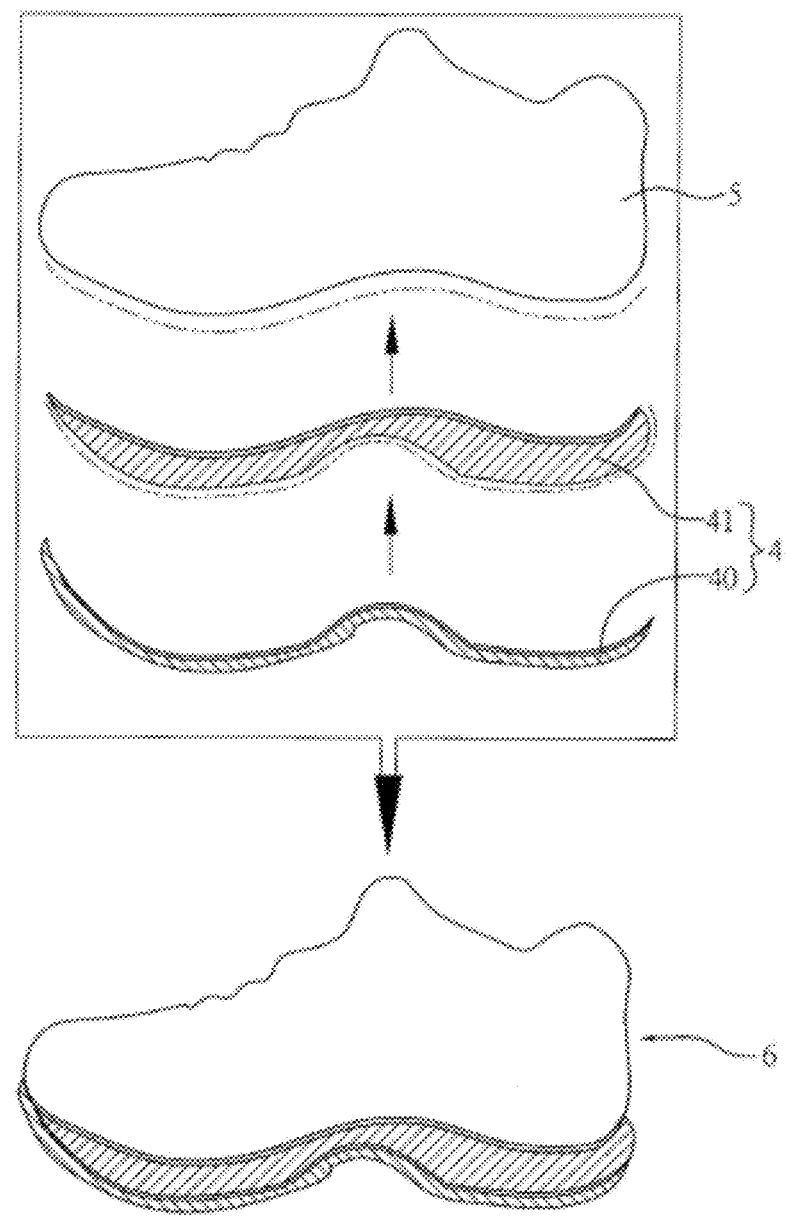
FIG. 2 is a cross sectional view showing an exemplary shoe being finished by using an adhesive provided herein to glue one or more surfaces.

FIG. 2 is a cross sectional view showing an exemplary shoe being finished by using the method of bonding using an adhesive provided herein. The shoe 6 is formed of the shoe sole 4 and the upper 5, and the shoe sole 4 includes the shoe outsole 40 and the shoe midsole 41. Each of these components can be bonded using a debondable adhesive described herein. The use of debondable adhesives described herein allows for easy debonding, for example for separate recycling of the materials of the upper 5, the shoe outsole 40, and/or the shoe midsole 41.

In one or more aspects, adhesives are provided including a polymeric adhesive matrix, and a carboxylic acid or a salt thereof dispersed within the polymeric adhesive matrix. It has been found that the addition of a dispersed carboxylic acid or salt thereof to a polymeric adhesive matrix can significantly increase the ease with which the bonded components can be debonded once the adhesive has cured, without significantly degrading the bond strength of the adhesive. In one or more aspects, the carboxylic acid or a salt thereof is present in an amount from about 1% to about 15% by weight based upon a total weight of the adhesive. In one or more aspects, the carboxylic acid or salt thereof is present in an amount from about 2.5% to about 5% by weight based upon the total weight of the adhesive.

In one or more aspects, adhesives are provided including a carboxylic acid or salt thereof. The carboxylic acid can be a sugar acid. In various aspects, the carboxylic acid can be tartronic acid, tartaric acid, ribaric acid, or glucaric acid. The carboxylic acid can be glucaric acid, for example wherein the glucaric acid or salt thereof is present in an amount from about 4.5% to about 8% by weight based upon the total weight of the adhesive. The carboxylic acid can be tartaric acid, for example wherein the tartaric acid or salt thereof is present in an amount from about 3.5% to about 5.5.% by weight based upon the total weight of the adhesive.

In various aspects, the carboxylic acid or salt thereof thermally decomposes into substantially water and carbon dioxide. In some aspects, the carboxylic acid or salt thereof decomposes into substantially water and carbon dioxide when exposed to microwave radiation at a frequency of 2.4 GHz and power level of at least 900 W for a period of time of 1 minute or more. In some aspects, the adhesive is a hotmelt adhesive, and the melting point of the hotmelt adhesive is at least 10° C. below the melting point of the carboxylic acid.

The polymeric adhesive matrix can include a variety of polymers commonly used in adhesive. For example, the polymeric adhesive matrix can include at least one polymer selected from a polyurethane, a polychloroprene, a latex, a polystyrene, a polyamide, a polyolefin, a polyacrylate, or any combination thereof.

The adhesive including the carboxylic acid or salt thereof can maintain bonding strength during use. For example, the adhesive can have a bond strength that is at least 80% of a reference bond strength for the otherwise same adhesive except without the carboxylic acid or a salt thereof when the adhesive and the adhesive without the carboxylic acid or salt are used to bond the same materials and are measured under the same conditions. In some aspects, the bond strength is about 9 N/cm$^2$ to about 35 N/cm$^2$ or about 20 N/cm$^2$ to about 35 N/cm$^2$.

In various aspects, debonding of the adhesive can be trigged by the application of heat and/or microwave radiation. In some aspects, after the adhesive has been exposed to microwave radiation having a frequency of about 2.4 GHz and a power level of at least 900 W for a period of time of at least 60 seconds, the adhesive has a bond strength that is at least 60% less than a reference bond strength for the otherwise same adhesive except without the carboxylic acid or salt thereof, when exposed to about the same frequency of microwave radiation for about the same period of time, and when used to bond the same materials and measured under the same conditions. The bond strength can be less than 30% of the reference bond strength. In one or more aspects, increasing a temperature of the adhesive to a temperature at or above a decomposition temperature of the carboxylic acid or salt thereof causes the adhesive to foam. In one or more aspects, after the adhesive has been exposed to microwave radiation having a frequency of about 2.4 GHz and a power level of at least 900 W for a period of time of at least 60 seconds, the adhesive has a bond strength of about 10 N/cm$^2$ or less. After the adhesive has been exposed to microwave radiation having a frequency of about 2.4 GHz and a power level of at least 900 W for a period of time of at least 60 seconds, in some aspects the adhesive has a bond strength of about 1 N/cm$^2$ or less.

Bond strength of the adhesive can be measured in a variety of ways. In some aspects, the bond strength is measured by bonding a first material to a second material, and measuring the bond strength using a single lap shear test with a bonding area of at least 1 in$^2$. In some aspects, the bond strength is measured by bonding a first material to a second material, and measuring the bond strength using a T-peel test with a bonding area of at least 1 in$^2$. In various aspects, the first material, the second material, or both materials can be selected from a thermoplastic polyurethane, a thermoplastic polyurethane knit fiber, a thermoplastic polyurethane foam, or an ethylene-vinyl acetate foam.

Articles of footwear and portions thereof are also provided including components bonded by adhesives described herein. In one or more aspects, an article of footwear or portion thereof is provided having a first component, a second component, and an adhesive according described herein adhesively bonding the first component to the second component. While the components can be any components, and in particular any components commonly found in an article of footwear, in some aspects the first component, the second component, or both include an upper, an insole, an outsole, a midsole, a strobel, a vamp, a tip, a foxing, a tongue, an eyestay, or any combination thereof. For example, the adhesives can adhesively bond an upper and an outsole, an insole and a last, an upper and an insole, a midsole and an outsole, or any other combination of components commonly found in the footwear industry.

The components can be made from various materials, especially those commonly found in the footwear industry. In various aspects, the first component, the second component, or both include a material selected from the group consisting of a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a textile, a fabric, and a combination thereof.

Methods of using the compositions and adhesives are provided to adhesively bond two components. The methods can include applying a composition to one or both of a first surface on a first component and a second surface on a second component and contacting the first surface and the second surface to adhesively bond the first and second components. The components can be made from a variety of materials, especially those materials commonly found in the footwear industry. In various aspects, the first component, the second component, or both include a material selected from a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a textile, a fabric, or any combination thereof. The components can also have a variety of shapes and forms, in particular those components commonly found in the footwear industry. In various aspects, the components include an upper, an insole, an outsole, a midsole, a strobel, a vamp, a tip, a foxing, a tongue, an eyestay, or any combination thereof.

Methods are also provided for debonding two components that are adhesively bonded by an adhesive described herein. In various aspects, the carboxylic acid dispersed within the polymeric adhesive matrix can decompose when exposed to sufficient heat and/or microwave radiation, and in particular to a sufficient amount of heat and/or microwave radiation to trigger debonding without significantly damaging the components themselves. In various aspects, the methods include increasing a temperature of the adhesive for a period of time sufficient to reduce a bond strength of the adhesive by at least 50% as compared to a bond strength of the adhesive prior to increasing its temperature. In various aspects, increasing the temperature of the adhesive includes treating the adhesive with microwave radiation for a period of time to reduce an adhesive strength of the adhesive. The increasing the temperature of the adhesive can cause foaming of the adhesive.

In various aspects, methods are also provided including treating the adhesive with microwave radiation for a period of time to reduce an adhesive strength of the adhesive. The microwave radiation can have a frequency of about 2 GHz to about 3 GHz and/or a power level of about 500 W to about 1500 W. In some aspects, the period of time is effective to reduce the adhesive strength by at least 70% as compared to the adhesive strength prior to treating the adhesive with the microwave radiation, e.g. the period of time can be effective to reduce the adhesive strength to about 10 N/cm$^2$ or less. The amount of time can of course vary based upon a variety of factors, but in some aspects the period of time is about 30 second to about 120 seconds. The frequency, power and duration of the microwave radiation can be sufficient to produce foaming of the adhesive, thereby triggering debonding.

Other systems, methods, features, and advantages of adhesives, compositions for forming adhesives, and methods of bonding and debonding will be or become apparent to one with skill in the art upon examination of the following drawings and detailed description. It is intended that all such additional systems, methods, features, and advantages be included within this description, be within the scope of the present disclosure, and be protected by the accompanying claims.

Before the present disclosure is described in greater detail, it is to be understood that this disclosure is not limited to particular aspects described, and as such may, of course, vary. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Aspects of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some aspects, the term "about" can include traditional rounding according to significant figures of the numerical value. In addition, the phrase "about 'x' to 'y'", where 'x' and 'y' are numerical values, includes "about 'x' to about 'y'".

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any aspects of the present disclosure. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

In one or more aspects, adhesives are provided including a polymeric adhesive matrix, and a carboxylic acid or a salt thereof dispersed within the polymeric adhesive matrix. The carboxylic acid can be present at a variety of amounts, in particular at amounts that facilitate ease of debonding while not significantly compromising the bond strength of the adhesive during normal use. In one or more aspects, the carboxylic acid or a salt thereof is present in an amount from about 1% to 15%, about 2.5% to 15%, about 2.5% to 10%, about 2.5% to 7.5%, about 2.5% to 5%, about 5% to 7.5%, or about 3% to 7.5% by weight based upon a total weight of the adhesive.

Compositions for forming the adhesives are also provided. In various aspects, the compositions include at least one polymer, a resin, a carboxylic acid or a salt thereof, and a suitable solvent. The carboxylic acid or salt thereof can be present in an amount from about 1% to 15%, about 2.5% to 15%, about 2.5% to 10%, about 2.5% to 7.5%, about 2.5% to 5%, about 5% to 7.5%, or about 3% to 7.5% by weight based upon a dry weight of the composition.

In one or more aspects, adhesives and composition are provided including a carboxylic acid or salt thereof. The carboxylic acid can be a sugar acid. In various aspects, the carboxylic acid can be tartronic acid, tartaric acid, ribaric acid, or glucaric acid. The carboxylic acid can be glucaric acid, for example wherein the glucaric acid or salt thereof is present in an amount from about 3% to 10%, about 4.5% to 10%, or about 4.5% to about 8% by weight based upon the total weight of the adhesive. The carboxylic acid can be tartaric acid, for example wherein the tartaric acid or salt thereof is present in an amount from about 2.5% to 7.5%, about 3.5% to 7.5%, or about 3.5% to about 5.5.% by weight based upon the total weight of the adhesive.

A variety of factors can contribute to the effectiveness of the carboxylic acid to facilitate debonding of the adhesive. In some aspects, the acid is a sugar acid. The acid can be a polyprotic acid, e.g. a diprotic acid or a triprotic acid. The acid can also include a large hydroxyl content such as that found in the sugar acids described herein. Although the carboxylic acid can be any size suitable for incorporation into the adhesives, in particular aspects the carboxylic acid will have about 3 to 15, about 3 to 12, about 3 to 9, or about 5 to 9 carbon atoms.

In some aspects, the carboxylic acid has a structure according to the following formula or a derivative thereof

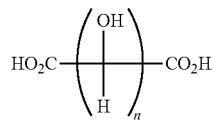

where n is an integer from 2 to 12, 2 to 10, or 2 to 8, e.g. about 2, 3, 4, 5, 6, 7, or 8.

In various aspects, the carboxylic acid or salt thereof thermally decomposes into substantially water and carbon dioxide. In some aspects, the carboxylic acid or salt thereof decomposes into substantially water and carbon dioxide when exposed to microwave radiation at a frequency of 2.4 GHz and power level of at least 900 W for a period of time of 20 second, 30 second, 45 seconds, 60 seconds, 90 seconds, or more.

The adhesives and compositions can include environmentally benign materials. For example, the carboxylic acid can be substantially free of heavy metals and/or halogen atoms. By being free of halogens and heavy metals and decomposing into substantially water and carbon dioxide, the additives minimize environmental impact of the compositions and methods described herein. The adhesives and compositions can also include environmentally benign solvents. For example, in some aspects the solvent is or includes a substantial portion of water, acetone, ethanol, 2-propanol, ethyl acetate, isopropyl acetate, methanol, methyl ethyl ketone, 1-butanol, t-butanol, or any mixture thereof. In some aspects, the solvent is water or is essentially water. In some aspects, the solvent is at least 15%, at least 20%, at least 25%, or at least 30% w/v of water. The solvent can be present in any suitable amount to render the desired viscosity of the composition without substantially impacting the performance of the adhesive. In some aspects, the solvent is present in an amount from about 50% to 750% or about 50% to 500% by weight based upon a dry weight of the composition.

The compositions and the polymeric adhesive matrix can include a variety of polymers commonly used in adhesive. For example, the polymeric adhesive matrix can include at least one polymer selected from a polyurethane, a polychloroprene, a latex, a polystyrene, a polyamide, a polyolefin, a polyacrylate, a polyester, a polyether, a copolymer thereof, and any combination thereof. In some aspects, the polystyrene is or includes a polystyrene block copolymer. Suitable polystyrenes can include poly(styrene-isoprene-styrene), poly(styrene-butadiene-styrene), poly(styrene-ethylene-butene-styrene), and a poly(styrene-ethylene-propene). In some aspects, the adhesive is a hotmelt adhesive, and the melting point of the hotmelt adhesive is at least 10° C. below the melting point of the carboxylic acid.

In some aspects, the polymeric adhesive matrix includes at least one thermoplastic polymer selected from a thermoplastic polyurethane, a thermoplastic polyamide, a thermoplastic polyolefin, a thermoplastic polyester, a thermoplastic polyether, a thermoplastic copolymer thereof, and any combination thereof. In some aspects, the polymeric adhesive matrix includes a polyolefin such as a polyethylene, a polypropylene, a copolymer thereof, or any combination thereof. The polyolefin can be an ethylene copolymer. In some aspects, the polymeric adhesive matrix includes a thermoplastic polyolefin. The thermoplastic polyolefin, in some aspects, includes a thermoplastic polyethylene, a thermoplastic polypropylene, a thermoplastic copolymer thereof, or any combination thereof. The thermoplastic polyolefin can include a thermoplastic ethylene copolymer. In some aspects, the thermoplastic ethylene copolymer is ethylene vinyl acetate (EVA).

In some aspects, the polymeric adhesive matrix includes at least one thermoplastic polymer is a polymer or copolymer including a plurality of functional groups in its chemical structure, wherein the plurality of functional groups are selected from hydroxyl groups, carboxyl groups, amine groups, amide groups, urethane groups, and combinations thereof. In some aspects, the at least one thermoplastic polymer has a melting point from about 80 degrees C. to about 180 degrees C. In some aspects, the polymeric adhesive matrix is an elastomeric polymer adhesive matrix. The adhesive can have an elongation of at least 180%, at least 200%, or at least 220%.

The compositions can include a variety of resins commonly found in adhesives. In various aspects, the resin is a colophony resin, a hydrocarbon resin, an alkyl phenolic resin, a terpene phenolic resin, a coumarone-indene resin, or any combination thereof. The resin can be present in an amount from about 0.1% to 20%, 0.1% to 10%, 1.5% to 10%, or 1.5% to 7.5% by weight based on a dry weight of the composition.

Bond strength of the adhesive can be measured in a variety of ways. In some aspects, the bond strength is measured by bonding a first material to a second material, and measuring the bond strength using a single lap shear test with a bonding area of at least 1 in$^2$. In some aspects, the bond strength is measured by bonding a first material to a second material, and measuring the bond strength using a T-peel test with a bonding area of at least 1 in$^2$. In various aspects, the first material, the second material, or both materials can be selected from a thermoplastic polyurethane, a thermoplastic polyurethane knit fiber, a thermoplastic polyurethane foam, or an ethylene-vinyl acetate foam.

The adhesive including the carboxylic acid or salt thereof can maintain bonding strength during use. For example, the adhesive can have a bond strength that is at least 50%, at least 60%, at least 70%, at least 80%, at least 85%, at least 90%, or at least 95% of a reference bond strength for the otherwise same adhesive except without the carboxylic acid or a salt thereof when the adhesive and the adhesive without the carboxylic acid or salt are used to bond the same materials and are measured under the same conditions. In some aspects, the bond strength is about 5 N/cm$^2$ to 45 N/cm$^2$, about 9 N/cm$^2$ to 35 N/cm$^2$, or about 20 N/cm$^2$ to 35 N/cm$^2$.

In various aspects, debonding of the adhesive can be trigged by the application of heat and/or microwave radiation. In some aspects, after the adhesive has been exposed to microwave radiation having a frequency of about 2.4 GHz and a power level of at least 900 W for a period of time of at least 60 seconds, the adhesive has a bond strength that is at least 60% less than a reference bond strength for the otherwise same adhesive except without the carboxylic acid or salt thereof, when exposed to about the same frequency of microwave radiation for about the same period of time, and when used to bond the same materials and measured under the same conditions. The bond strength can be less than 30% of the reference bond strength. In one or more aspects, increasing a temperature of the adhesive to a temperature at or above a decomposition temperature of the carboxylic acid or salt thereof causes the adhesive to foam. In one or more aspects, after the adhesive has been exposed to microwave radiation having a frequency of about 2.4 GHz and a power level of at least 900 W for a period of time of at least 60 seconds, the adhesive has a bond strength of about 10 N/cm$^2$ or less. After the adhesive has been exposed to microwave radiation having a frequency of about 2.4 GHz and a power level of at least 900 W for a period of time of at least 60 seconds, in some aspects the adhesive has a bond strength of about 1 N/cm$^2$ or less.

Articles of footwear and portions thereof are also provided including components bonded by adhesives described herein. The articles of footwear can be a shoe, a boot, a sandal, or a combination thereof. Suitable shoes can include, but are certainly not limited to, an athletic shoe, a tennis shoe, a cross-trainer shoe, a children's shoe, a dress shoe, and a casual shoe. In some aspects, the shoe is a cleated shoe.

In one or more aspects, an article of footwear or portion thereof is provided having a first component, a second component, and an adhesive according described herein adhesively bonding the first component to the second component. While the components can be any components, and in particular any components commonly found in an article of footwear, in some aspects the first component, the second component, or both include an upper, an insole, an outsole, a midsole, a strobel, a vamp, a tip, a foxing, a tongue, an eyestay, or any combination thereof. For example, the adhesives can adhesively bond an upper and an outsole, an insole and a last, an upper and an insole, a midsole and an outsole, or any other combination of components commonly found in the footwear industry.

The components can be made from various materials, especially those commonly found in the footwear industry. In various aspects, the first component, the second component, or both include a material selected from the group consisting of a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a textile, a fabric, and a combination thereof.

Methods of using the compositions and adhesives are provided to adhesively bond two components. The methods can include applying a composition to one or both of a first surface on a first component and a second surface on a second component and contacting the first surface and the second surface to adhesively bond the first and second components. The components can be made from a variety of materials, especially those materials commonly found in the footwear industry. In various aspects, the first component, the second component, or both include a material selected from a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a textile, a fabric, or any combination thereof. The components can also have a variety of shapes and forms, in particular those components commonly found in the footwear industry. In various aspects, the components include an upper, an insole, an outsole, a midsole, a strobel, a vamp, a tip, a foxing, a tongue, an eyestay, or any combination thereof.

The methods can include various surface treatments commonly applied with adhesives. In various aspects, the methods include treating one or both of the first surface and the second surface prior to applying the composition. The treating step can include a surface treatment such as a physical treatment, a chemical treatment, a primer treatment, a solvent treatment, or any combination thereof. Physical treatments can include treating a surface with an abrasive to increase a surface roughness. Chemical treatments can include etching a surface with acid. Primer treatments can include treating a surface with a primer solution. Solvent treatments can include contacting a surface with a solvent to remove contaminants from the surface.

The methods can include applying pressure to ensure a proper level of bonding between the components. For example, the methods can include applying pressure to the first component and the second component for a period of time to adhesively bond the first component and the second component. In some aspects, the pressure can be about 300 psi to about 800 psi and the period of time can be about 10 minutes to about 30 minutes. The methods can further include applying one or both of heat and ultraviolet radiation to adhesively bond the first component and the second component. The compositions can, in some aspects, be applied using an automated or machine assisted process, e.g. using an automatic sprayer.

Methods are also provided for debonding two components that are adhesively bonded by an adhesive described herein. In various aspects, the carboxylic acid dispersed within the polymeric adhesive matrix can decompose when exposed to sufficient heat and/or microwave radiation, and in particular to a sufficient amount of heat and/or microwave radiation to trigger debonding without significantly damaging the components themselves. In various aspects, the methods include increasing a temperature of the adhesive for a period of time sufficient to reduce a bond strength of the adhesive by at least 50% as compared to a bond strength of the adhesive prior to increasing its temperature. In various aspects, increasing the temperature of the adhesive includes treating the adhesive with microwave radiation for a period of time to reduce an adhesive strength of the adhesive. The increasing the temperature of the adhesive can cause foaming of the adhesive.

In various aspects, methods are also provided including treating the adhesive with microwave radiation for a period of time to reduce an adhesive strength of the adhesive. The microwave radiation can have a frequency of about 2 GHz to about 3 GHz and/or a power level of about 500 W to about 1500 W. In some aspects, the period of time is effective to reduce the adhesive strength by at least 50%, at least 60%, at least 70%, at least 80%, at least 90%, or at least 95% as compared to the adhesive strength prior to treating the adhesive with the microwave radiation, e.g. the period of time can be effective to reduce the adhesive strength to about 10 N/cm$^2$ or less. The amount of time can of course vary based upon a variety of factors, but in some aspects the period of time is about 30 second to about 120 seconds. The frequency, power and duration of the microwave radiation can be sufficient to produce foaming of the adhesive, thereby triggering debonding. In some aspects, the frequency, power, and duration are effective to completely debond the components without any physical debonding.

It will be recognized that the exact frequency, power level, and duration of time may vary based upon a number of factors. In various aspects, the frequency is about 2 GHz to 3 GHz, about 2.2 GHz to 2.8 GHz, about 2.3 GHz to 2.6 GHz, about 2.4 GHz, about 2.45 GHz, or about 2.5 GHz. While the power level can be varied based upon the materials and the desired period of time, in various aspects the power level is about 300 W to 1500 W, about 500 W to 1500 W, about 700 W to 1200 W, or about 900 W.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of aspects of the present disclosure.

Example 1. Triggering Adhesive Debonding

Figure 3:
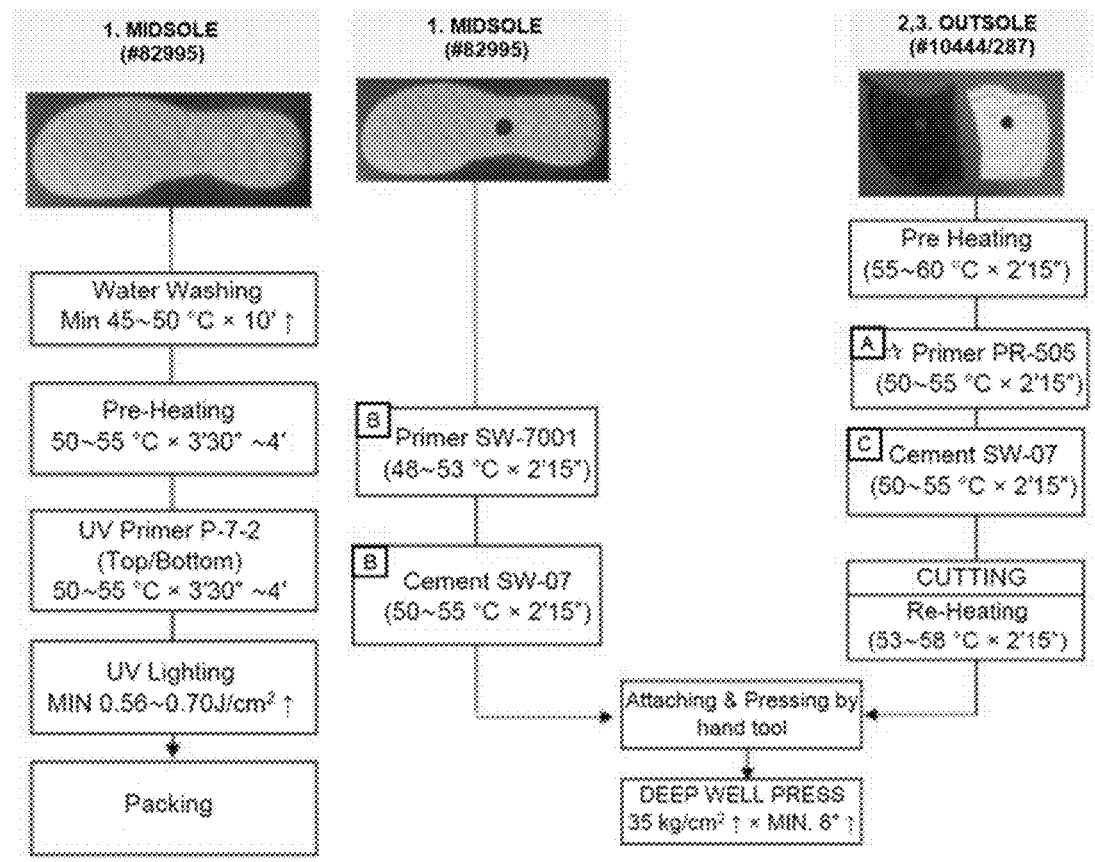
FIG. 3 is a flow chart depicting exemplary procedures for the cleaning and the application of primer and adhesives for a midsole and outsole of an article of footwear.

Many adhesives and polymer substrates used in footwear industry were explored irrespective of bond strength. Many adhesives, additives for modifying adhesives and polymer substrates were explored. The polyurethane based adhesive "GORILLA GLUE" brand adhesive (Gorilla Glue Company, Cincinnati, OH, USA), which is strongest tested glue, was used to demonstrate the capability of the technology.
Substrates Used
    Thermoplastic Polyurethane (TPU)—3 mm thick Elastollan 1185A10 000 from BASF
    TPU fabric
    Thermoplastic Polyurethane foam (TPU foam)—1.5 mm thick Elastollan 1185A15V with a density of 0.56 $g/cm_3$ from BASF
    EVA foam materials
    EVA foam materials from Soletech purchased through Amazon (in two colors—black and brown)
Adhesives Used
    Epoxy (Shoe Goo)
    Polyurethane ("GORILLA GLUE")—~95% solid content, forms very strong bond even without any primer
    Adhesives (UV primer, primer and cement) from "HENKEL"-45 to 50% solid content
Additives Used
    Many additives with strong microwave absorption characteristics as well as materials that degrade forming huge quantities of gaseous products during dielectric heating were explored. Most materials had strong color that is not attractive for footwear products.
Additives Explored
    Iron metal fillings
    Graphite powder
    Iron stearate
    Aluminum powder and perforated film
    Glucaric Acid (K salt)
    Tartaric Acid
    Combinations of two or more Establishing Bonding and Bond Testing Protocols Washing/cleaning of the substrates, applying UV primer, primer and cements on the desired substrates were performed using standard procedures. No primer or UV primer was applied for bonding made with "GORILLA GLUE". The flow chart for "HENKEL" adhesives is shown FIG. 3

Bonding Process:

After applying primers and cement on the desired substrates, the uppers (foams, fabric or solid) and bottoms (solid or foam materials) were attached using clips followed by pressing in carver at 500 PSI for desired time (typically 15 minutes) as shown below. After pressing, all bonded laminates were stored for 24 h.

Testing for Bond Strength

Figure 4:
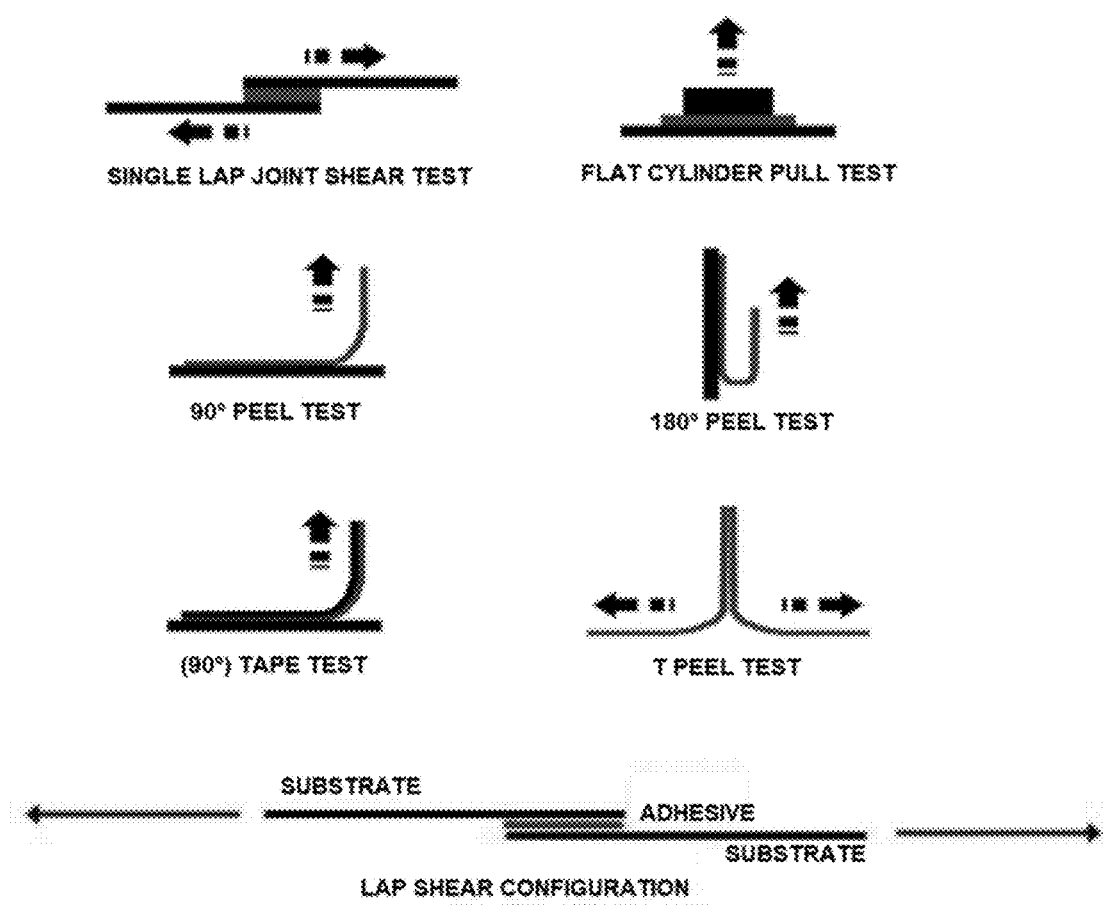
FIG. 4 is a schematic depicting various exemplary methods of measuring bond strength of laminates made between substrates using an adhesive.

A "SHIMADZU" brand AG-IC 50 kN tensile tester (Shimadzu Corp., Kyoto, JP) was used for characterizing bond strength of laminates made with many substrates and adhesive combinations. "SHIMADZU" brand tensile testing equipment capabilities are comparable with "INSTRON" brand machines (Instron Engineering Corporation, Canton, MA, USA) which can also be used for measuring bond strengths. Many techniques are shown FIG. 4. Unless described otherwise, the bond strengths herein are measured using one or both of a single lap shear test and T-peel test for characterizing bond strength.

Figure 5A:
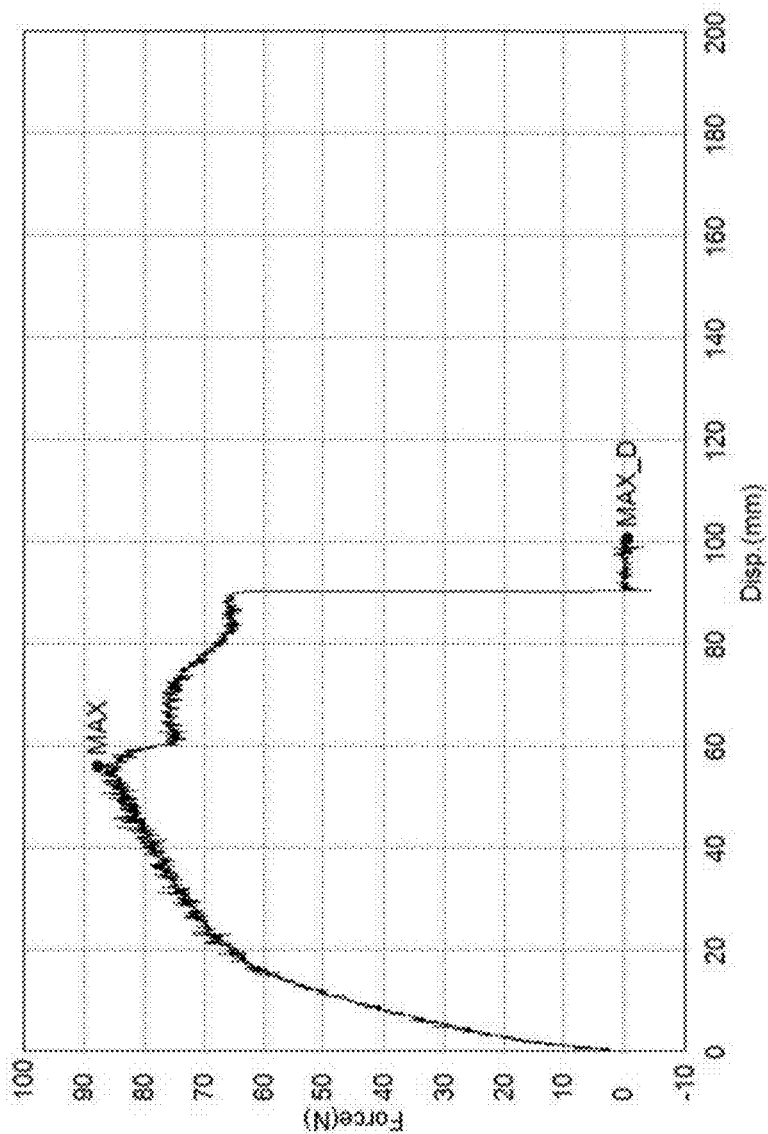
FIGS. 5A-5B are graphs of stress-strain curves for exemplary testing of adhesive bonded laminates.
Figure 5B:
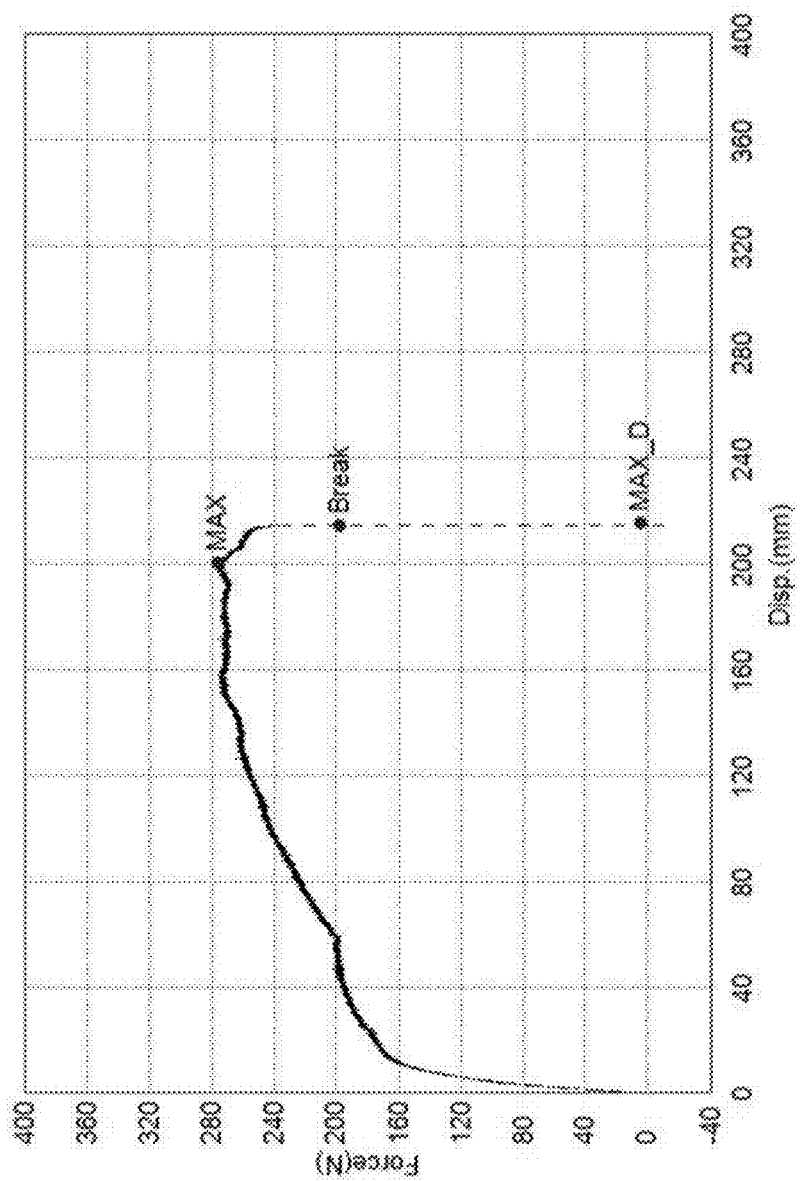
Figure 6A:
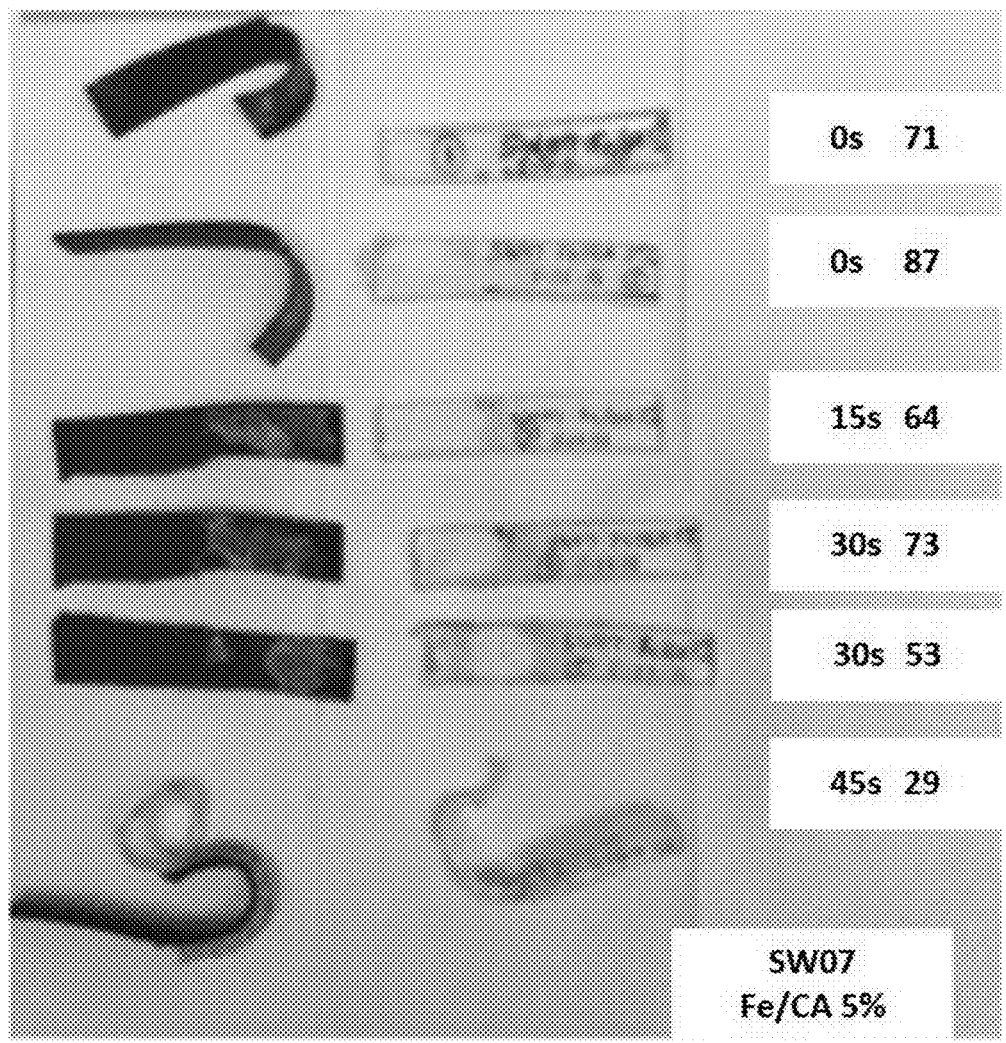
FIGS. 6A-6D depict the results of debonding of adhesively bound TPU foam (black) and solid TPU sheet (transparent) using "HENKEL" Adhesive with 5% iron and 5% glucaric acid additives (FIGS. 6A-6B) and using "HENKEL" Adhesive with 2.5% graphite and 2.5% glucaric acid (FIGS. 6C-6D) after various amounts of exposure to direct microwave radiation (900 W, 2.4 GHz, regular kitchen type). The photographs (FIG. 6A and FIG. 6C) demonstrate the components after debonding, and the graphs (FIG. 6B and FIG. 6D) demonstrate the peel strength (lap shear mode) measured as a function of microwave exposure time (seconds).
Figure 6B:
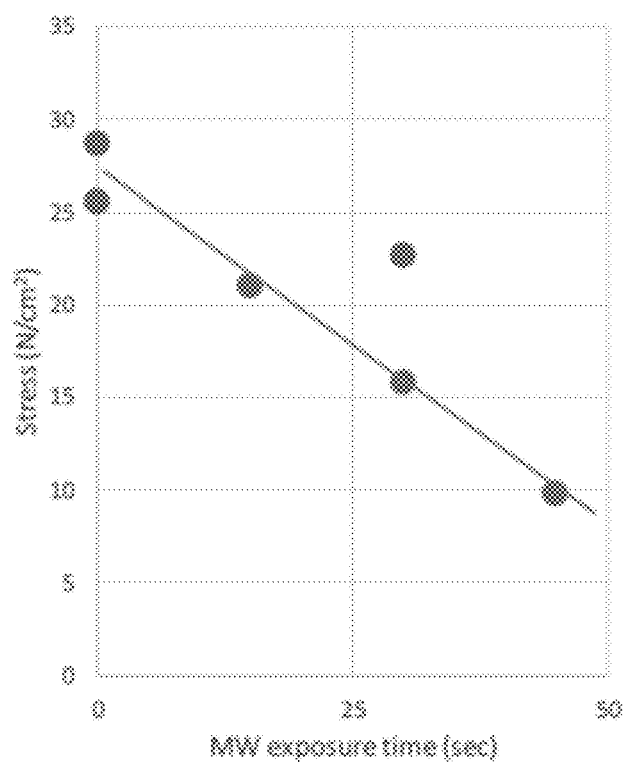
Figure 6C:
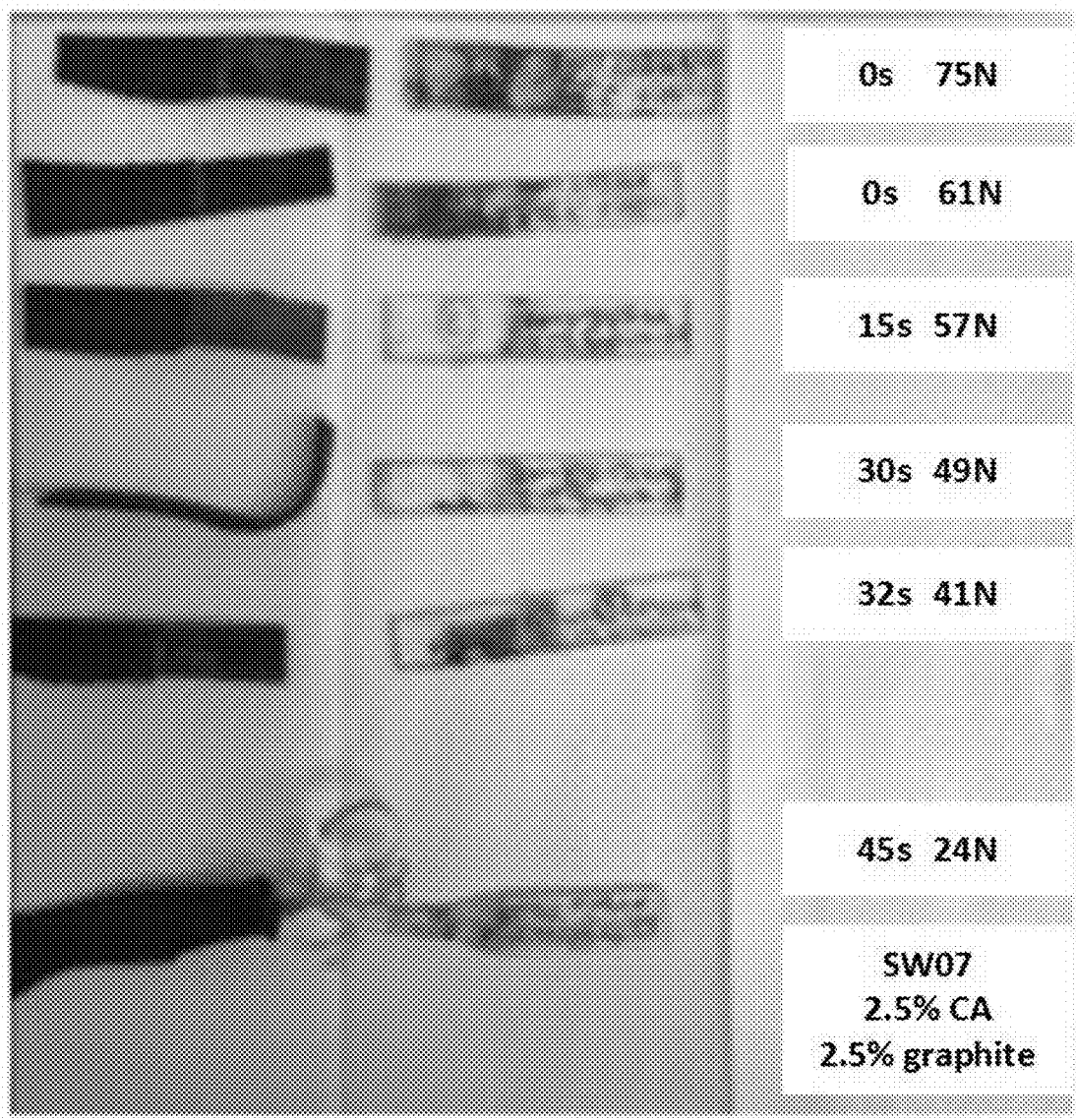
Figure 6D:
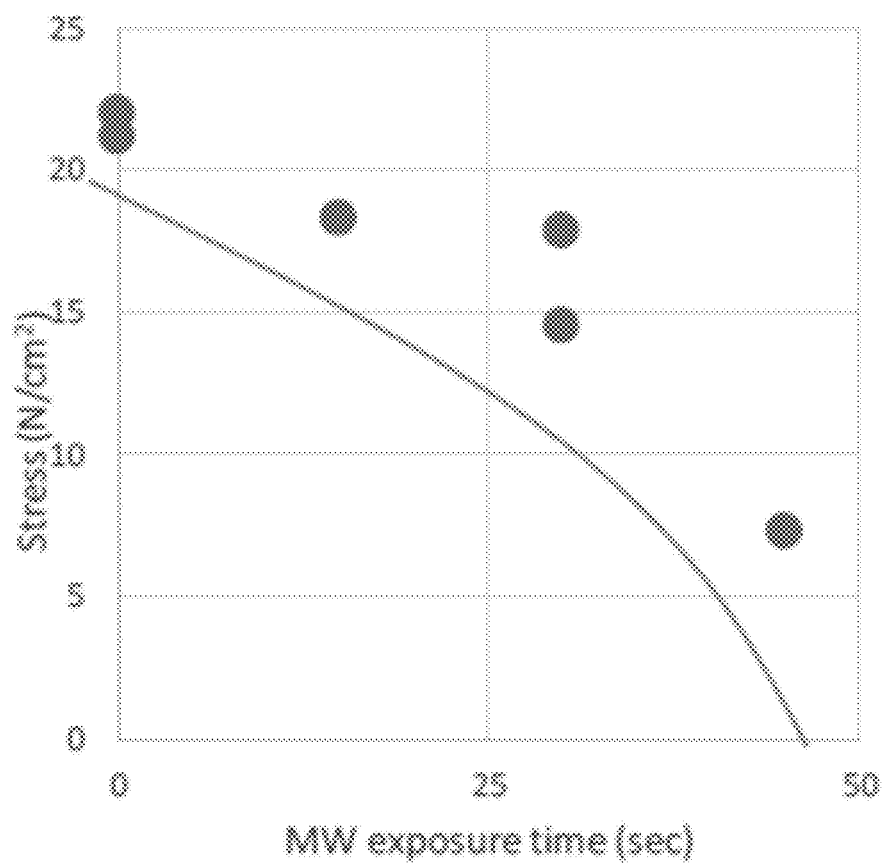

After 24 h ageing, the laminates with 1"×1" (or higher) bonded area were mounted on Shimatzu and tested for bond strength. FIGS. 5A-5B show stress-strain curves of typical laminates tested. The nature of the cement determines the bond strength and substrates determines the extent of stretching. Huge stretching (typically 100 to 300%) was observed of all substrates during bond strength measurements. Typical failure occurs due to the debonding of adhesives and sometime breakage of substrates (where bond strength is larger than tensile strength of one of the material).

Debonding Experiments

Disruption of Bonds (without Modification of Adhesives) Using Various External Triggers In the first approach, attempts at disrupting bonds were made with "GORILLA GLUE" (using various substrates) employing techniques such as soaking in boiling water for 30-130 minutes, sonication, microwave heating and microwave heating in the presence of water. Substrates used include solid TPU received from "BASF" (BASF SE, Ludwigshafen, DE) and TPU foam in various combinations. The bonding was not disrupted during 2.5 hours of sonication, 80 minutes of soaking in boiling water and 30 minutes of microwave heating in the presence of water. Direct exposure of the laminates to microwave radiation caused softening and melting of the upper and bottom materials due to dielectric heating (TPU have lot of dipoles too).

Disruption of Bonds Formed Using Additive Modified Adhesives Employing Various External Triggers In the second approach, the "GORILLA GLUE" was modified using various additives described in earlier section and exposed to similar triggers described above for the adhesives without modification. Triggers such as sonication, boiling in water were not observed to cause disruption of the bonds created using modified "GORILLA GLUE". However, when exposed to microwave heating, noticeable changes were observed including complete debonding of two parts without a need for physical pulling. The data is summarized in Table 1 and Table 2.

TABLE 1

Test Results from "GORILLA GLUE" based Bonds

| Substrate | Additive | Sonication | Temp (boiling water) | MW | MW (beaker with water) |
|---|---|---|---|---|---|
| TPU/TPU | None | 2.5 hours nothing | 80 seconds-nothing | 60 seconds-material bubbles and soften, glue stays OK. Material does not resist MW. | After 30 seconds-nothing |
| TPU/TPU | Iron (20%) | 2.5 hours-nothing | 80 seconds-nothing | 60 seconds-material bubbles and soften, glue OK. Material does not resist MW. | 5 seconds-de-bonded |
| TPU/TPU | Graphite (10%) | | | | 12 seconds-de-bonded |
| TPU/TPU | Graphite (5%) | | 80 seconds-nothing | | |
| TPU/TPU | Glucaric Acid (10%) | | | | 17 seconds-de-bonded |
| TPU/TPU | aluminum full | | | | 12 seconds-de-bonded |
| TPU/TPU | aluminum partial | | | | 15 seconds-de-bonded |
| TPU/TPU | Iron 2.5% + Gluc Acid 2.5% | | | 45 s form bubbles | 10 seconds-de-bonded |

TABLE 2

Test Results "GORILLA GLUE" based de-bonding

| Substrate | Additive | Temp (boiling water) | MW | MW (beaker with water) |
|---|---|---|---|---|
| TPU foam/TPU foam | none | 80 seconds-nothing | 5 seconds-material becomes soft where the adhesive is | 21 seconds-nothing |
| TPU foam/TPU foam | iron | 80 seconds-nothing | 5 seconds-material becomes soft where the adhesive is, a bit softer than control | 12 seconds-start to de-bond on the sides |
| TPU foam/TPU foam | none | | 160 s (pulses)-nothing | 7 seconds nothing |
| TPU foam/TPU foam | Glu Acid 5% | | 100 s (pulses)-de-bonded | 7 seconds-de-bonded |
| TPU/TPU foam | none | 85 seconds-nothing | | |
| TPU/TPU foam | iron | 85 seconds-nothing | | |
| TPU/TPU foam | aluminum foil full | 85 seconds-nothing | | |
| TPU/TPU foam | aluminum foil partial | 85 seconds nothing | | |
| TPU/TPU foam | none | | 160 s (pulses)-nothing | |
| TPU/TPU foam | Glu Acid 5% | | 160 s (pulses)-start de-bond | |
| TPU/TPU foam | Iron 2.5% + Glu Acid 2.5% | | 135 s (pulses)-de-bond | |
| TPU/TPU foam | none | | | 11 seconds-nothing |

TABLE 2-continued

Test Results "GORILLA GLUE" based de-bonding

| Substrate | Additive | Temp (boiling water) | MW | MW (beaker with water) |
|---|---|---|---|---|
| TPU/TPU foam | aluminum foil grid | | | 4 seconds-debonded |
| TPU/TPU foam | Grap 5% | | | 7 seconds-debonded |
| TPU/TPU foam | Glu Acid 5% | | | 7 seconds-debonded |
| TPU/TPU foam | Grap 2.5% + Glu Acid 2.5% | | | 7 seconds-debonded |

Partially melting was observed in TPU and to some extent also with TPU foam with 60 seconds or longer exposure to microwave heating. In order to avoid this issue, the impact of melting was reduced by exposing the substrates with 10 second pulses. Complete debonding of modified "GORILLA GLUE" bonding was observed in 2-3 minutes (10 second pulses to avoid melting of substrates) using various additives, while no debonding occurs if "GORILLA GLUE" was not modified with additives.

Since it was hard to separate partially melted substrates, a water bath was used to avoid over heating of the substrates (if one of the substrate melts) without compromising local heating of the bonded area. However, since the water also has strong microwave absorption, it took longer to cause disruption of bonding. It took anywhere between 4 and 20 minutes for modified "GORILLA GLUE" bond to fail in microwave oven in the presence of water depending on the loading and nature of the additive used.

Glucaric acid (a natural foaming agent that degrades to form water and $CO_2$, renewable/sustainable resource) was tested in addition to strong microwave absorbers (graphite and iron powders) as the local heating of glucaric acid will cause foaming and mechanical separation of the two substrates. It was observed that glucaric acid by itself can cause debonding of "GORILLA GLUE" without need for strong microwave absorbers such as Fe or carbon materials. Not wishing to be bound by any particular theory, perhaps the highly loaded functional polar groups in the glucaric and similar class of materials cause an increase in the dielectric heating.

Approaches to mitigate the long heating time for substrates with lower melting/softening points can include partially immersing/floating low melting substrate in water or appropriate liquid medium, while the bonded area is directly exposed to microwave radiation and/or cooling the low melting substrate on a cold roll's (with microwave transparent material), while the bonded area is directly exposed to microwave radiation.

Debonding Experiments with "HENKEL" Primer and Cement

In this example, debonding of several "HENKEL" adhesives (two primers and a cement) was explored. Bonding was created using TPU foam (black) and solid TPU sheet (transparent). The laminates were exposed to direct microwave radiation (900 W, 2.4 GHz, regular kitchen type) and the peel strength (lap shear mode) was measured as a function of microwave exposure time. Complete melting of solid TPU sheets was observed in about 45 seconds and probably softening happens at shorter times. The peel strength of different additive modified "HENKEL" cement at various microwave exposure times are shown in FIGS. 6A-6D. Structural deformation was seen during peel strength measurements if the microwave exposure time was higher than 30 seconds (pictures shown on the left side of the chart)

Even the control adhesives started showing some degradation in bond strength at shorter microwave exposure time, followed by increasing bond strength due to melted TPU acting as hot melt adhesive. Certainly partial softening of TPU solid material contributed to weakening of bond strength at the interface between "HENKEL" adhesive with TPU solid.

Debonding of TPU Fabrics and EVA Foams Using Modified "HENKEL" Adhesives

TPU fabric with EVA foam materials were also tested using "HENKEL" primers/cements for microwave induced debonding. Partial melting of upper or lower during 60 seconds of microwave exposure was not observed for these materials. Table 3 shows bond strength of various modified adhesive combinations at different microwave exposure time. Most additives improved the bond strength degradation at 30 seconds of direct microwave exposure. Most PUR adhesives have dipoles that do absorb causing dielectric heating, so they soften and weaken the bond if the adhesives are not hardened (crosslinking). The effect of microwaves with modified adhesives will be dramatic (similar to "GORILLA GLUE") if the adhesives are hardened.

TABLE 3

EVA foam bonded to TPU knitted fiber using Adhesive SW-07, with and without additives, MW 0-90 sec

| Additives | Debonding with minimal or without cross contamination | Sample # | MW Exposure (sec) | Width (mm) | Length (mm) | Force (N) | Stress (N/cm$^2$) |
|---|---|---|---|---|---|---|---|
| No additives | Without | 1 | 0 | 25.6 | 25.2 | 161.25 | 25.0 |
| No additives | Without | 2 | 30 | 22.9 | 26.2 | 102.25 | 17.0 |
| No additives | Without | 3 | 60 | 23.7 | 27.1 | 30.0 | 4.7 |
| No additives | Without | 4 | 0 | 23.3 | 25.9 | 111.25 | 18.4 |

TABLE 3-continued

EVA foam bonded to TPU knitted fiber using Adhesive SW-07, with and without additives, MW 0-90 sec

| Additives | Debonding with minimal or without cross contamination | Sample # | MW Exposure (sec) | Width (mm) | Length (mm) | Force (N) | Stress (N/cm$^2$) |
|---|---|---|---|---|---|---|---|
| No additives | With minimal | 5 | 90 | 24.3 | 23.2 | 8.75 | 1.6 |
| No additives | Without | 6 | 60 | 22.0 | 23.1 | 13.75 | 2.7 |
| 2.5% glucaric acid + 2.5% graphite | Without | 1 | 0 | 23.8 | 24.8 | 121.25 | 20.5 |
| 2.5% glucaric acid + 2.5% graphite | Without | 2 | 30 | 24.2 | 24.2 | 116.25 | 19.9 |
| 2.5% glucaric acid + 2.5% graphite | Without | 3 | 60 | 24.3 | 23.7 | 12.5 | 2.2 |
| 2.5% glucaric acid + 2.5% graphite | With minimal | 4 | 90 | 24.4 | 23.8 | 6.25 | 1.1 |
| 5% glucaric acid | Without | 1 | 0 | 22.7 | 27.8 | 100.0 | 15.8 |
| 5% glucaric acid | Without | 2 | 30 | 24.9 | 24.7 | 40.0 | 6.5 |
| 5% glucaric acid | Without | 3 | 60 | 23.2 | 24.8 | 21.875 | 3.8 |
| 10% ADC + 5% graphite | Without | 1 | 0 | 22.3 | 23.7 | 85.625 | 16.2 |
| 10% ADC + 5% graphite | Without | 2 | 30 | 23.6 | 23.9 | 55.625 | 9.9 |
| 10% ADC + 5% graphite | Without | 3 | 60 | 24.0 | 26.0 | 12.5 | 2.0 |
| 10% glucaric acid + 5% graphite | Without | 1 | 0 | 23.4 | 24.8 | 56.875 | 9.8 |
| 10% glucaric acid + 5% graphite | Without | 2 | 30 | 24.2 | 25.4 | 45.0 | 7.3 |
| 10% glucaric acid + 5% graphite | Without | 3 | 60 | 25 | 22.3 | 9.375 | 1.7 |

Figure 7:
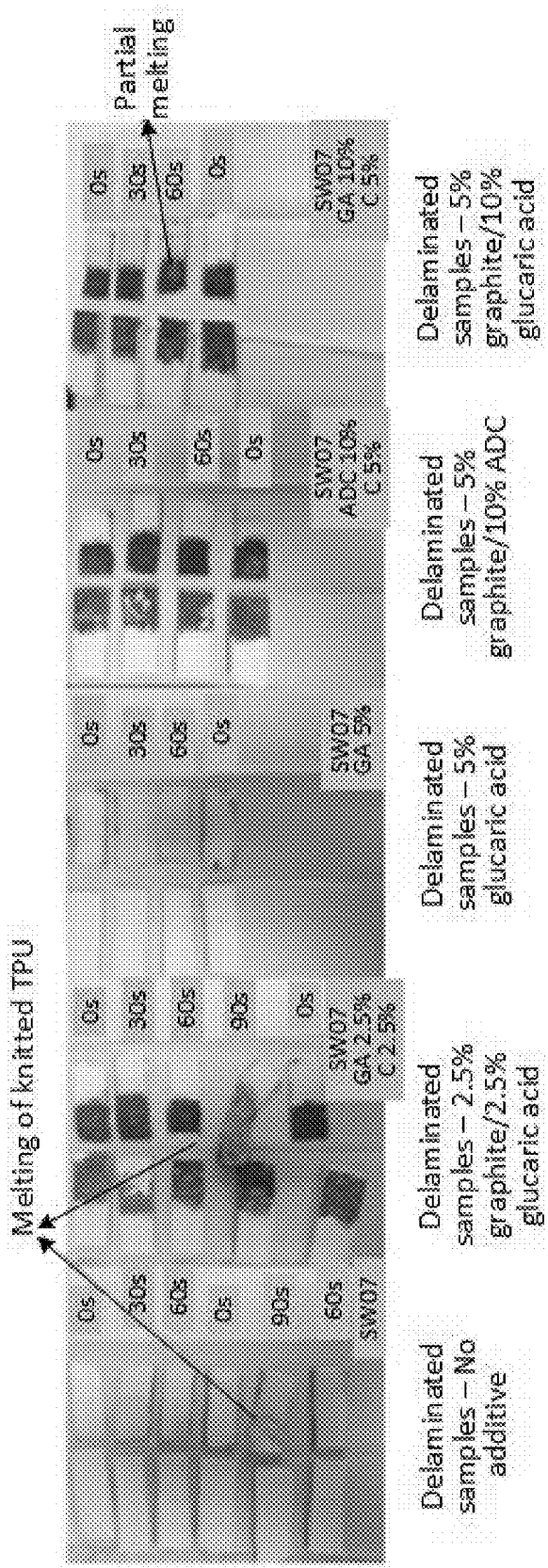
FIG. 7 is a series of imaged depicting the samples after microwave exposure followed by peel strength testing demonstrating that (except for 5% graphite/10% glucaric acid based samples) there was no melting of fabric or foam if the microwave exposure time is less than 60 seconds.

FIG. 7 shows pictures of the samples after microwave exposure followed by peel strength testing. No melting of fabric or foam was observed if the microwave exposure time is less than 60 seconds, except for 5% graphite/10% glucaric acid based samples. However, the fabric melts at the bonded area if the exposure time is around 90 seconds (n on-bonded area is fine). The data shows, bonded area is getting exposed to higher temperatures compared to non-bonded areas.

To understand the difference between the TPU elastomer materials and the TPU knitted fiber, Differential Scanning Calorimetry was performed and found their thermal properties are different. Solid TPU elastomer has sharp melting between 55 to 90° C., while no thermal transition was seen from the TPU knitted fiber. This explains why TPU fabric and EVA foam components were easily separated with about 60 seconds of microwave exposure with 80-95% bond strength degradation.

Figure 8:
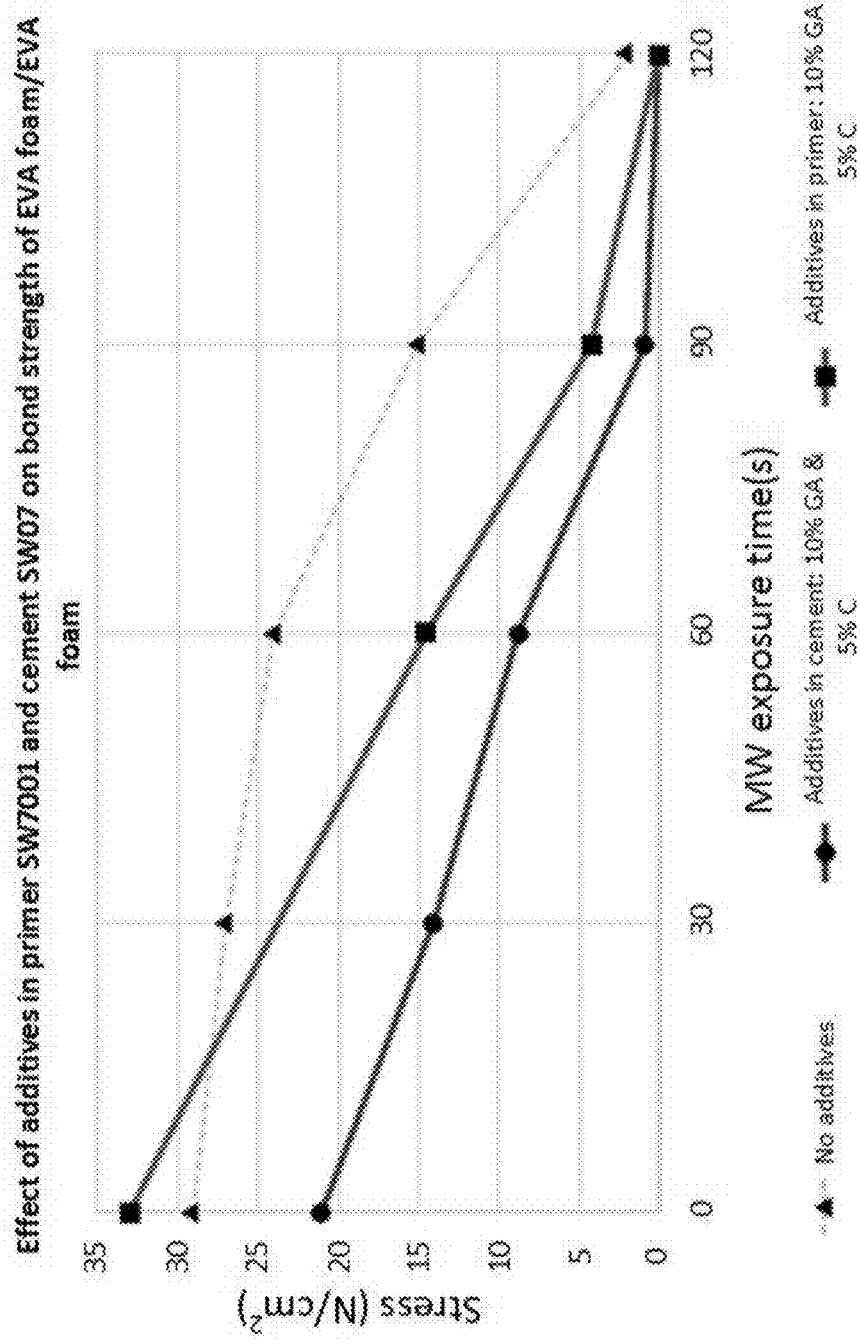
FIG. 8 is a graph of the peel strength (lap shear mode) measured as a function of microwave exposure time (seconds) demonstrating the impact of additives (10% glucaric acid and 5% graphite) when added to the cement (circles), when added to the primer (squares), and compared to the save primer and cement except without the additives (triangles).

Adding additives in the primer does not affect the initial performance (FIG. 8), while it still accelerates the debonding similar to observations seen with additives in the cement. Adding additive in either component can disrupt debonding faster than control, non-hardened adhesive. Hardening will widen this spread even higher and will be optimized during work order 4 period (Phase II).

Engineered Debonding at Specific Interface

Figure 9:
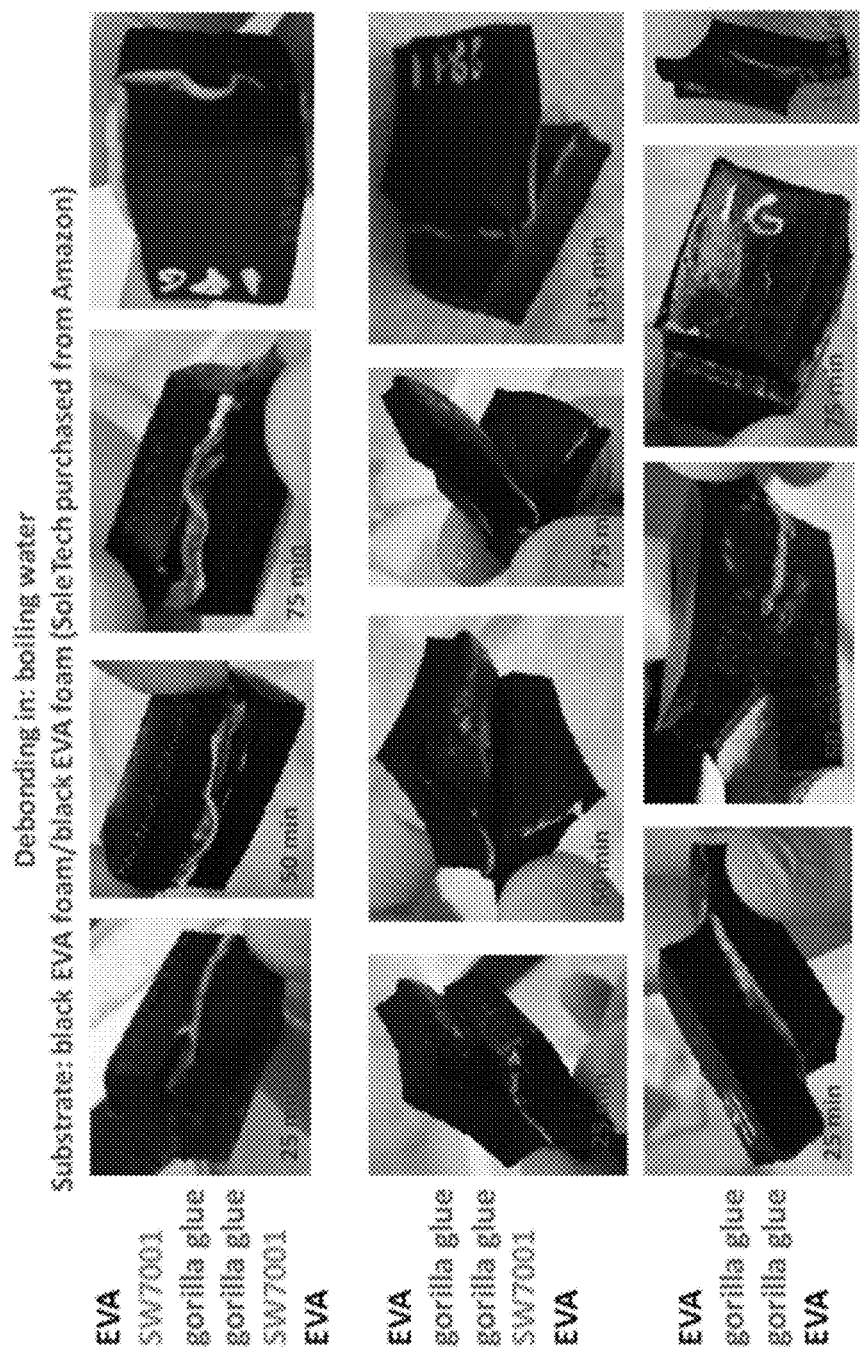
FIG. 9 is a series of images depicting the three different architectures of primer ("HENKEL" SW-7001) and cement ("GORILLA GLUE") and the impact of boiling in water for (from left to right) 25 minutes, 50 minutes, 75 minutes, and 135 minutes. The architectures include (from top to bottom), bonding between EVA foams with primer and cement applied to both bonding surfaces, bonding between EVA foams with primer and cement applied to one surface and only cement applied to the opposing surface, and bonding between EVA foams without primer and with the cement applied directly to both bonding surfaces.

A low melting primer can be integrated with strong cements such as "GORILLA GLUE" or crosslinked (hardened) "HENKEL" adhesives. FIG. 9 three architectures using "HENKEL" primer (SW-7001) and "GORILLA GLUE" on a thermally stable EVA foam purchased from Soletech. The samples were boiled in water for varied time intervals. If the primer was applied on both substrates, the debonding is non-specific and failure occur on both sides of the substrates. If primer is applied only on one side of the laminate, the debonding specifically take place at that interface. When no primer is applied, there is no debonding of "GORILLA GLUE" even after 135 minutes of boiling.

Figure 10:
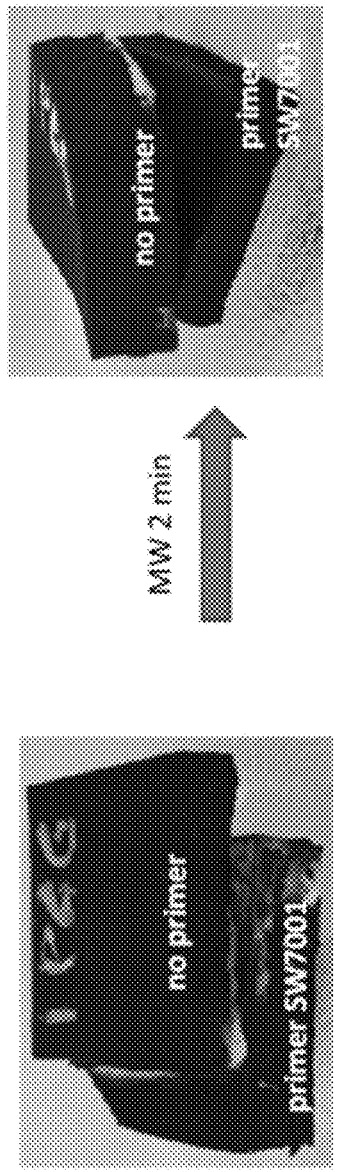
FIG. 10 is a series of images demonstrating that debonding between EVA foams can be selectively achieved at the desired surface using an asymmetric architecture where the primer (applied) side de-bonded within 2 minutes of microwave exposure.
Figure 10:
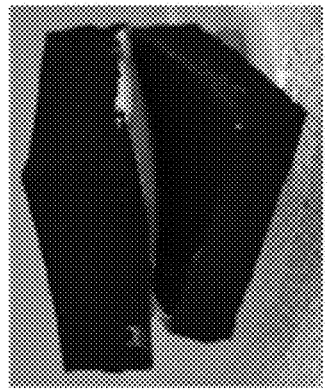
Figure 11A:
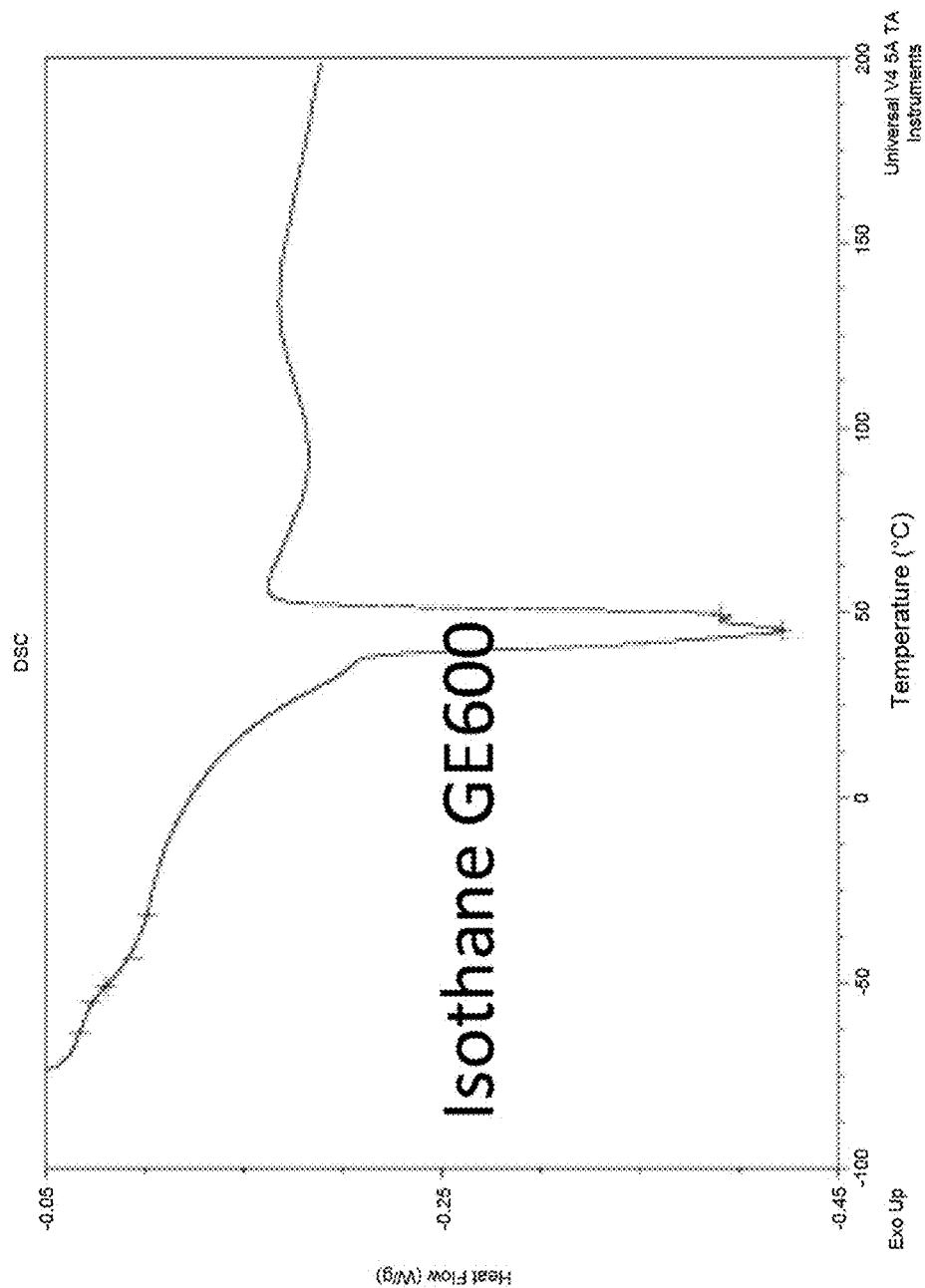
FIGS. 11A-11I are graphs of the differential scanning calorimetry (DSC) tests of the Isothane GE600 (FIG. 11A), NP200 (FIG. 11B), EVA foam (FIG. 11C), polyester fabric (FIG. 11D), TPU fabric (FIG. 11E), TPU foam (FIG. 11F), thin TPU foam (FIG. 11G), thick TPU foam (FIG. 11H), and new white fabric 1 HM T82 X2 E (FIG. 11I).
Figure 11B:
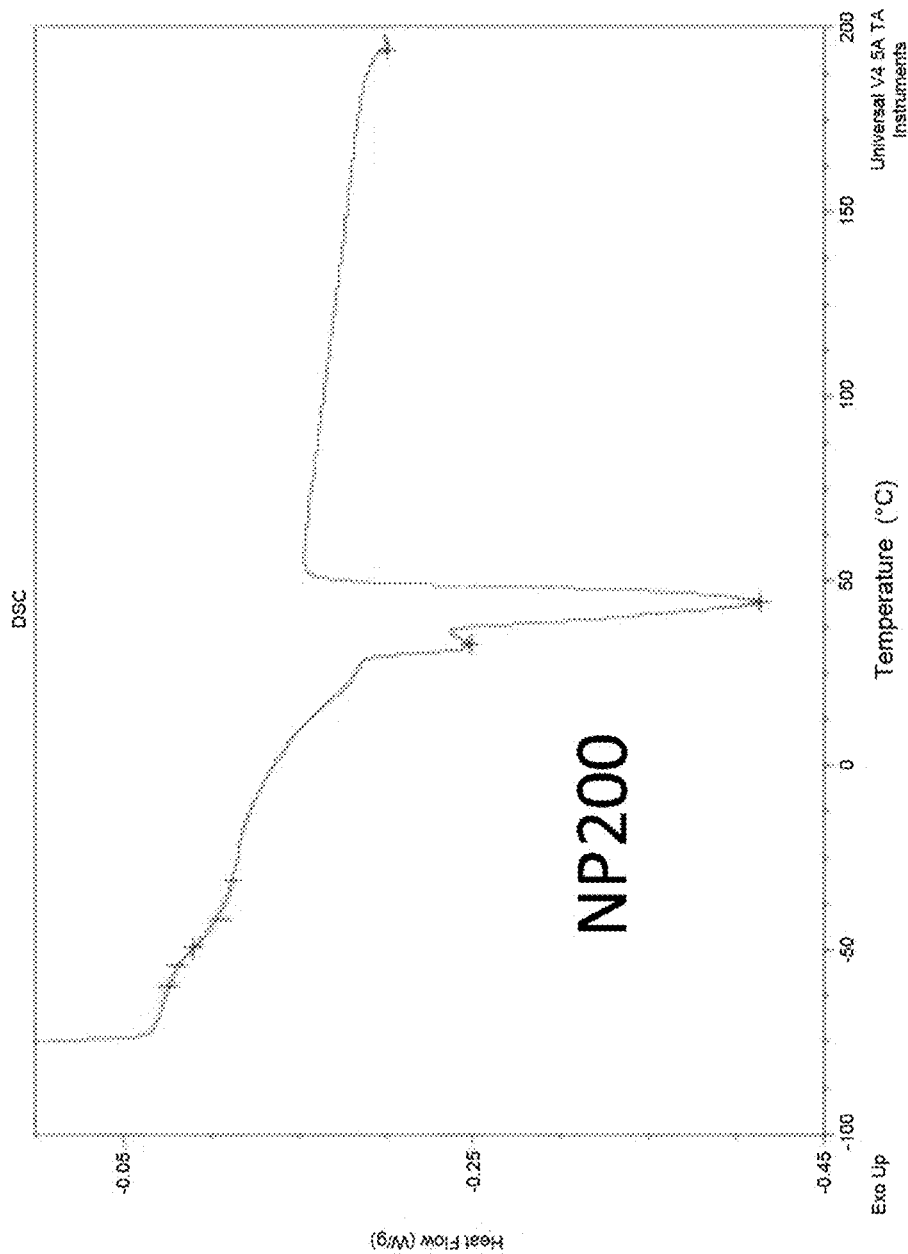
Figure 11C:
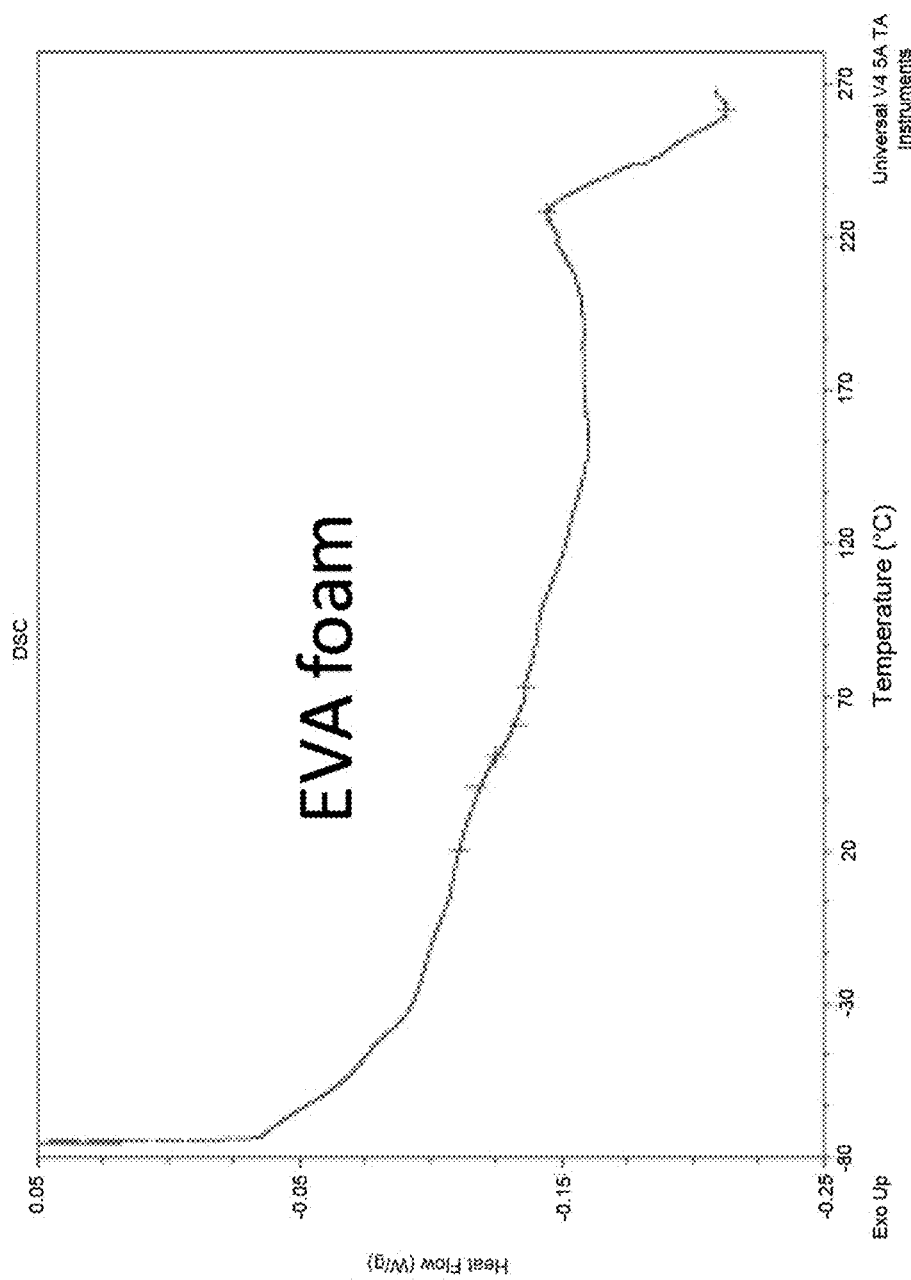
Figure 11D:
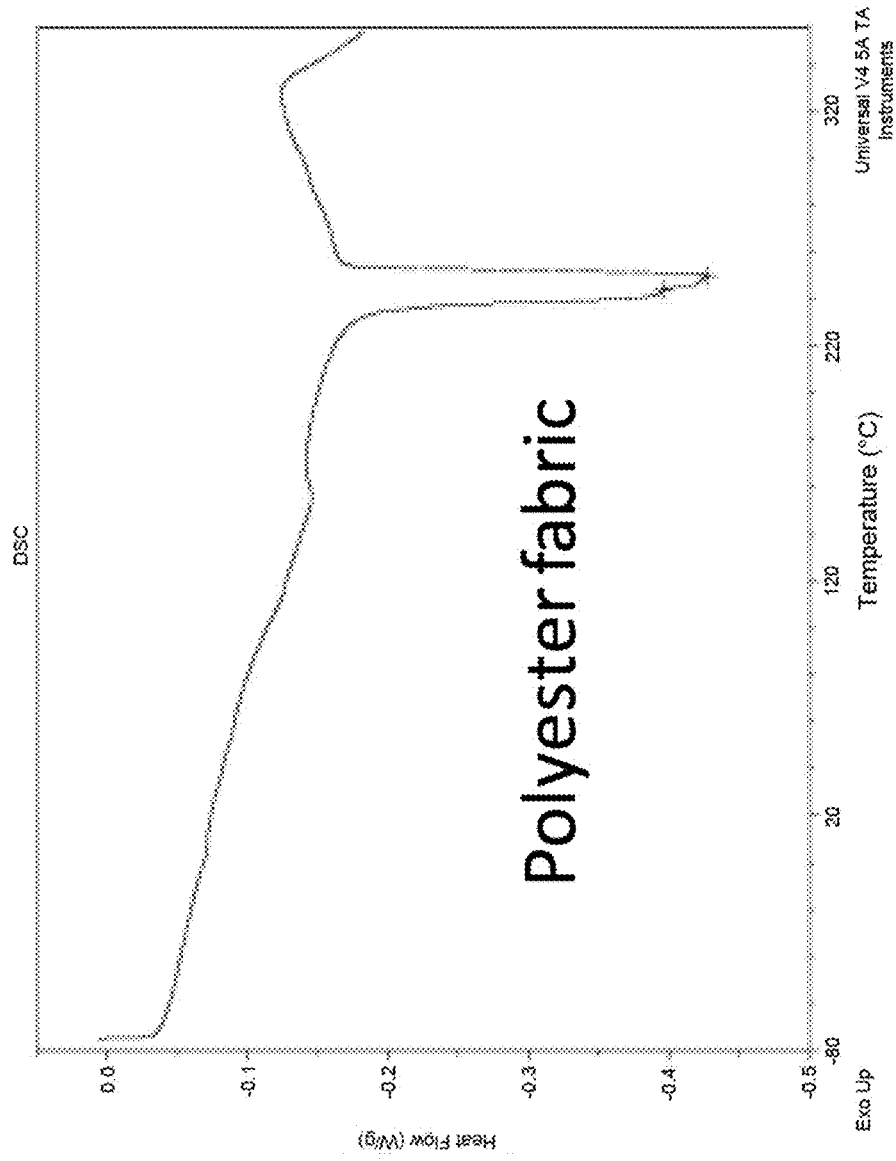
Figure 11E:
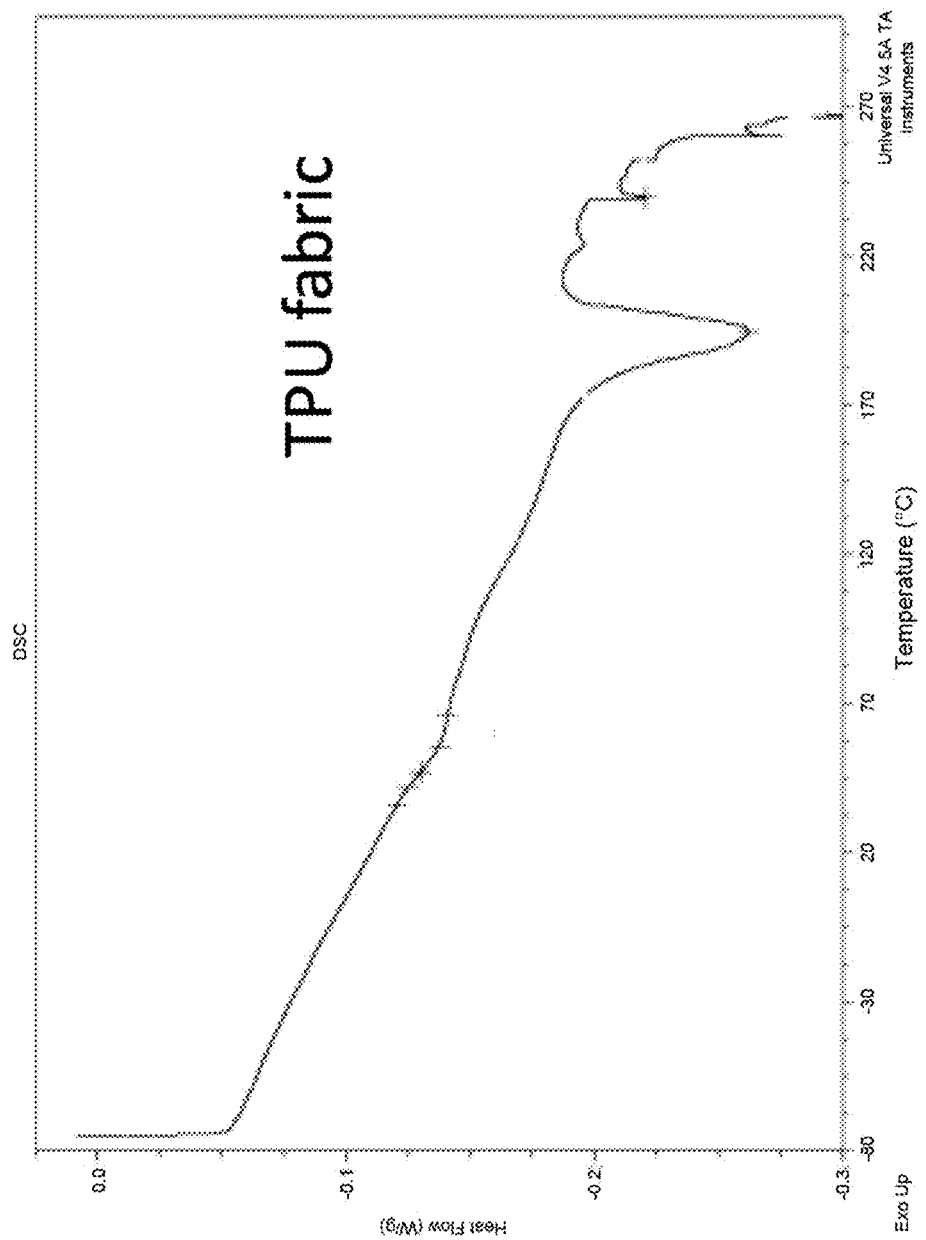
Figure 11F:
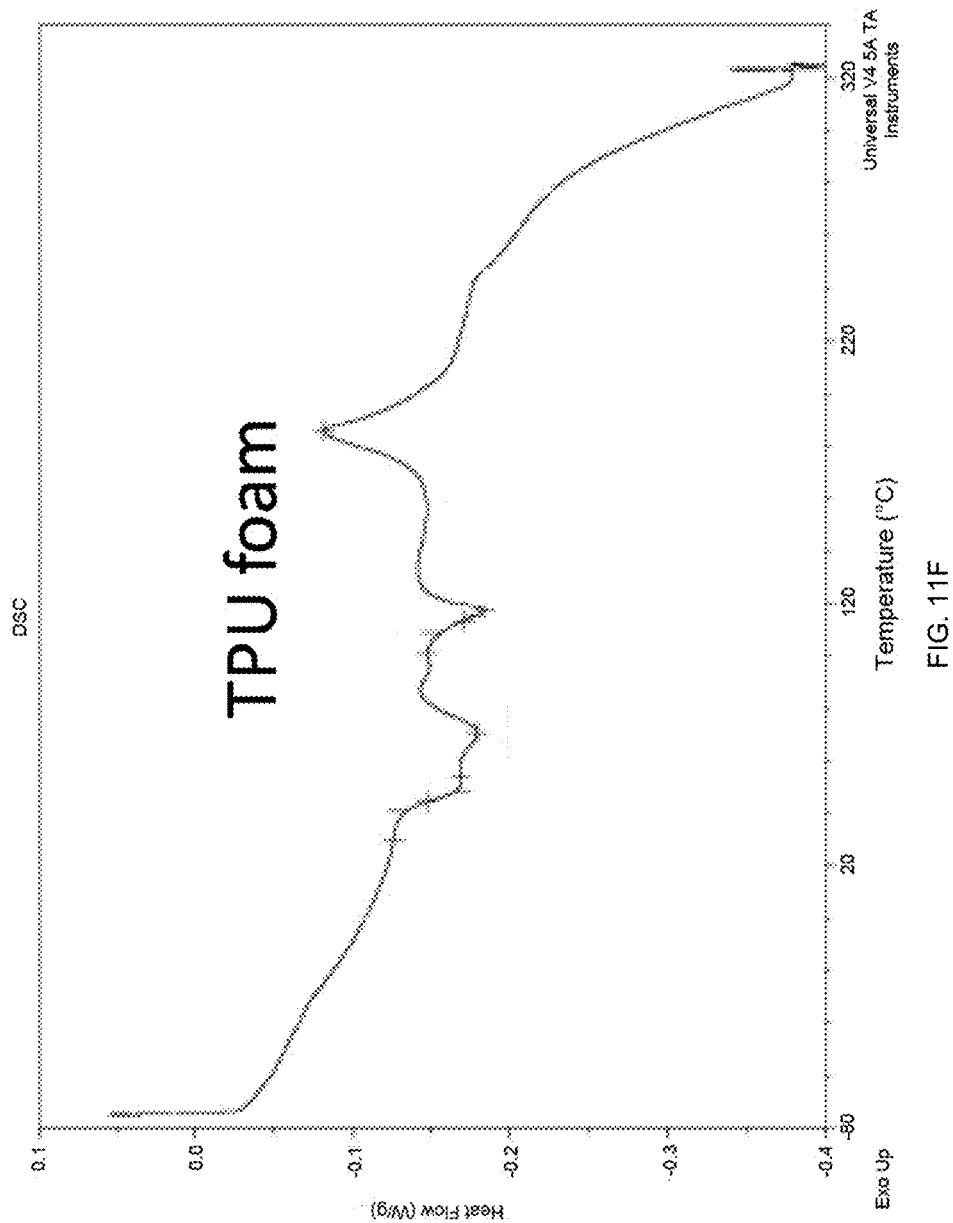
Figure 11G:
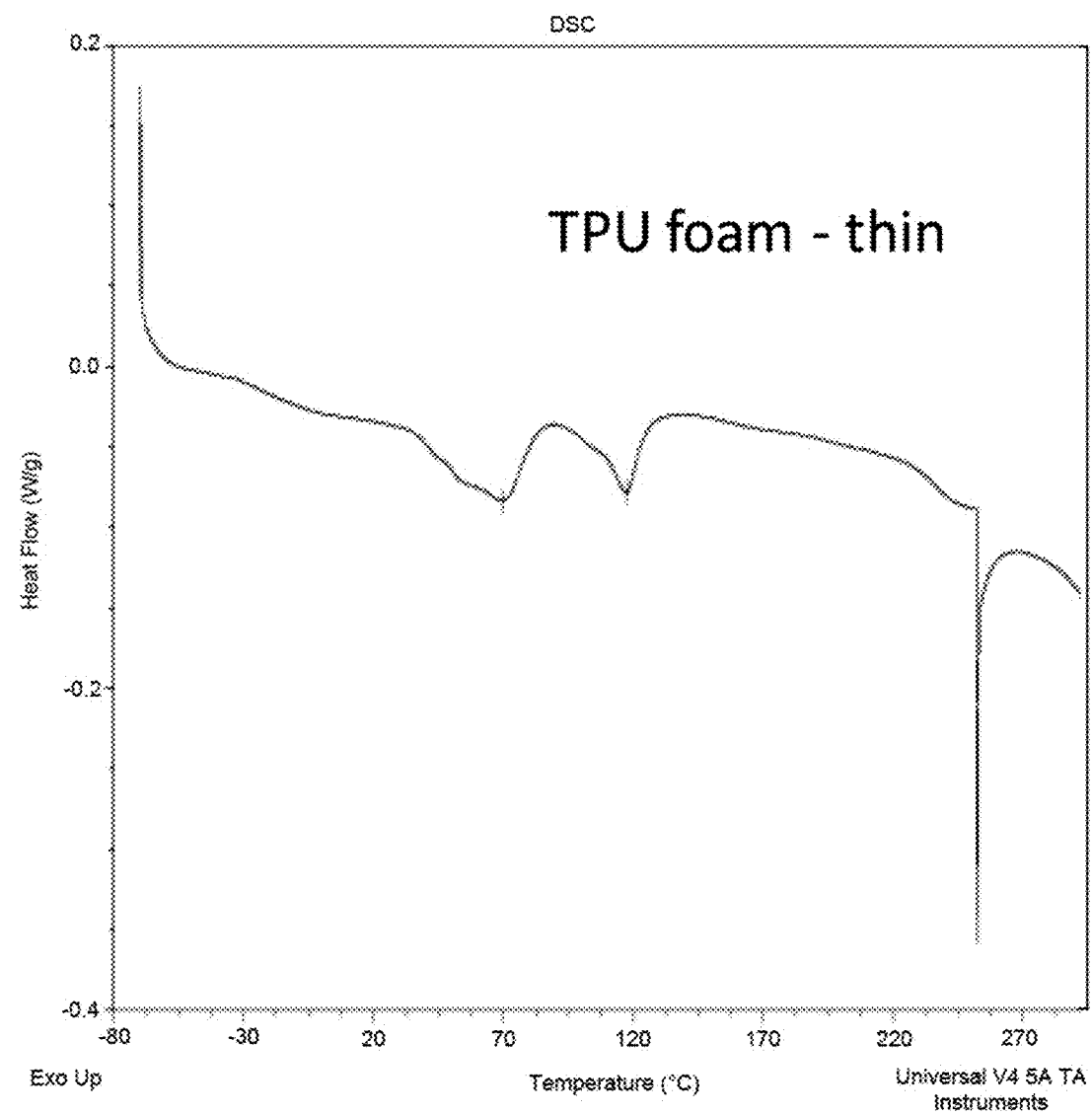
Figure 11H:
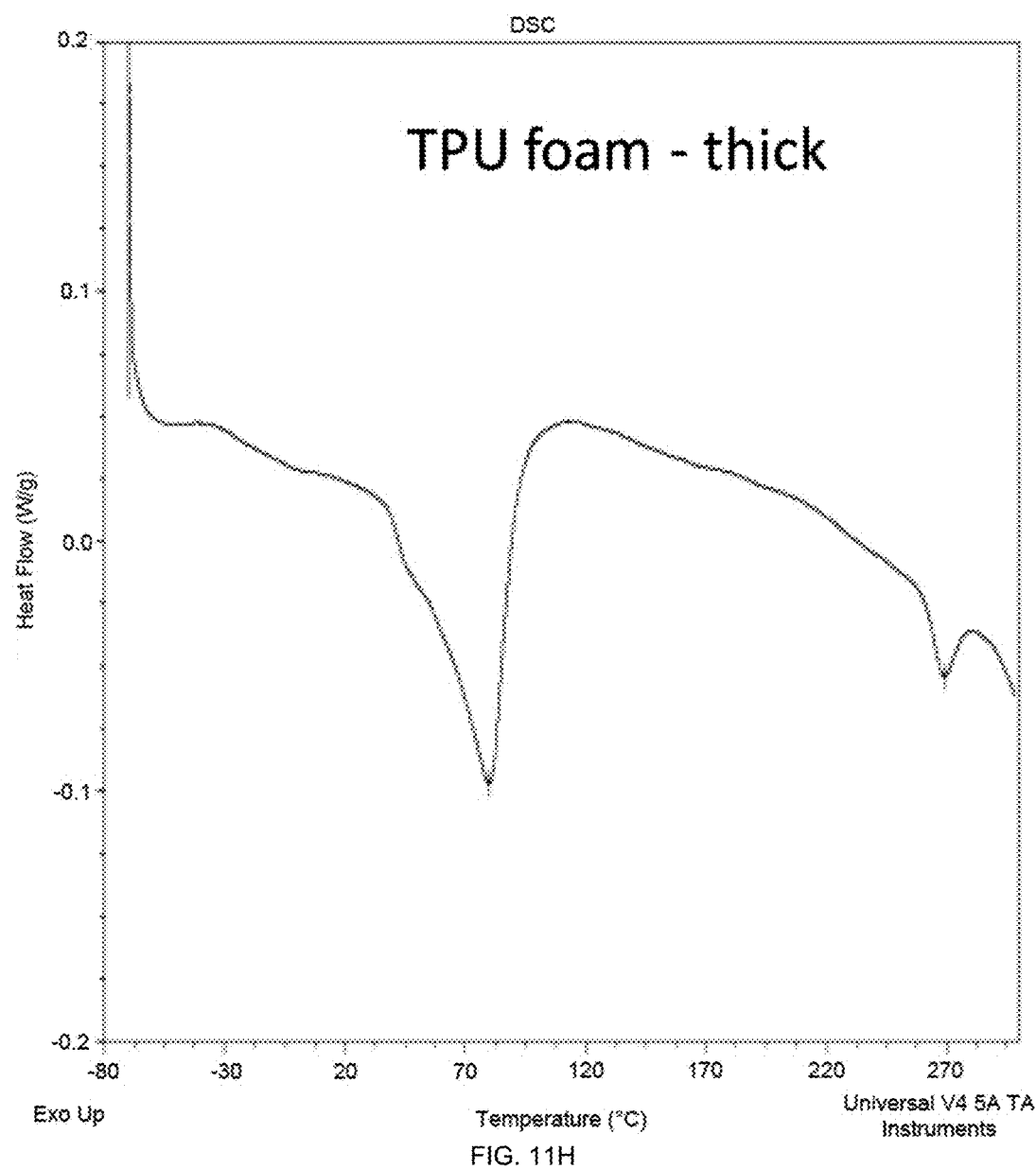
Figure 11I:
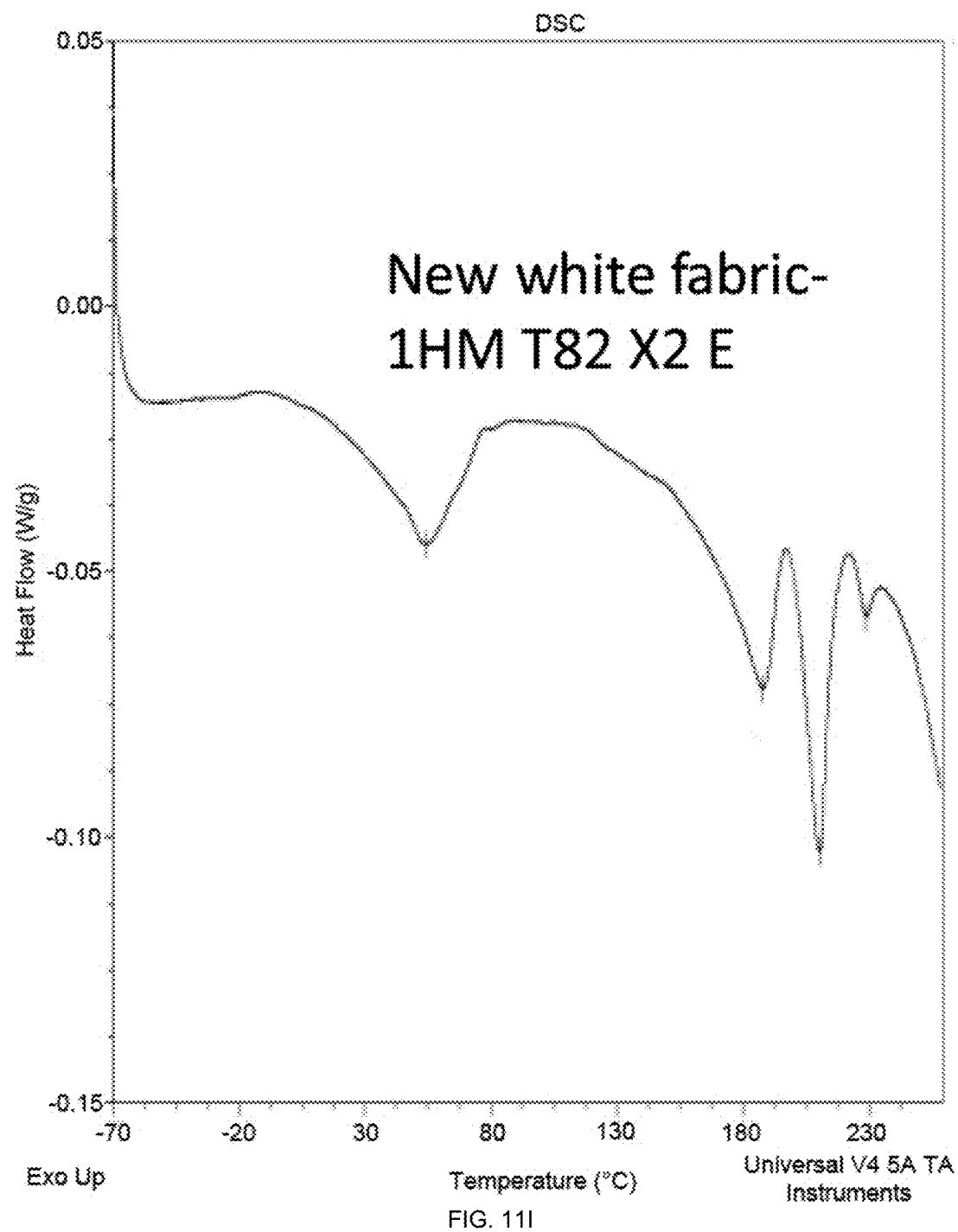

Asymmetric laminates were also exposed to direct microwave exposure (FIG. 10). The primer (applied) side debonded within 2 minutes of microwave exposure as shown in FIG. 10. Hardened adhesives ("HENKEL" and "GRECO") can behave very similar to "GORILLA GLUE" based bonding/debonding. This technique provides an opportunity to either apply a non-hardened primer with hardened cement or additive modified primer with hardened cement (with or without additives). This technique also provides an opportunity to recover most expensive component without cross-contamination by using additive modified hardened primer only at the interface of desired component, while using non-modified hardened cement/primers on the inexpensive part.

Stability of Bonding Under Normal Use

To test for non-failure of bonding during normal and accelerated ageing conditions, adhesives were tested for maintaining bond strength after 96 hours of ageing in water kept at 70° C. Additionally, some test samples were tested for hydrolytic stability at 70° C. for 96 h. Adding additives in "GORILLA GLUE" did not change the bond strength. The bond strength of "GORILLA GLUE" was also not improved using "HENKEL" primer. The following Table 4 shows bond strength of test samples aged at 70° C. for 96 h. The data clearly proves that bond strength is not degraded except for a control "HENKEL"/"HENKEL" (not hardened) sample. Bond strengths of aged samples are higher than that from non-aged samples. Also, using a low melting "HENKEL" primer in "GORILLA GLUE" (or hardened adhesive formulations) is not causing the failure under hydrolytic ageing.

TABLE 4 bond strength of test samples aged at 70° C. for 96 h.

| Sample | Sample ID | Width (mm) | Length (mm) | Force (N) | Stress (N/cm²) |
|---|---|---|---|---|---|
| "GORILLA GLUE" only | G-1 | 26 | 28 | 201 | 28 |
| "GORILLA GLUE" only | G-2 | 27 | 28 | 194 | 26 |
| "GORILLA GLUE" only | G-3 | 22 | 27 | 181 | 31 |
| Average Stress | | | 28 | ± | 2 |
| "GORILLA GLUE" + additives | GA-1 | 24 | 29 | 203 | 29 |
| "GORILLA GLUE" + additives | GA-2 | 21 | 26 | 167 | 31 |
| "GORILLA GLUE" + additives | GA-3 | 21 | 26 | 191 | 35 |
| Average Stress | | | 32 | ± | 3 |
| SW-7001/SW-07 | SW-1 | 27 | 29 | 156 | 20 |
| SW-7001/SW-07 | SW-2 | 23 | 29 | 166 | 25 |
| SW-7001/SW-07 | SW-3 | 29 | 28 | 231 | 28 |
| Average Stress | | | 24 | ± | 4 |
| SW-7001/"GORILLA GLUE" | PG-1 | 25 | 27 | 171 | 25 |
| SW-7001/"GORILLA GLUE" | PG-2 | 23 | 31 | 203 | 28 |
| SW-7001/"GORILLA GLUE" | PG-3 | 24 | 28 | 193 | 29 |
| Average Stress | | | 24 | ± | 4 |

Example 2: Glucaric Acid and Similar Materials in "NANPAO" Adhesives

Materials Used

Three adhesives ("NANPAO", "GRECO" and "HENKEL") were explored along with non-colored, sustainable additives for modifying adhesives and foam/fabrics.

Substrates Used
  TPU fabrics
  Thermoplastic Polyurethane foams (TPU foam)—various thicknesses
  EVA foams
  Polyester fabrics (black and multicolored)
  EVA foam materials from Soletech mainly used for optimization work (in two colors—black and brown)

Adhesives
  "NANPAO" brand adhesives (Nan Pao Resins Chemical Co., Ltd, Tainan City, TW) (NP200 cement, U E312 primer, UVW7 UV primer, 1071 hardner, 111FT, ANUV-60N)
  "GRECO" brand adhesives (GREAT EASTERN RESINS INDUSTRIAL CO., LTD., Taichung, TW) (GE-01 cement, GE6001 L, UV primer-6263 and hardner-368)
  "HENKEL" brand adhesives (Henkel AG & Company, KGaA, Dusseldorf, DE) (UV primer, "LOCTITE AQUACE SW-7001" and cement "LOCTITE AQUACE SW-07") from Henkel-45 to 50% solid content Additives Used: Glucaric acid and tartaric acid as well as sodium acetate and sucrose.

Thermal Characteristics of Adhesives and Substrates

Thermal characteristics of all adhesive materials and upper/bottoms received were tested using DSC (FIGS. 11A-11I). Both Isothane GE01 ("GRECO") and NP200 ("NANPAO") exhibited similar melting points at around 45° C., which were lower by about 10° C. compared to "HENKEL". Polyester fabric exhibited highest melting point compared to all substrates tested. Thermal characteristics of TPU foam and fabrics varied depending on the batch.

Additive Modification of Adhesives

The dispersion quality of modified adhesives containing various amounts of glucaric acid or tartaric acid was improved. Optimizing blending process enabled matching (or exceeding) bond strength of modified adhesives to that of control adhesives. The procedure for making glucaric/tartaric acid modified adhesives is shown in the following procedure.

Adhesive Dispersion Formation Procedure

1. D-Glucaric Acid Potassium Salt and Tartaric Acid additives (Additives #1) were first individually ground to a fine powder using a mortar & pestle.
2. Each adhesive (Additives #2) was vortex mixed for 60 sec using a "FISHER SCIENTIFIC" brand Vortex Mixer (Model 945404, Fisher Scientific International, Inc., Pittsburgh, PA, USA) operative at a setting of 10.
3. The appropriate amounts of Additives #1 & #2 are weighed into a "FLACKTEK" brand Max 10 Cup (FkackTek, Inc., Landrum, CS, USA) and then the cup is sealed.
4. The contents in the cup are vortex mixed for 60 sec using a "FISHER SCIENTIFIC" Vortex Mixer operating at a setting of 10.
5. The contents in the cup are speedmixed using a "FLACKTEK" SpeedMixer (Model DAC400 FVZ) operating at 1000 rpm for 60 sec. Caution must be taken to balance the cup(s) in the sample holder and the total weight of the system (holder+cup(s)+contents) must be between 250 grams to 400 grams to prevent damage to the SpeedMixer.
6. Each cup is removed and its contents rotated around the cup walls to "wash down" any material adhered to the cup walls.
7. The cup and its contents are placed back into the holder and speedmixed at 1000 rpm for 60 sec and then step #4 is repeated.
8. Steps #5 is repeated an additional 2 times making the total number of speedmixer cycles at 4.
9. The cup contents are vortex mixed for 60 sec as before.
10. The cup & its contents are placed back into the holder and speedmixed at 1000 rpm for 60 sec.
11. Each cup is opened and its contents examined for dispersion quality and fluidity. Depending upon the transparency of the dispersion, dispersion quality can be determined by placing the open cup and its contents on a light box and then looking for the presence of particles or particle aggregates within the dispersion. If the dispersion is opaque at its current volume, place a drop of the dispersion on a microscope slide, gently place another microscope slide over the other one, and look through the thin dispersion layer for particles.

Bonding and Debonding Experiments with NP200 ("NAN-PAO") Cement

The general procedure for modifying NP200 adhesive, bonding with desired substrate and debonding experiments are shown below:

Qualitative/Quantitative De-Bonding Screening Adhesive with and without Additives MW 0-600 Sec Materials:
  Substrate: "CLOUD EVA" brand soling material and (SoleTech, Inc., Salem, MA, USA)
  Sample size: 1 inch×2.5 inch with bonding area of 1"×1" for "SHIMATZU" and smaller size for qualitative microwave test
  Additives: Glucaric Acid (D-Saccharic acid potassium salt, CAS 576-42-1, from Sigma-Aldrich, Saint Louis, MO, USA)
  Tartaric Acid (DL-Tartaric acid, CAS 133-37-9, from Sigma-Aldrich, Saint Louis, MO, USA)

Adhesives (Based on Dry Weight of NP-200)
  No additives
  10.1 Wt. % D-Saccharic Acid K Salt
  4.98 Wt. % D-Saccharic Acid K Salt
  9.99 Wt. % Tartaric Acid
  4.95 Wt. % Tartaric Acid
  5.00 Wt. % Graphite Powder (as an external control)

Primer (Based on UE-312):
  No additives

Procedure: Substrates were Treated as Follows
  Washed with tap water
  Allowed to dry
  Pre-heated at 52° C. for 4 min
  Thin layer of primer was applied using a brush on the smooth size (S), and on the rough size (R) of the substrate. Samples were heated at 52° C. for 2 min.
  Thin layer of adhesive with and without additive was applied using a brush, and samples were heated at 52° C. for 2 min
  Two sides cemented together, pressed together with binder clips between two microscope slides for 15 min.
  Samples placed into Carver press, and pressed to 500 psi for 15 min.
  Samples removed from the press, and placed between two microscope slides, the slides and the sample pressed together by two binder clips, and left overnight.

Microwave Exposure Conditions:
  After curing for 24 hours' samples were exposed to microwave irradiation (continuous exposure as opposed to intermittent) for different times up to 3 minutes.
  No water bath used unless specifically mentioned.
  Test peel strength using Shimatzu.

Effect of Additives on the Debonding of NP200 ("NAN-PAO") Based Adhesive

Figure 12:
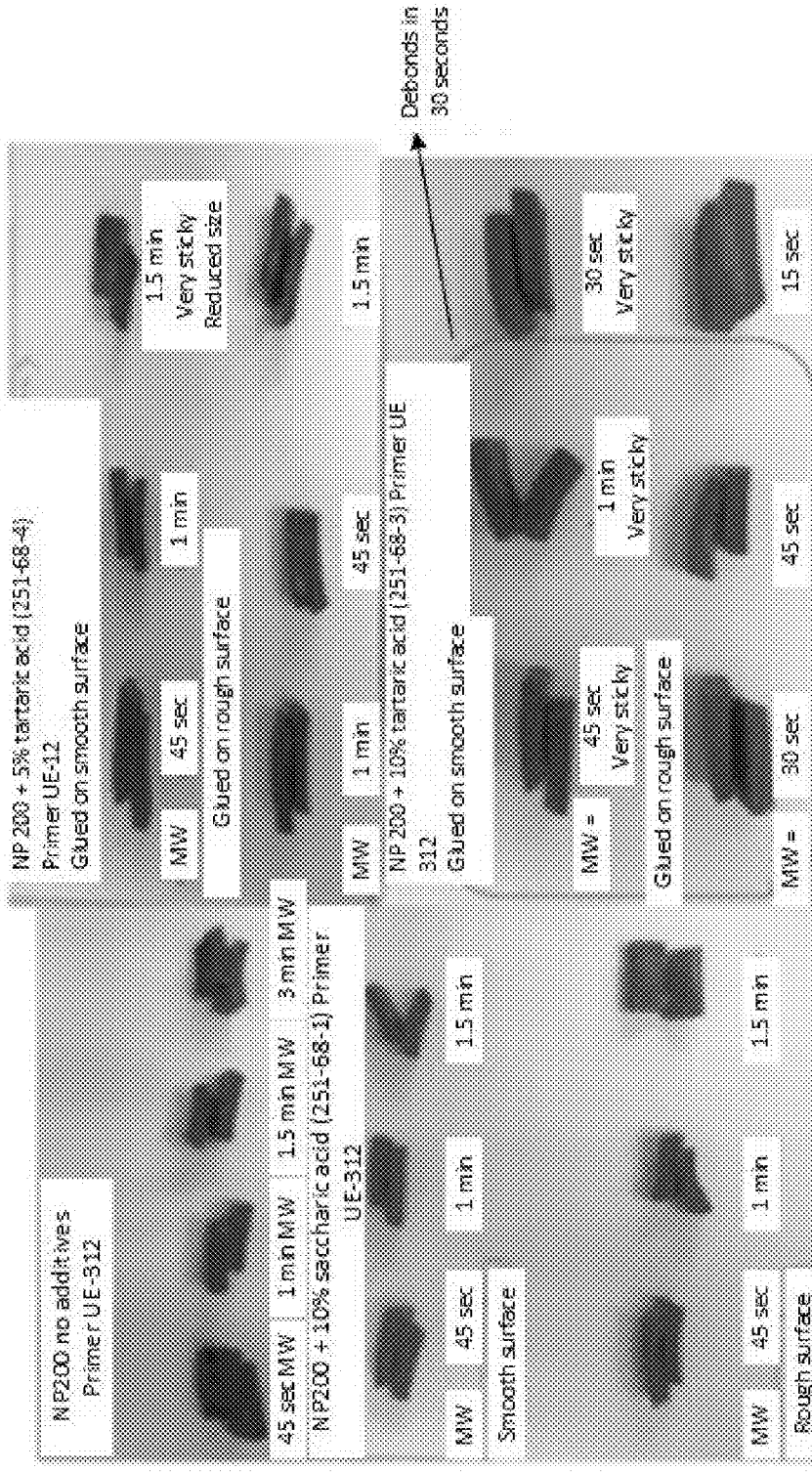
FIG. 12 is a series of images of small sized samples bonded with NP200 modified with various amounts of glucaric/tartaric acid after debonding by exposure to microwave radiation.
Figure 13:
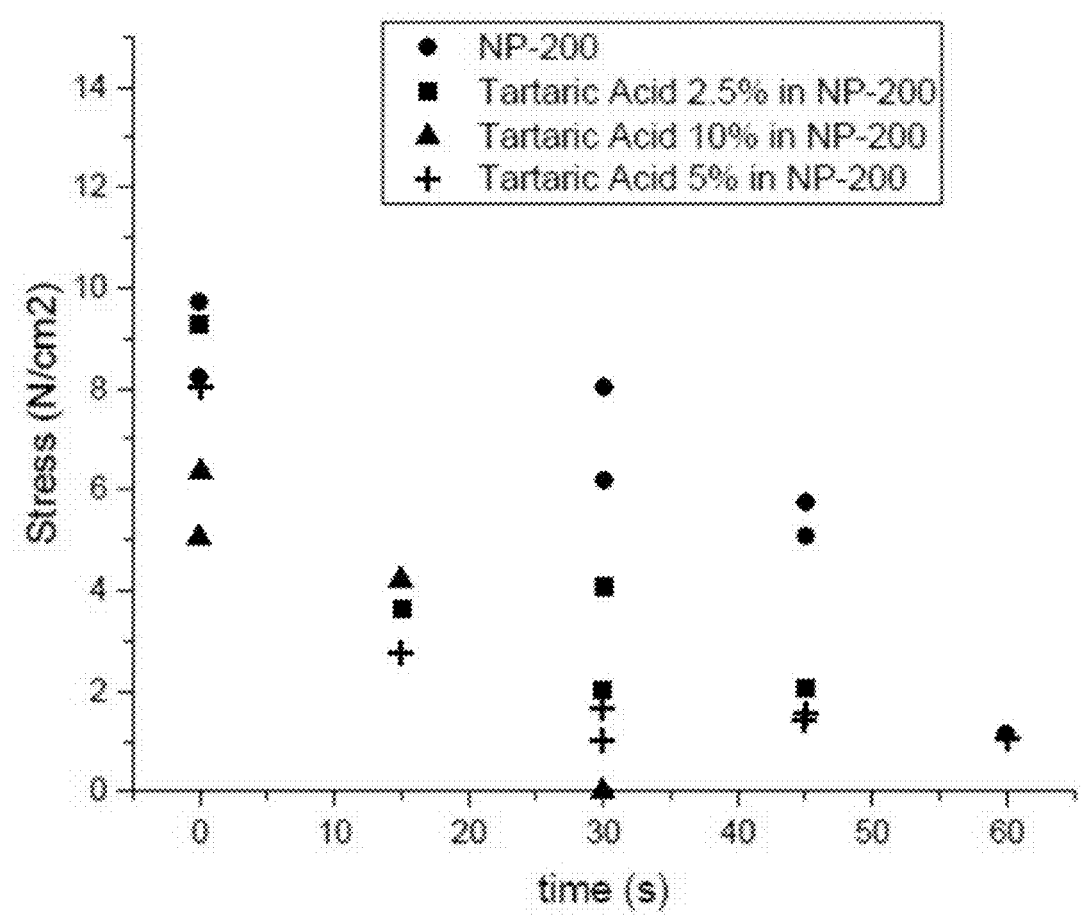
FIG. 13 is a graph of the peel strength (lap shear mode) measured as a function of microwave exposure time (seconds) for the small sized samples bonded with NP200 modified with various amounts of glucaric/tartaric acid depicted in FIG. 12.

As an initial screen, small sized samples were made using various amounts of glucaric/tartaric acid modified NP200 and exposed to microwave radiation at various time intervals. The pictures of the samples after microwave exposure are shown in FIG. 12. Faster delamination was observed with tartaric acid at both 5% and 10% levels. In the follow up experiment, 1"×2.5" samples were prepared for measuring bond strength as a function of microwave exposure time. FIG. 13 shows the relative bond strength of laminates made with varying concentration of tartaric acid as a function of microwave exposure time. The performance of modified adhesives up to 5% tartaric acid were able to be matched to that of control NP200 based laminate. The performance of 10% tartaric acid based adhesive was poor.

The data clearly show tartaric acid fastens the debonding in the presence of microwave radiation, similar to glucaric acid. The performance of tartaric acid is better than glucaric acid based on initial studies.

Figure 14:
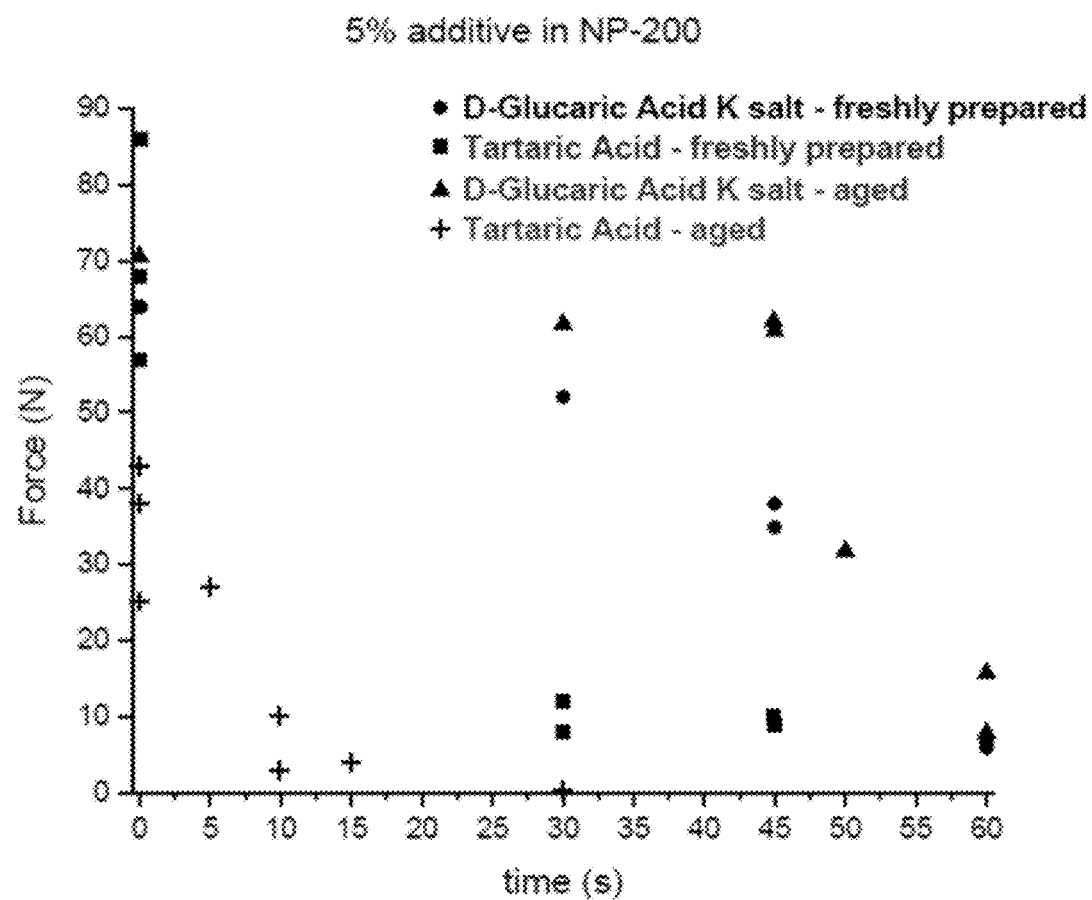
FIG. 14 is a graph of the bond strength (N) as a function of the microwave exposure time (s) for samples bonded with NP200 adhesive using either 5% glucaric acid (glucaric acid K salt) or 5% tartaric acid additive comparing samples bonded with freshly prepared adhesive and with samples bonded with 24 h room temperature aged modified adhesives.
Figure 15:
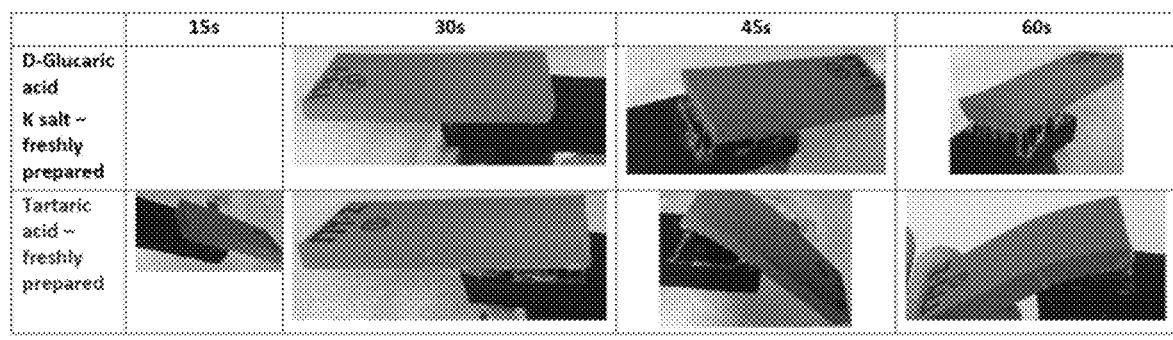
FIG. 15 is a series of images showing the difference between 5% glucaric acid (top) and 5% tartaric acid (bottom) modified NP200 cement based bonds at microwave exposure times of (from left to right) 15 seconds, 30 seconds, 45 seconds, and 60 seconds.

Tartaric acid may have decreased shelf-life based on observed viscosity increase seen with 10% tartaric acid based NP200 adhesive formulation upon ageing. The ageing of 5% glucaric and tartaric acid based NP200 was investigated to ascertain the effects on bond strength and their effect on microwave disruption (FIG. 14). Bonding using freshly made adhesives and 24 h room temperature aged modified adhesives were tested for bond strength as a function of microwave exposure time. The bond strength of glucaric acid was not affected by ageing, while bond strength degraded if tartaric acid based adhesive is aged for 24 h. Both tartaric acid and glucaric acid exhibited similar bond strength, when freshly prepared modified cement was used for bonding. However, the disruption of bond with microwave is faster with tartaric acid compared to that with glucaric acid. FIG. 15 shows the difference between glucaric acid (5%) and tartaric acid (5%) modified NP200 cement based bonds at various microwave exposure times.

Figure 16:
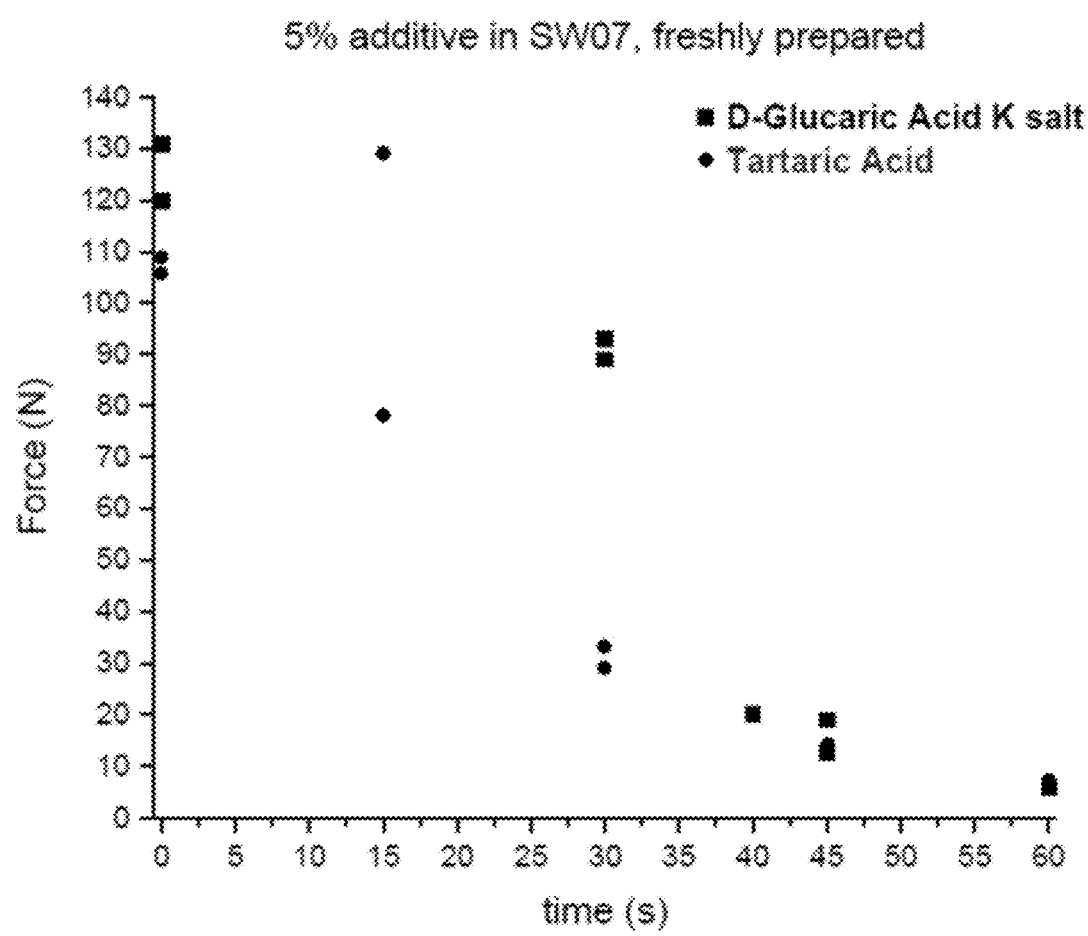
FIG. 16 is a graph of modified "HENKEL" cement (SW-07) bonding depicting the bond strength (N) as a function of the microwave exposure time (seconds) and demonstrating that debonding was faster with tartaric acid compared to that with glucaric acid at 5% loading level.

A trend was also observed when "HENKEL" cement (SW-07) was modified with tartaric and glucaric acids. FIG. 16 shows bond strength of modified SW-07 adhesive with glucaric and tartaric acids. The debonding was faster with tartaric acid compared to that with glucaric acid at 5% loading level.

Figure 17:
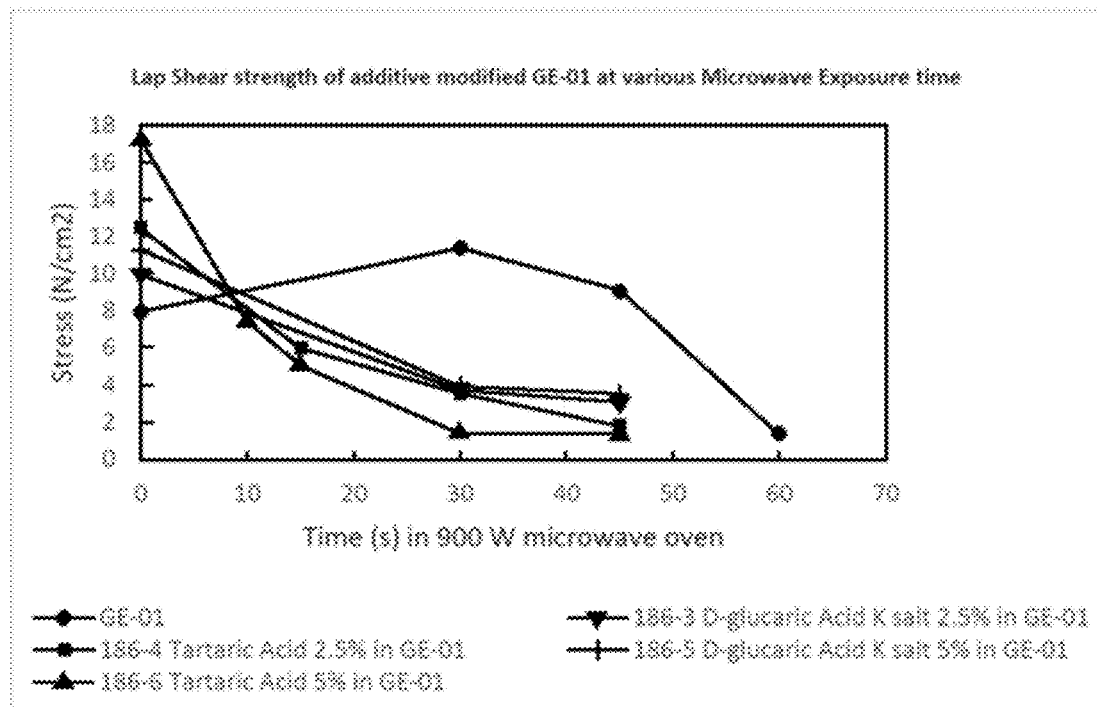
FIG. 17 is a graph of the lap shear strengths as a function of the exposure time (seconds) in a 900 W microwave oven for soletech substrates bonded with "GRECO" cement (Isothane GE01) that has been modified with varying amounts of glucaric acid and tartaric acid.

"GRECO" cement (Isothane GE01) was tested with both glucaric acid and tartaric acid at 2.5% as well as at 5% loading levels. Soletech substrates were used for testing. The substrates were cleaned and applied with the "GRECO" UV primer followed by GE6001L. Modified cements were applied, dried and bonded using WBI's bonding process described in work order 2 report. The samples were aged for 24 and lap shear strengths were measured using Shimatzu as a function of microwave exposure time. FIG. 17 shows the effect of microwave exposure time on the bond strength. The data again clearly shows that tartaric acid works better than glucaric acid in disrupting the bonds, and both additives perform better than non-modified, not-hardened GE01. The debonding spread between control and modified GE01 will be much better if GE01 is hardened.

Figure 18:
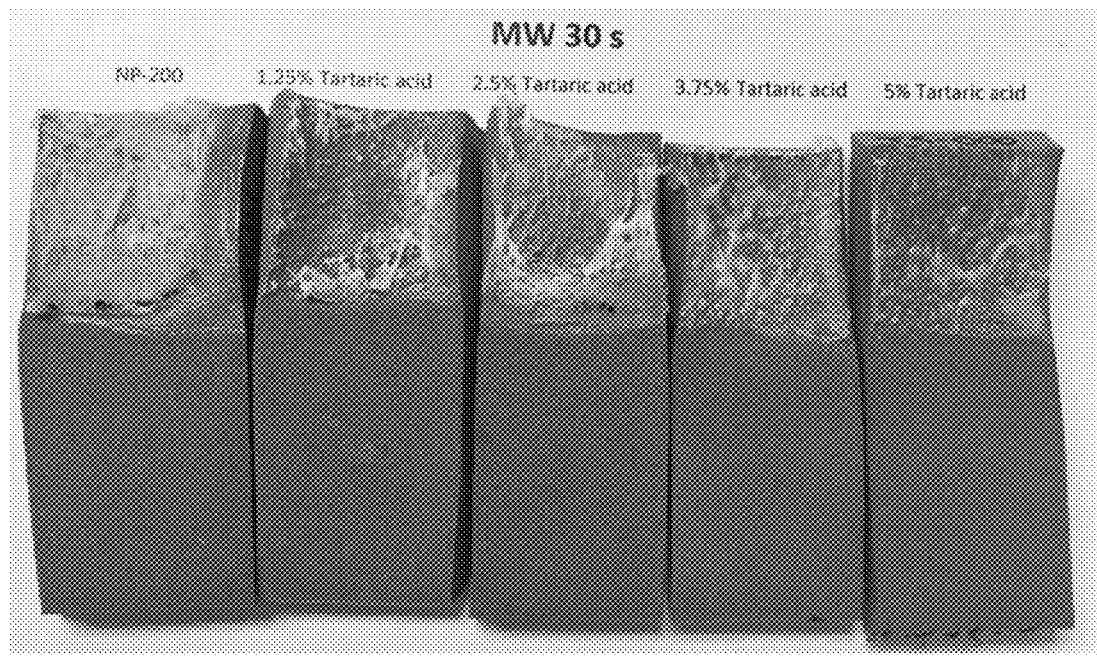
FIG. 18 is a series of images depicting the surface of de-bonded substrates that were exposed to 30 second microwave followed by debonding using Shimatzu from NP200 with various amounts of tartaric acid.

Tartaric Acid in NP200 ("NANPAO") with Improved Debonding and Shelf-Life:

Since much better disruption was observed using tartaric acid in NP 200 (also GE01 and SW-07), the concentration of tartaric acid was investigated to achieve best disruption without affecting initial bond strength and shelf life (at least for 2 hours). Earlier work suggested, both tartaric acid and glucaric acid concentration should be lower than about 10% to achieve good bond strength after 24 h of bonding. The concentration of tartaric acid in NP 200 was tested using following procedure:
  Add 0% (control), 1.25%, 2.5%, 3.75% and 5% tartaric acid in NP200 and mix them using WBI mixing protocol
  Apply modified cements on UV primer and Primer UE312 applied substrates
  Test the effectiveness of 0%, 2.5%, 5% tartaric acid containing NP200 after 1 and 2 hours of making the formulation to understand the shelf life
  Make bond between upper/bottom after drying using WBI's bonding protocol
  Age them for 24 h
  Test T-peel strength as a function of microwave exposure time Test viscosity of each formulation as a function of ageing time Bond Strength Data More than about 2.5% of tartaric acid is needed to cause faster disruption of bonding of non-hardened NP200. An optimum concentration of required tartaric acid in NP200 is between about 3.75% and 5%. FIG. 18 shows the surface of de-bonded substrates that were exposed to 30 second microwave followed by debonding using Shimatzu from NP200 with various amounts of tartaric acid. No melting is seen from sample without tartaric acid, partial melting is seen with samples containing 1.25% and 2.5% tartaric acid. Complete melting and some foaming is seen with samples containing 3.75% and 5% tartaric acid. All substrates were completely separated during 30 second microwave from samples made with 5% tartaric acid, while few samples separated in microwave oven with 3.75% tartaric acid. Bond strengths of 3.75% and 5% tartaric acid containing bonds were almost zero with just 30 second microwave exposure, while no change was seen with control NP200 based bond strength.

Figure 19:
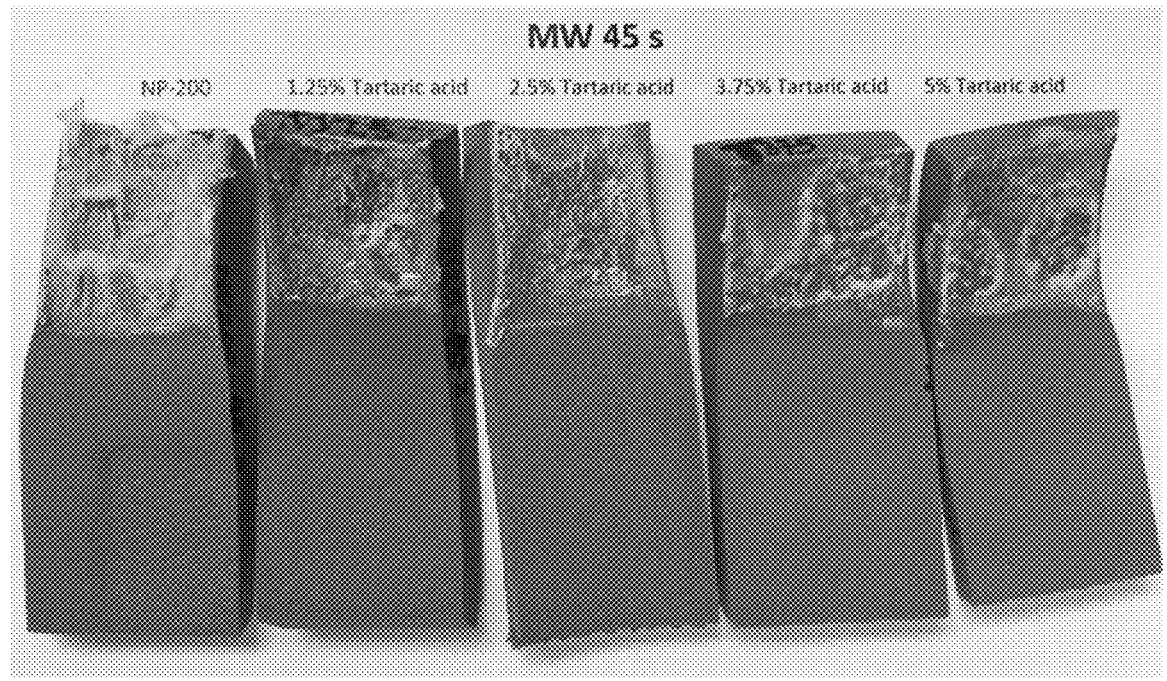
FIG. 19 is a series of images depicting the surface of de-bonded substrates (in Shimatzu) sample surfaces from tartaric acid containing NP200 adhesive that were exposed to 45 seconds of microwave radiation.

FIG. 19 shows debonded (in Shimatzu) sample surfaces from tartaric acid containing NP200 adhesive that were exposed to 45 seconds of microwave radiation. Now even 1.25% tartaric acid cause lot of melting, while control NP200 is not melted. Adhesive layer is completely melted from 3.75% and 5% tartaric acid containing NP200 samples, while their bond strengths were zero (separated in microwave oven).

Figure 20:
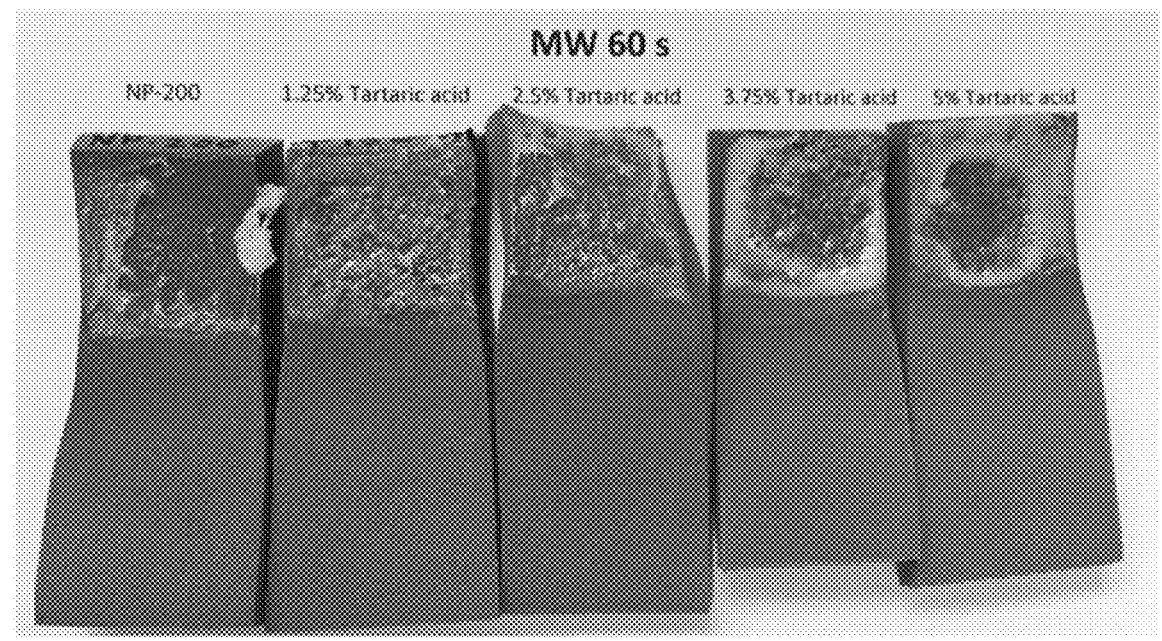
FIG. 20 is a series of images depicting the surface of de-bonded substrates (in Shimatzu) sample surfaces from tartaric acid containing NP200 adhesive bonds that were exposed to 60 seconds of microwave radiation.

FIG. 20 shows debonded (in Shimatzu) sample surfaces from tartaric acid containing NP200 adhesive bonds that were exposed to 60 seconds of microwave radiation. All samples including control NP 200 is melted during 60 seconds of microwave exposure. Both 1.25% and 2.5% tartaric acid containing samples are completely melted with lot of bubbles. Both 3.75% and 5% tartaric acid show charring of bonded area suggesting degradation of samples due to over-heating.

FIGS. 18-20 clearly show accelerated heating of bond in the presence of tartaric acid, causing degradation and foaming. The glucaric acid concentration was examined and best debonding occurs in NP200 with glucaric acid concentration between 5 and 7%.

Figure 21:
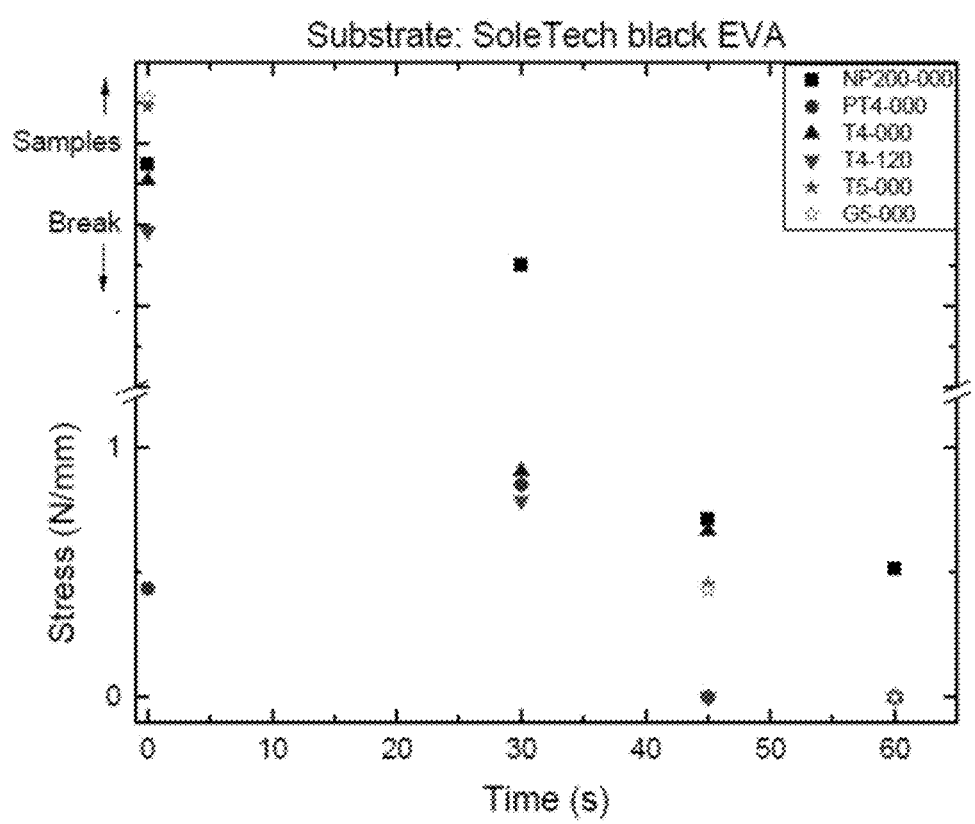
FIG. 21 is a graph of the 180° peel strength as a function of the microwave exposure time (seconds) for upper/bottoms made with modified NP200 adhesives. NP200 refers to nonmodified "NANPAO" cement, T4-000 refers to 4% tartaric acid modified NP200 used fresh, T5-000 refers to 5% tartaric acid modified NP200 used fresh, T4-120 refers to 4% tartaric acid modified NP200 used after 120 minutes of preparation, G5-000 refers to 5% glucaric acid modified NP200 used fresh, and PT4-000 refers to 4% tartaric acid modified primer with NP200.

Comparison of 5% Glucaric Acid and 4/5% Tartaric Acid in "NANPAO" Cement and or Primer FIG. 21 shows peel strength (180°) of upper/bottoms made with modified NP200 adhesives as a function of microwave exposure time. Here NP200 refers to nonmodified "NANPAO" cement, T4-000 refers to 4% tartaric acid modified NP200 used fresh, T5-000 refers to 5% tartaric acid modified NP200 used fresh, T4-120 refers to 4% tartaric acid modified NP200 used after 120 minutes of preparation, G5-000 refers to 5% glucaric acid modified NP200 used fresh, and PT4-000 refers to 4% tartaric acid modified primer with NP200. Both tartaric acid and glucaric acid fastens delamination with bonds made using non-hardened NP200 cement.

Viscosity of Additive Doped NP200 ("NANPAO") Formulations

Figure 22A:
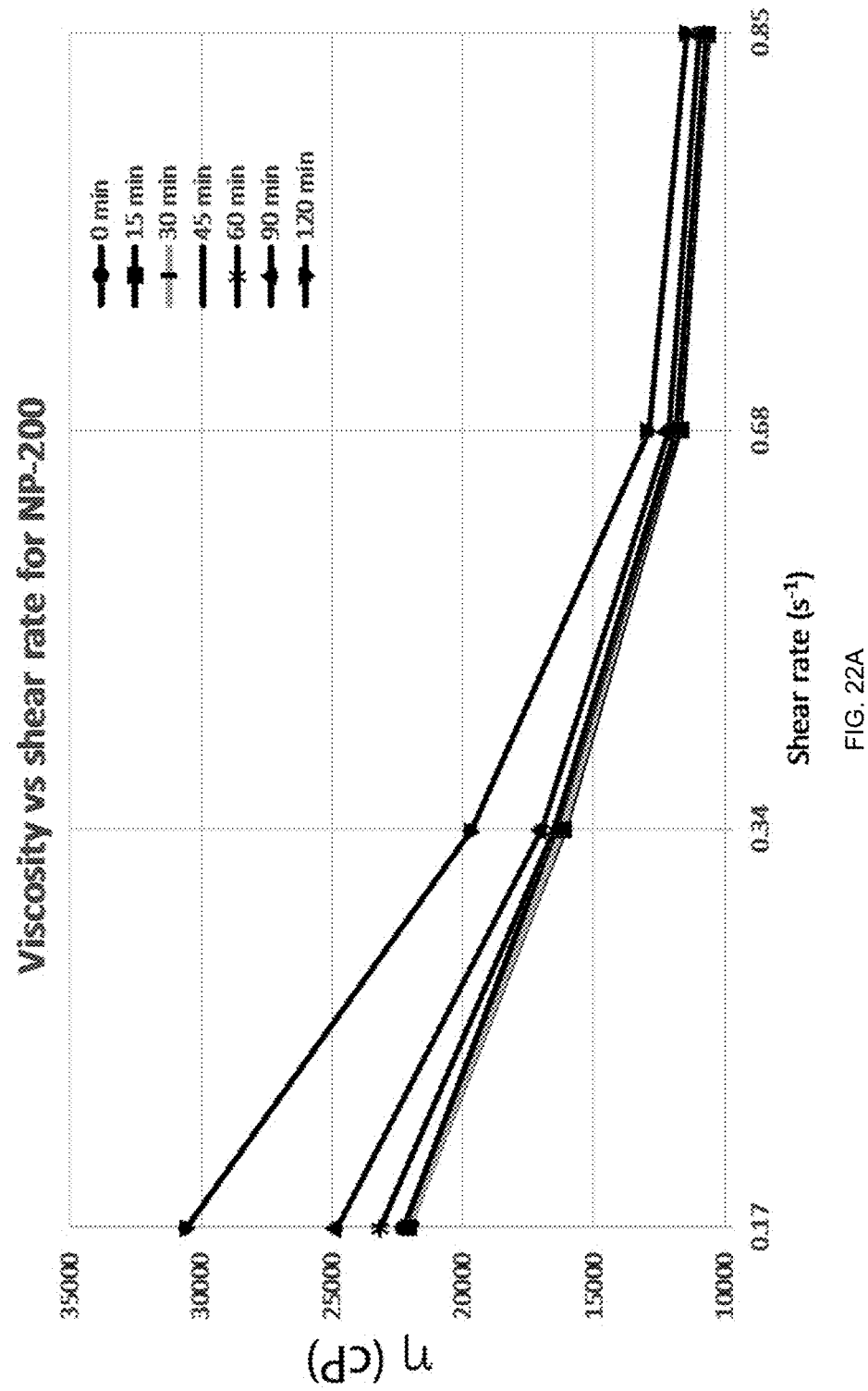
FIGS. 22A-22B are graphs of the viscosity versus shear rate for unmodified NP-200 adhesive (FIG. 22A) and for NP-200 adhesive modified with 5% glucaric acid (FIG. 22B) as a function of time.
Figure 22B:
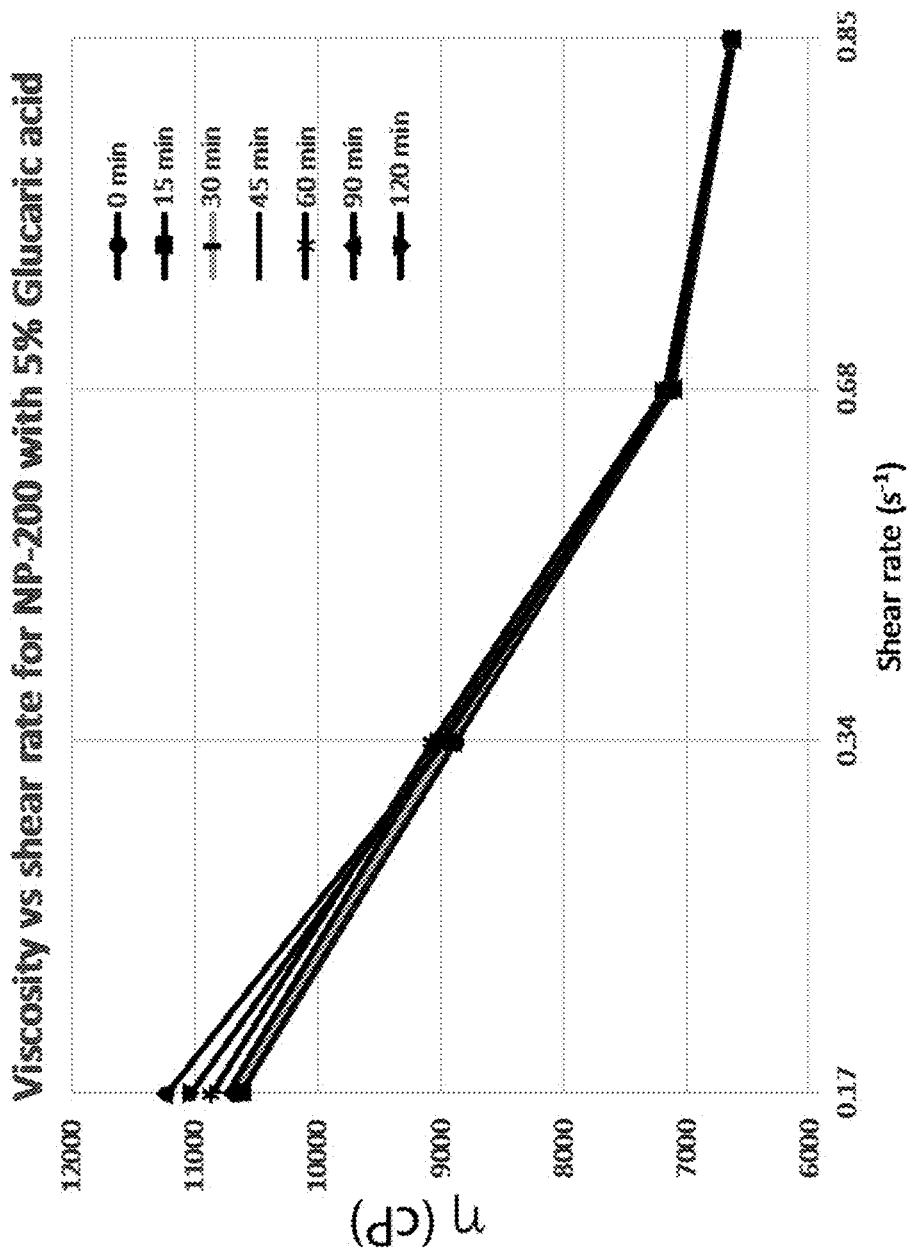

Viscosity of various formulations was characterized containing varied amounts of tartaric and glucaric acid and also monitored viscosity change as a function of ageing time in open air (some drying happens). A Brookfield viscometer was used in the temperature range of 19 and 20° C. and with shear rates of (0.5, 1.0, 2.0 and 2.5 rpm corresponding to) 0.17, 0.34, 0.68 and 0.85 $s_{-1}$. The viscosity data of control NP200 and 5% glucaric acid containing NP200 as a function of time is shown in FIGS. 22A-22B. Small changes in viscosity with time is attributed to partial evaporation of water.

Figure 23A:
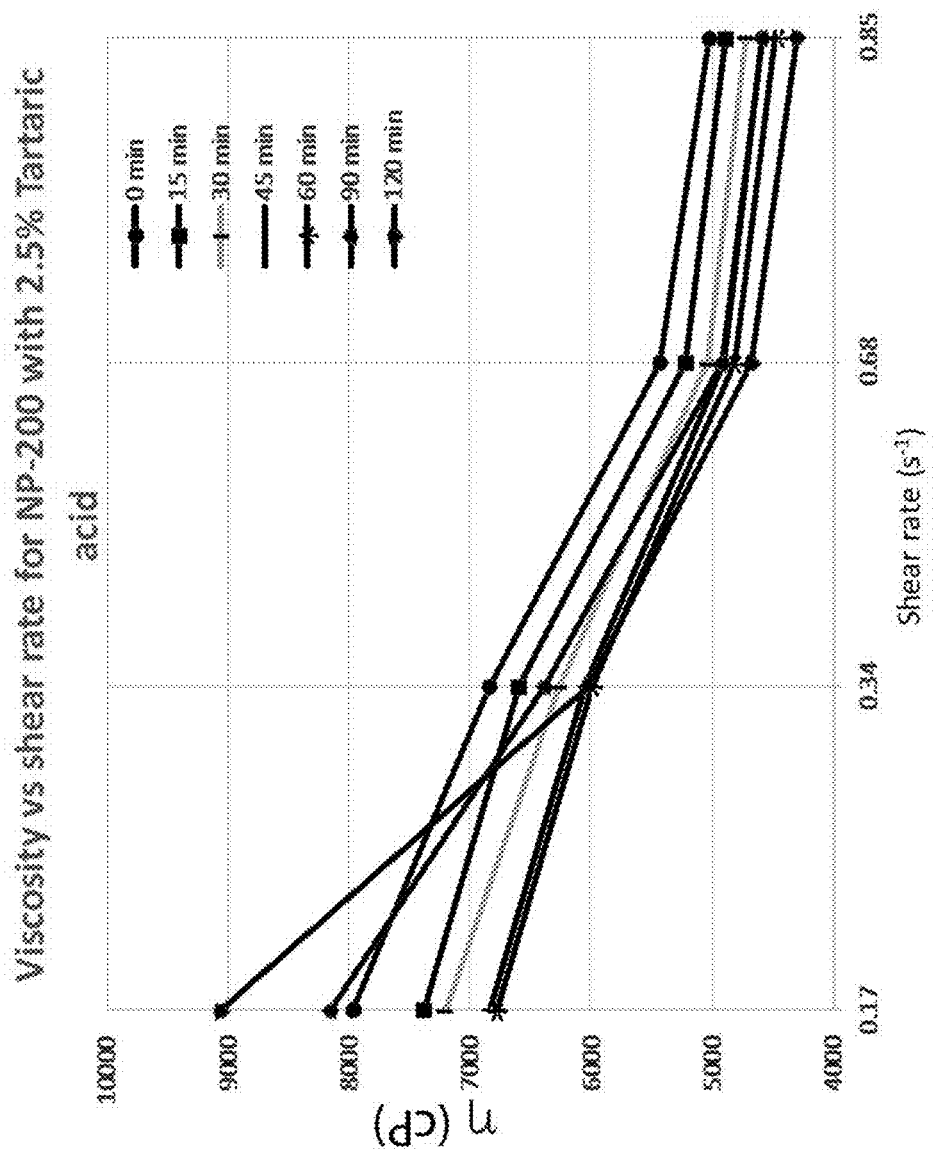
FIGS. 23A-23B are graphs of the viscosity versus shear rate for NP-200 adhesive modified with 2.5% tartaric acid (FIG. 23A) and for NP-200 adhesive modified with 5% tartaric acid acid (FIG. 23B) as a function of time.
Figure 23B:
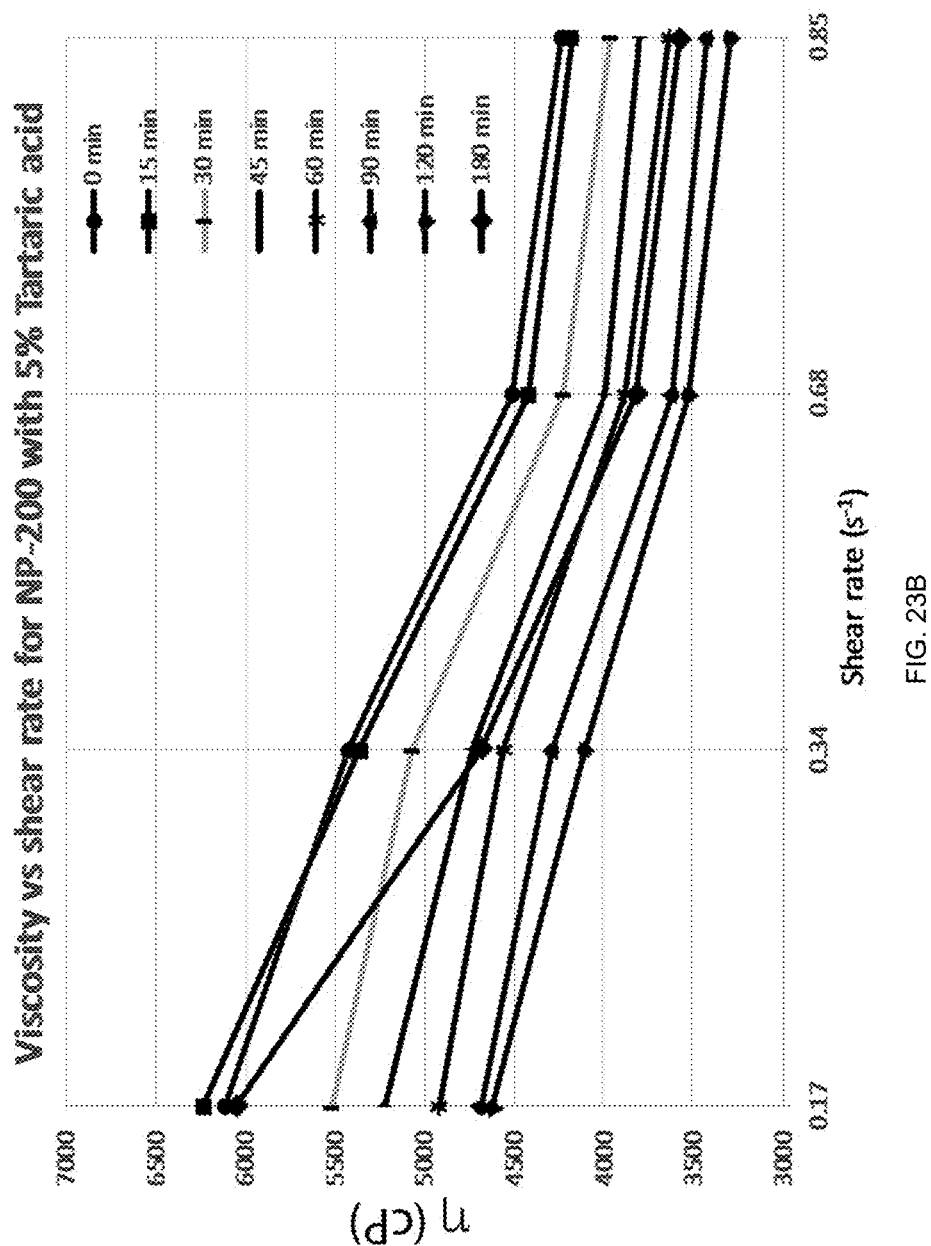

The viscosity data of 2.5% and 5% tartaric acid containing NP200 formulations as a function of time is shown in FIGS. 23A-23B.

Figure 24A:
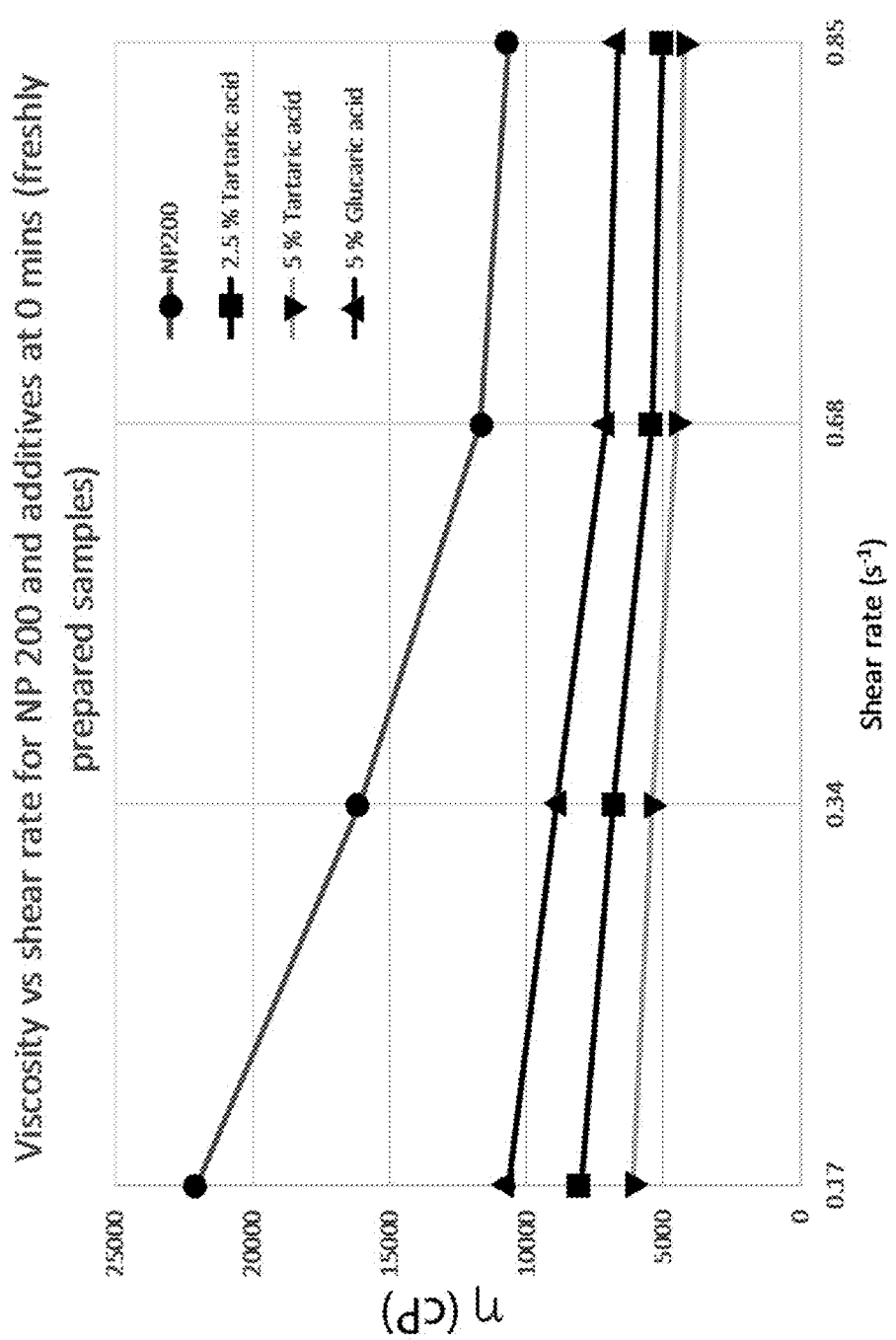
FIGS. 24A-24B are graphs of the viscosity versus shear rate for unmodified NP-200 adhesive and modified NP-200 adhesives at no aging (0 time, FIG. 24A) and after aging for 120 minutes (FIG. 24B).
Figure 24B:
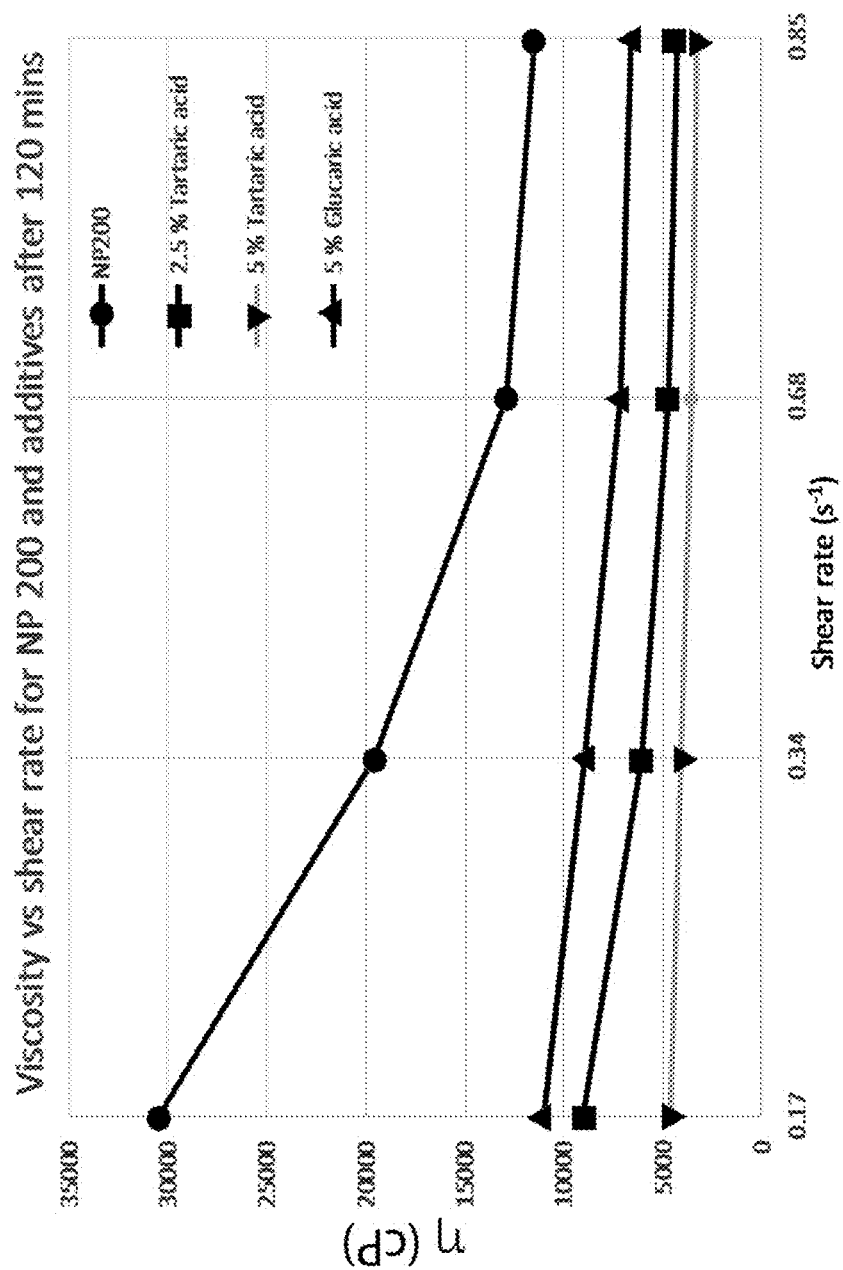

FIGS. 24A-24B show the effect of additives and ageing time on the viscosity of NP200 (not-hardened). Surprisingly viscosity goes down upon adding both tartaric and glucaric acids. This could explain, why the technician (Kate, name please) felt smoother, when he was applying glucaric acid containing NP200 while making shoes at APCC. Even more surprising is the fact that viscosity seems to be decreasing with increase in tartaric acid content.

Viscosity as a Function of Shear Rate

Figure 25A:
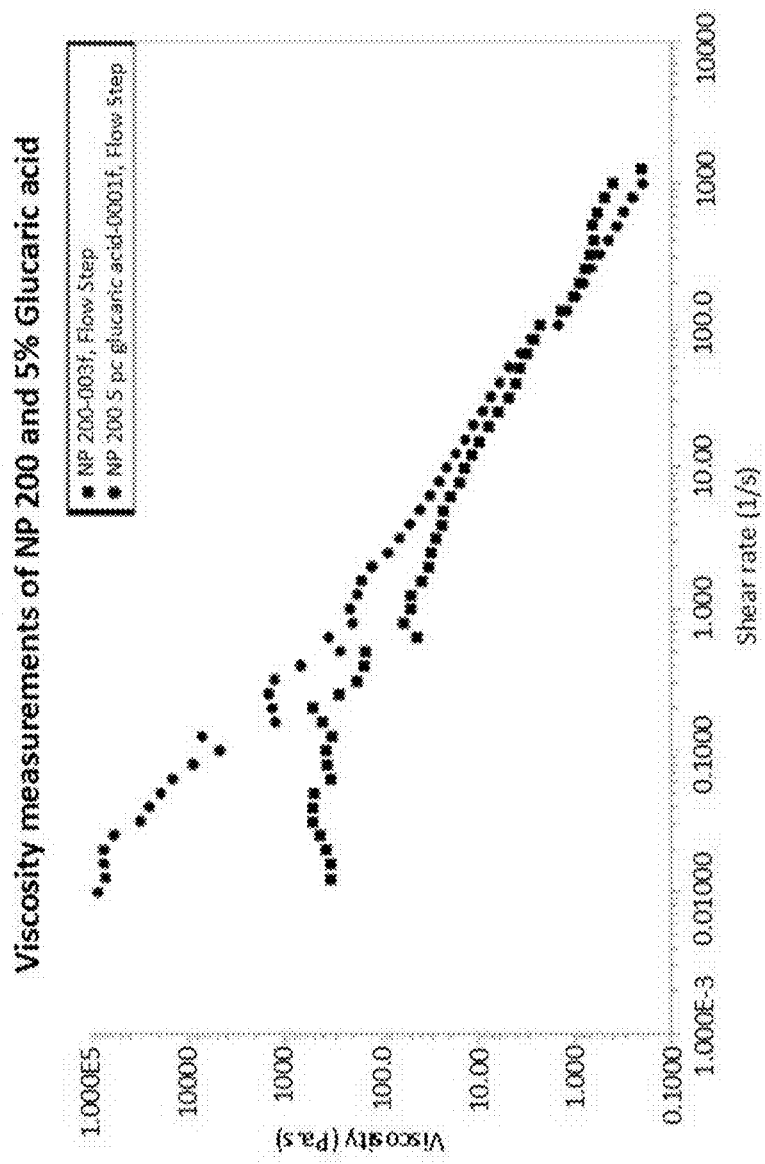
FIGS. 25A-25B are graphs of the viscosity versus shear rate for unmodified NP-200 adhesive and modified NP-200 adhesives modified with 5% glucaric acid (FIG. 25A) and with 4% tartaric acid (FIG. 25B).
Figure 25B:
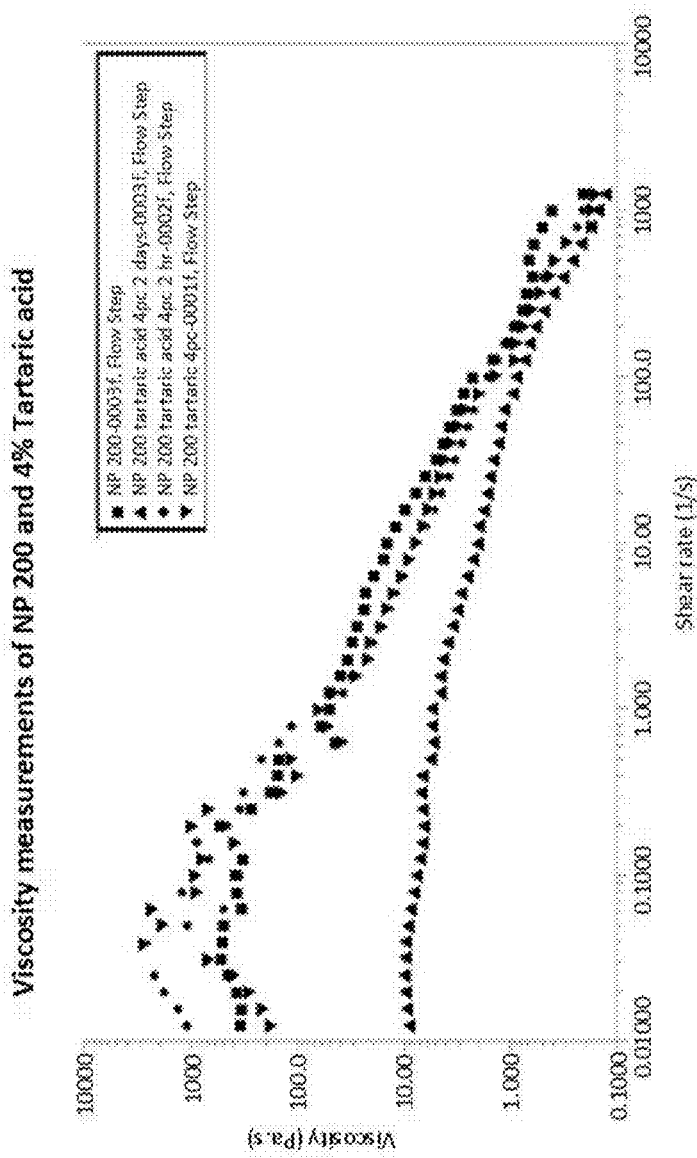

Viscosity was also measured as a function of shear rate (0.01 to 1000 $sec_{-1}$). The rheological data is shown in for both glucaric acid (FIG. 25A) and tartaric acid (FIG. 25B) modified NP200 adhesives. The data suggests, the influence of tartaric acid on the viscosity of NP200 is small at shear rates between 1 to 1000 $sec_{-1}$. However, the viscosity of NP 200 is drastically increased at lower shear rates (<1 $sec_{-1}$) in the presence of glucaric acid. The viscosity of glucaric acid modified adhesives will be optimized to that of control adhesives for "GRECO" (hardened) adhesives during Work Order 4 (Phase II).

Field Test Results

Field test results were carried out by bonding and debonding using modified (5% glucaric acid) NP2000. TPU/TPU and EVA/polyester based shoes were fabricated, and bond strengths of the modified adhesives were compared to control samples with unmodified adhesive. The bonds strengths of the modified adhesives were higher than the control samples (>20% better peel strength). TPU/TPU shoe was directly exposes to 1.4 cubic foot (ft$^3$) of microwave. Partial melting of TPU bottom was observed at about 57 seconds. The shoe was removed. The upper and bottom for shoes made with 5% glucaric acid based NP200 adhesive were able to be separated. The corresponding control shoe (using unmodified adhesive) could not be readily separated.

TABLE 5

Large Area EVA/polyester laminates—microwave in water

| Sample | Width (mm) | Height (mm) | MW Exposure Time (s) | Water 90° C. (Y/N) | Force (N) | Stress (N/cm$^2$) |
|---|---|---|---|---|---|---|
| NP200-C1 | 24.0 | 120.0 | 0 | N | 159 | 5.5 |
| NP200-C2 | 19 | 120 | 900 | Y(@RT) | Delaminated | |
| NP200-C3 | 25 | 120 | 420 | Y(@RT) | Delaminated | |

Materials

D-Glucaric acid potassium salt (D-Saccharic acid potassium salt) (CAS: 576-42-1) from Aldrich or similar vendor.

DL-Tartaric acid (CAS: 133-37-9) from Aldrich or similar vendor.

Water Based UV Primer 6263 from "GRECO".

Water-based Primer 6001 L from "GRECO".

Hardener 368 from "GRECO".

Water-based PU adhesive GE-01 from "GRECO".

TABLE 6

Formulations of GE-01 with hardener-368 and additives
(Glucaric acid and Tartaric acid)

| Formulations | GE-01 (grams) | 4% Hardener-368 (grams) | 5% Glucaric acid (grams) | 4% Tartaric acid (grams) |
|---|---|---|---|---|
| Glucaric acid based cement | 30 | 0.63 | 0.79 | — |
| Tartaric acid based cement | 30 | 0.63 | | 0.63 |
| Control Cement | 30 | 0.63 | | |

TABLE 7

Physical Characteristics

| | GE01 + 4% 368 | GE01 + 4% 368 + 5% glucaric acid | GE01 + 4% 368 + 5% glucaric acid + 6% water | GE01 + 4% 368 + 4% tartaric acid | GE01 + 4% 368 + 4% tartaric acid + 4-6% water |
|---|---|---|---|---|---|
| pH | 6.0-6.5 | 4.0-4.5 | | 2.5-3.0 | |
| Zeta potential (mV) | −43 ± 1 | −40 ± 2 | | −24 ± 2 | |
| Viscosity at a shear rate of 1/sec (Pa · s) | 31 ± 4 | 360 ± 30 | 77 ± 4 | 180 ± 10 | 55 ± 10 |
| Viscosity at a shear rate of 10/sec (Pa · s) | 9 ± 2 | 50 ± 5 | 18 ± 2 | 33 ± 2 | 9 ± 1 |
| Viscosity at a shear rate of 100/sec (Pa · s) | 1.6 ± 0.2 | 12.6 ± 2 | 2.1 ± 0.2 | 15 ± 2 | 1.7 ± 0.2 |

Shelf-Life

To obtain improved performance from the modified additive hardened GE01 cement, it was used within 4 hours after mixing unless otherwise indicated. Preferred window is 0 to 2 h.

Gel formation for tartaric acid formulations occurred within 24 h and for glucaric acid formulations within 3 days after mixing.

Procedure for Preparation of Glucaric Acid/Hardener/Cement, Tartaric Acid/Hardener/Cement, Hardener/Cement Fluid Dispersions D-Glucaric Acid Potassium Salt or DL-Tartaric Acid additives were first individually ground to a fine powder using a mortar & pestle.

The appropriate amount of Hardener 368 (4% as shown in Table 6) was weighed into a "FLACKTEK" Max 10 Cup.

The appropriate amounts of additives (5% Glucaric acid or 4% tartaric acid as shown in Table 6) were weighed into the cup containing the hardener.

GE-01 was added (as shown in Table 6) and then the cup was sealed. The GE01 aqueous dispersion consist of ~50 Wt. % solids.

The contents in the cup were vortex mixed for 60 seconds using a "FISHER SCIENTIFIC" Vortex Mixer (Model 945404) operating at a setting of 10 (maximum scale).

The contents in the cup were speed-mixed using a "FLACKTEK" Speed-Mixer (Model DAC400 FVZ) operating at 1000 rpm for 240 sec. Caution must be taken to balance the cup(s) in the sample holder and the total weight of the system (holder+cup(s)+contents) must be between 250 grams to 400 grams to prevent damage to the SpeedMixer. Alternatively the contents were mixed in a ball mill for overnight to achieve similar fluid characteristics.

Each cup was removed and its contents rotated around the cup walls to "wash down" any material adhered to the cup walls and then vortex-mixed for 60 sec as before (step 5).

The cup and its contents were placed back into the holder and speed-mixed at 1000 rpm for 60 sec using a "FLACKTEK" Speed-Mixer (Model DAC400 FVZ) (similar to step 6).

The contents were then mixed with a glass stirring rod before use.

Procedure for Making Laminate Samples Using "GRECO" Adhesive System (GE-01/6001 L+368/Test Cement)

Cut desired substrates into 2.5 inch×1 inch size samples

Wash the samples in hot water

Wash the samples with isopropanol (IPA)

In case of TPU knitted fibers, the samples were washed with methyl ethyl ketone (MEK)

Preheat the substrates at 55° C. for 2 min

Apply water based UV primer 6263 to the entire area using a brush

Heat the UV primer applied substrates at 55° C. for 5 min

Treat the substrates in UV oven (365 nm) 0.7 mJ/cm$^2$

Use water based primer 6001L (96%) with hardener 368 (4%). Mixing conditions following steps 5 to 9 used for the dispersions above.

Apply 0.1 ml of the above mixture 6001 L+368 to 1 square inch area using glass slide Heat the primer applied substrates at 55° C. for 5 min Apply 0.1 ml water-based adhesive GE-01/Hardener 368/ glucaric or tartaric acid cement to 1 sq inch area using glass slide.

Heat the cement applied substrates at 55° C. for 5 min

Attach cement applied surfaces of two similar or dissimilar substrates with light pressure Remove excess liquid (on the sides) using a glass slide (cloth is fine)

Press in binder clips between glass slides for 20 min

Remove clips and glass slides, and set in carver press for 15 min at 500 psi

Leave in binder clips between glass slides overnight

All testing for mechanical properties are carried out after 24 h of making samples Testing Procedure The samples were exposed to Microwave irradiation of desired exposure time in a domestic microwave oven (2.4 GHz, 900 W)

The sample is secured in the "SHIMADZU" brand AG-IC 50 kN tensile tester (Load cell SFL-20kNAG) for bond strength measurement Lap shear test is performed at the speed of 100 mm/min Additional Details The viscosity of both glucaric acid and tartaric acid modified cements can be adjusted by adding 4-6% of water during mixing step. Adding 5% water into the mix reduced the viscosity to that of control and didn't adversely affect initial bond strength and microwave induced debonding performance.

Our extensive data suggests tartaric acid outperforming glucaric acid most of the times.

Tartaric acid is completely soluble in the adhesive formulations and in water, while glucaric acid is dispersed as micron sized (less than 25 microns long and few microns' diameter) rods in the cement.

It should be emphasized that the above-described aspects of the present disclosure are merely possible examples of implementations, and are set forth only for a clear understanding of the principles of the disclosure. Many variations and modifications may be made to the above-described aspects of the disclosure without departing substantially from the spirit and principles of the disclosure. All such modifications and variations are intended to be included herein within the scope of this disclosure.

The present disclosure will be better understood upon review of the following features, which should not be confused with the claims.

Feature 1. An adhesive comprising: a polymeric adhesive matrix, and a carboxylic acid or a salt thereof dispersed within the polymeric adhesive matrix; wherein the carboxylic acid or a salt thereof is present in an amount from about 1% to about 15% by weight based upon a total weight of the adhesive.

Feature 2. The adhesive according to feature 1, wherein the carboxylic acid or salt thereof is present in an amount from about 2.5% to about 5% by weight based upon the total weight of the adhesive.

Feature 3. The adhesive according to feature 1, wherein the carboxylic acid is glucaric acid, and wherein the glucaric acid or salt thereof is present in an amount from about 4.5% to about 8% by weight based upon the total weight of the adhesive.

Feature 4. The adhesive according to feature 1, wherein the carboxylic acid is tartaric acid, and wherein the tartaric acid or salt thereof is present in an amount from about 3.5% to about 5.5.% by weight based upon the total weight of the adhesive.

Feature 5. The adhesive according to feature 1 or feature 4, wherein the carboxylic acid is a sugar acid.

Feature 6. The adhesive according to any one of features 1, 4, and 5, wherein the carboxylic acid is a diprotic acid.

Feature 7. The adhesive according to any one of features 1 and 4-6, wherein the carboxylic acid comprises about 3 to 9 carbon atoms.

Feature 8. The adhesive according to any one of features 1-7, wherein the carboxylic acid or salt thereof thermally decomposes into substantially water and carbon dioxide.

Feature 9. The adhesive according to any one of features 1 and 4-8, wherein the carboxylic acid has a structure according to the following formula or a derivative thereof

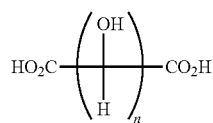

where n is an integer from 2 to 10.

Feature 10. The adhesive according to any one of features 1-9, wherein the carboxylic acid or salt thereof is substantially free of heavy metals.

Feature 11. The adhesive according to any one of features 1-10, wherein the carboxylic acid or salt thereof decomposes into substantially water and carbon dioxide when exposed to microwave radiation at a frequency of 2.4 GHz and power level of at least 900 W for a period of time of 1 minute or more.

Feature 12. The adhesive according to any one of features 1 and 4-11, wherein the carboxylic acid is selected from the group consisting of tartronic acid, tartaric acid, ribaric acid, and glucaric acid.

Feature 13. The adhesive according to any one of features 1-12, wherein the adhesive is a hotmelt adhesive, and the melting point of the hotmelt adhesive is at least 10° C. below the melting point of the carboxylic acid.

Feature 14. The adhesive according to any one of features 1-12, wherein the adhesive comprises at least 20% w/v of water.

Feature 15. The adhesive according to any one of features 1-14, wherein the polymeric adhesive matrix comprises at least one polymer selected from the group consisting of a polyurethane, a polychloroprene, a latex, a polystyrene, a polyamide, a polyolefin, a polyacrylate, and any combination thereof.

Feature 16. The adhesive according to any one of features 1-15, wherein the polymeric adhesive matrix comprises at least one polyurethane.

Feature 17. The adhesive according to any one of features 1-16, wherein the polymeric adhesive matrix comprises at least one polychloroprene.

Feature 18. The adhesive according to any one of features 1-17, wherein the polymeric adhesive matrix comprises at least one latex.

Feature 19. The adhesive according to any one of features 1-18, wherein the polymeric adhesive matrix comprises at least one polystyrene.

Feature 20. The adhesive according to features 19, wherein the at least one polystyrene comprises a polystyrene selected from the group consisting of poly(styrene-isoprene-styrene), poly(styrene-butadiene-styrene), and poly(styrene-ethylene-butene-styrene).

Feature 21. The adhesive according to any one of features 1-20, wherein the polymeric adhesive matrix comprises at least one polyamide.

Feature 22. The adhesive according to any one of features 1-21, wherein the polymeric adhesive matrix comprises at least one polyolefin.

Feature 23. The adhesive according to any one of features 1-22, wherein the polymeric adhesive matrix comprises at least one polyacrylate.

Feature 24. The adhesive according to any one of features 1-23, wherein the adhesive has a bond strength that is at least 80% of a reference bond strength for the otherwise same adhesive except without the carboxylic acid or a salt thereof when the adhesive and the adhesive without the carboxylic acid or salt are used to bond the same materials and are measured under the same conditions.

Feature 25. The adhesive according to any one of features 1-24, wherein the adhesive has a bond strength of about 9 N/cm² to about 35 N/cm².

Feature 26. The adhesive according to any one of features 1-25, wherein the adhesive has a bond strength of about 20 N/cm² to about 35 N/cm².

Feature 27. The adhesive according to any one of features 1-26, wherein, after the adhesive has been exposed to microwave radiation having a frequency of about 2.4 GHz and a power level of at least 900 W for a period of time of at least 60 seconds, the adhesive has a bond strength that is at least 60% less than a reference bond strength for the otherwise same adhesive except without the carboxylic acid or salt thereof, when exposed to about the same frequency of microwave radiation for about the same period of time, and when used to bond the same materials and measured under the same conditions.

Feature 28. The adhesive according to features 27, wherein the bond strength is less than 30% of the reference bond strength.

Feature 29. The adhesive according to any one of features 1-28, wherein increasing a temperature of the adhesive to a temperature at or above a decomposition temperature of the carboxylic acid or salt thereof causes the adhesive to foam.

Feature 30. The adhesive according to any one of features 1-29, wherein, after the adhesive has been exposed to microwave radiation having a frequency of about 2.4 GHz and a power level of at least 900 W for a period of time of at least 60 seconds, the adhesive has a bond strength of about 10 N/cm² or less.

Feature 31. The adhesive according to any one of features 1-30, wherein after the adhesive has been exposed to microwave radiation having a frequency of about 2.4 GHz and a power level of at least 900 W for a period of time of at least 60 seconds, the adhesive has a bond strength of about 1 N/cm² or less.

Feature 32. The adhesive according to any one of features 24-31, wherein the bond strength is measured by bonding a first material to a second material, and measuring the bond strength using a single lap shear test with a bonding area of at least 1 in².

Feature 33. The adhesive according to any one of features 24-31, wherein the bond strength is measured by bonding a first material to a second material, and measuring the bond strength using a T-peel test with a bonding area of at least 1 in².

Feature 34. The adhesive according to feature 32 or feature 33, wherein one or both of the first material and the second material are selected from the group consisting of a thermoplastic polyurethane, a thermoplastic polyurethane knit fiber, a thermoplastic polyurethane foam, and an ethylene-vinyl acetate foam.

Feature 35. An article of footwear or portion thereof comprising a first component, a second component, and an adhesive according to any one of features 1-34 adhesively bonding the first component to the second component.

Feature 36. The article of footwear or portion thereof according to feature 35, wherein the first component, the second component, or both comprise a material selected from the group consisting of a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a textile, a fabric, and a combination thereof.

Feature 37. The article of footwear or portion thereof according to feature 35, wherein the first component and the second component both comprise a thermoplastic polyurethane.

Feature 38. The article of footwear or portion thereof according to any one of features 35-37, wherein the first component, the second component, or both comprise a component selected from the group consisting of an upper, an insole, an outsole, a midsole, a strobel, a vamp, a tip, a foxing, a tongue, an eyestay, and a combination thereof.

Feature 39. The article of footwear or portion thereof according to any one of features 35-38, wherein the first component is an upper and the second component is an outsole.

Feature 40. The article of footwear or portion thereof according to feature 39, wherein the upper is a lasted upper.

Feature 41. The article of footwear or portion thereof according to feature 39 or feature 40, wherein the upper is a formed upper.

Feature 42. The article of footwear or portion thereof according to any one of features 35-38, wherein the first component is an insole and the second component is a last.

Feature 43. The article of footwear or portion thereof according to any one of features 35-38, wherein the first component is an upper and the second component is an insole.

Feature 44. The article of footwear or portion thereof according to any one of features 35-38, wherein the first component is a midsole and the second component is an outsole.

Feature 45. The article of footwear or portion thereof according to any one of features 35-44, wherein the article of footwear is selected from the group consisting of a shoe, a boot, and a sandal.

Feature 46. The article of footwear or portion thereof according to any one of features 35-45, wherein the article of footwear is a shoe.

Feature 47. The article of footwear or portion thereof according to feature 46, wherein the shoe is selected from the group consisting of an athletic shoe, a tennis shoe, a cross-trainer shoe, a children's shoe, a dress shoe, and a casual shoe.

Feature 48. The article of footwear or portion thereof according to feature 46 or feature 47, wherein the shoe is a cleated shoe.

Feature 49. A composition comprising at least one polymer, a resin, a carboxylic acid or a salt thereof, and a suitable solvent.

Feature 50. The composition according to feature 49, wherein the carboxylic acid or salt thereof is present in an amount from about 1% to about 15% by weight based upon a dry weight of the composition.

Feature 51. The composition according to feature 49 or feature 50, wherein the carboxylic acid is glucaric acid, and wherein the glucaric acid or salt thereof is present in an amount from about 4.5% to about 8% by weight based upon the dry weight of the composition.

Feature 52. The composition according to feature 49 or feature 50, wherein the carboxylic acid is tartaric acid, and wherein the tartaric acid or salt thereof is present in an amount from about 3.5% to about 5.5% by weight based upon the dry weight of the adhesive.

Feature 53. The composition according to feature 49 or feature 50, wherein the carboxylic acid is a sugar acid.

Feature 54. The composition according to any one of features 49, 50, and 53, wherein the carboxylic acid is a diprotic acid.

Feature 55. The composition according to any one of features 49, 50, 53, and 54, wherein the carboxylic acid comprises about 3 to 9 carbon atoms.

Feature 56. The composition according to any one of features 49, 50, and 53-55, wherein the carboxylic acid has a structure according to the following formula or a derivative thereof $$HO_2C-\left(\begin{array}{c}OH\\|\\|\\H\end{array}\right)_n-CO_2H$$

where n is an integer from 2 to 10.

Feature 57. The composition according to any one of features 49, 50, and 53-56, wherein the carboxylic acid or salt thereof is substantially free of halogen atoms.

Feature 58. The composition according to any one of features 49, 50, and 53-57, wherein the carboxylic acid or salt thereof is substantially free of heavy metals.

Feature 59. The composition according to any one of features 49, 50, and 53-56, wherein the carboxylic acid or salt thereof decomposes into substantially water and carbon dioxide when exposed to microwave radiation at a frequency of 2.4 GHz and power level of at least 900 W for a period of time Feature 60. The composition according to any one of features 49, 50, and 53-57, wherein the carboxylic acid is selected from the group consisting of tartronic acid, tartaric acid, ribaric acid, and glucaric acid.

Feature 61. The composition according to any one of features 49-60, wherein the resin is selected from the group consisting of a colophony resin, a hydrocarbon resin, an alkyl phenolic resin, a terpene phenolic resin, a coumarone-indene resin, and a combination thereof.

Feature 62. The composition according to any one of features 49-61, wherein the resin is present in an amount from about 0.1% to about 10% by weight based on a dry weight of the composition.

Feature 63. The composition according to any one of features 49-62, wherein the solvent is selected from the group consisting of water, acetone, ethanol, 2-propanol, ethyl acetate, isopropyl acetate, methanol, methyl ethyl ketone, 1-butanol, t-butanol, and mixtures thereof.

Feature 64. The composition according to any one of features 49-63, wherein the solvent consists essentially of water.

Feature 65. The composition according to any one of features 49-64, wherein the solvent is present in an amount from about 50% to about 500% by weight based upon a dry weight of the composition.

Feature 66. The composition according to any one of features 49-65, wherein the at least one polymer comprises a polymer selected from the group consisting of a latex, a polystyrene, a polyamide, a polyolefin, a polyacrylate, and a combination thereof.

Feature 67. The composition according to any one of features 49-66, wherein the at least one polymer comprises a polyurethane.

Feature 68. The composition according to any one of features 49-66, wherein the at least one polymer comprises a polychloroprene.

Feature 69. The composition according to any one of features 49-66, wherein the at least one polymer comprises a latex.

Feature 70. The composition according to any one of features 49-66, wherein the at least one polymer comprises a polystyrene.

Feature 71. The composition according to feature 70, wherein the polystyrene comprises a polystyrene selected from the group consisting of poly(styrene-isoprene-styrene), poly(styrene-butadiene-styrene), and poly(styrene-ethylene-butene-styrene).

Feature 72. The composition according to any one of features 49-66, wherein the at least one polymer comprises a polyamide.

Feature 73. The composition according to any one of features 49-66, wherein the at least one polymer comprises a polyolefin.

Feature 74. The composition according to any one of features 49-66, wherein the at least one polymer comprises a polyacrylate.

Feature 75. A method of adhesively bonding a first component and a second component, the method comprising applying a composition according to any one of features 49-74 to one or both of a first surface of the first component and a second surface of the second component, and contacting the first surface and the second surface to adhesively bond the first component to the second component.

Feature 76. The method according to feature 75, wherein the first component, the second component, or both comprise a material selected from the group consisting of a crepe rubber, a natural leather, a synthetic leather, a polyurethane, a thermoplastic polyurethane, a thermoplastic rubber, a styrene butadiene rubber, a vinyl acetate, a polyamide, a polyvinyl chloride, a polystyrene, an acrylonitrile butadiene styrene, a textile, a fabric, and a combination thereof.

Feature 77. The method according to feature 75 or feature 76, wherein the first component and the second component both comprise a thermoplastic polyurethane.

Feature 78. The method according to any one of features 75-77, wherein the first component, the second component, or both comprise a component selected from the group consisting of an upper, an insole, an outsole, a midsole, a strobel, a vamp, a tip, a foxing, a tongue, an eyestay, and a combination thereof.

Feature 79. The method according to any one of features 75-78, wherein the first component is an upper and the second component is an outsole.

Feature 80. The method according to feature 79, wherein the upper is a lasted upper.

Feature 81. The method according to feature 79 or feature 80, wherein the upper is a formed upper.

Feature 82. The method according to any one of features 75-78, wherein the first component is an insole and the second component is a last.

Feature 83. The method according to any one of features 75-78, wherein the first component is an upper and the second component is an insole.

Feature 84. The method according to any one of features 75-78, wherein the first component is a midsole and the second component is an outsole.

Feature 85. The method according to any one of features 75-84, comprising applying the composition to both the first surface and the second surface.

Feature 86. The method according to any one of features 75-85, further comprising treating one or both of the first surface and the second surface prior to applying the composition.

Feature 87. The method according to feature 86, wherein the treating step comprises a surface treatment selected from the group consisting of a physical treatment, a chemical treatment, a primer treatment, a solvent treatment, and a combination thereof.

Feature 88. The method according to feature 87, wherein surface treatment comprises a physical treatment, and wherein the physical treatment comprises treating a surface with an abrasive to increase a surface roughness.

Feature 89. The method according to feature 87, wherein the surface treatment comprises a chemical treatment, and wherein the chemical treatment comprises etching a surface with acid.

Feature 90. The method according to feature 87, wherein the surface treatment comprises a primer treatment, and wherein the primer treatment comprises treating a surface with a primer solution.

Feature 91. The method according to feature 87, wherein the surface treatment comprises a solvent treatment, and wherein the solvent treatment comprises contacting a surface with a solvent to remove contaminants from the surface.

Feature 92. The method according to any one of features 75-91, the method further comprising applying pressure to the first component and the second component for a period of time to adhesively bond the first component and the second component.

Feature 93. The method according to feature 92, wherein the pressure is about 300 psi to about 800 psi and the period of time is about 10 minutes to about 30 minutes.

Feature 94. The method according to any one of features 75-93, further comprising applying one or both of heat and ultraviolet radiation to adhesively bond the first component and the second component.

Feature 95. The method according to any one of features 75-94, wherein applying the composition to one or both of the first surface and the second surface comprises applying the composition using an automatic sprayer.

Feature 96. A method of debonding a first component and a second component adhesively bonded by an adhesive according to any one of features 1-34, the method comprising increasing a temperature of the adhesive for a period of time sufficient to reduce a bond strength of the adhesive by at least 50% as compared to a bond strength of the adhesive prior to increasing its temperature.

Feature 97. The method according to feature 96, wherein the step of increasing the temperature of the adhesive comprises treating the adhesive with microwave radiation for a period of time to reduce an adhesive strength of the adhesive.

Feature 98. The method according to feature 96 or feature 97, wherein the increasing the temperature of the adhesive causes foaming of the adhesive.

Feature 99. A method of debonding an article of footwear or portion thereof, wherein the article of footwear or portion thereof comprises a first component, a second component, and an adhesive according to any one of features 1-34 adhesively bonding the first component to the second component; wherein the method comprises treating the adhesive with microwave radiation for a period of time to reduce an adhesive strength of the adhesive.

Feature 100. The method according to feature 98 or feature 99, wherein the microwave radiation has a frequency of about 2 GHz to about 3 GHz.

Feature 101. The method according to any one of features 98-100, wherein the microwave radiation has a power level of about 500 W to about 1500 W.

Feature 102. The method according to any one of features 98-101, wherein the period of time is effective to reduce the adhesive strength by at least 70% as compared to the adhesive strength prior to treating the adhesive with the microwave radiation.

Feature 103. The method according to any one of features 98-102, wherein the period of time is effective to reduce the adhesive strength to about 10 N/cm$^2$ or less.

Feature 104. The method according to any one of features 98-103, wherein the period of time is about 30 second to about 120 seconds.

Feature 105. The method according to any one of features 98-104, wherein the frequency, power and duration of the microwave radiation is sufficient to produce foaming of the adhesive.

Feature 106. The adhesive of any one of features 1-34, wherein the polymeric adhesive matrix includes at least one polymer selected from a polyurethane, a polychloroprene, a latex, a polystyrene, a polyamide, a polyolefin, a polyacrylate, a polyester, a polyether, a copolymer thereof, and any combination thereof.

Feature 107. The adhesive of feature 106, wherein the polystyrene copolymer is a styrene block copolymer.

Feature 108. The adhesive of feature 3, wherein the styrene block copolymer includes a styrene isoprene styrene (SIS) block copolymer, a styrene butadiene styrene (SBS) block copolymer, a styrene ethylene butadiene styrene (SEBS) copolymer, a styrene ethylene propylene (SEP) block copolymer, or any combination thereof.

Feature 109. The adhesive of feature 106 or feature 107, wherein the polymeric adhesive matrix includes at least one thermoplastic polymer selected from a thermoplastic polyurethane, a thermoplastic polyamide, a thermoplastic polyolefin, a thermoplastic polyester, a thermoplastic polyether, a thermoplastic copolymer thereof, and any combination thereof.

Feature 110. The adhesive of feature 107, wherein the polymeric adhesive matrix includes the polyurethane.

Feature 111. The adhesive of feature 110, wherein the polymeric adhesive matrix includes the thermoplastic polyurethane.

Feature 112. The adhesive of feature 107, wherein the polymeric adhesive matrix includes the polyolefin.

Feature 113. The adhesive of feature 113, wherein the polyolefin is selected from a polyethylene, a polypropylene, a copolymer thereof, and any combination thereof.

Feature 114. The adhesive of feature 113, wherein the polyolefin is an ethylene copolymer.

Feature 115. The adhesive of feature 110, wherein the polymeric adhesive matrix includes the thermoplastic polyolefin.

Feature 116. The adhesive of feature 115, wherein the thermoplastic polyolefin is selected from a thermoplastic polyethylene, a thermoplastic polypropylene, a thermoplastic copolymer thereof, and any combination thereof.

Feature 117. The adhesive of feature 115, wherein the thermoplastic polyolefin includes a thermoplastic ethylene copolymer.

Feature 118. The adhesive of feature 117, wherein the thermoplastic ethylene copolymer is ethylene vinyl acetate (EVA).

Feature 119. The adhesive of feature 110, wherein the at least one thermoplastic polymer is a polymer or copolymer including a plurality of functional groups in its chemical structure, wherein the plurality of functional groups are selected from hydroxyl groups, carboxyl groups, amine groups, amide groups, urethane groups, and combinations thereof.

Feature 120. The adhesive of feature 110, wherein the at least one thermoplastic polymer has a melting point from about 80 degrees C. to about 180 degrees C.

Feature 121. The adhesive of any of features 106 to 120, wherein the polymeric adhesive matrix is an elastomeric polymer adhesive matrix.

Feature 122. The adhesive of feature 121, wherein the adhesive has an elongation of at least 200%.

We claim:
1. An adhesive comprising:
a polymeric adhesive matrix; and
a carboxylic acid or a salt thereof dispersed within the polymeric adhesive;

wherein the carboxylic acid has the structure

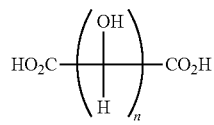

where n is 2, 3 or 4;
the carboxylic acid or a salt thereof is present in an amount greater than 2.5% to about 15% by weight based upon a total weight of the adhesive; and
wherein after the adhesive has been cured and then exposed to microwave radiation having a frequency of about 2.4 GHz and a power level of at least 900 W for a period of time of at least 60 seconds, the adhesive has a bond strength that is less than 30% of a reference bond strength for the otherwise same adhesive except without the carboxylic acid or salt thereof, when exposed to about the same frequency of microwave radiation for about the same period of time, and when used to bond the same materials and measured under the same conditions.

2. The adhesive of claim 1, wherein after the adhesive has been exposed to microwave radiation having a frequency of about 2.4 GHz and a power level of at least 900 W for a period of time of at least 60 seconds, the adhesive has a bond strength that is at least 60% less than a reference bond strength for the otherwise same adhesive except without the carboxylic acid or salt thereof, when exposed to about the same frequency of microwave radiation for about the same period of time, and when used to bond the same materials and measured under the same conditions.

3. The adhesive of claim 1, wherein, after the adhesive has been exposed to microwave radiation having a frequency of about 2.4 GHz and a power level of at least 900 W for a period of time of at least 60 seconds, the adhesive has a bond strength of about 10 N/cm² or less.

4. The adhesive of claim 1, wherein after the adhesive has been exposed to microwave radiation having a frequency of about 2.4 GHz and a power level of at least 900 W for a period of time of at least 60 seconds, the adhesive has a bond strength of about 1 N/cm² or less.

5. The adhesive of claim 1, wherein the adhesive has a bond strength of about 9 N/cm² to about 35 N/cm².

6. The adhesive of claim 1, wherein the adhesive has a bond strength of about 20 N/cm² to about 35 N/cm².

7. The adhesive of claim 1, wherein the carboxylic acid or salt thereof is present in an amount from about 2.5% to about 5% by weight based upon the total weight of the adhesive.

8. The adhesive of claim 1, wherein the carboxylic acid is glucaric acid, and wherein the glucaric acid or salt thereof is present in an amount from about 4.5% to about 8% by weight based upon the total weight of the adhesive.

9. The adhesive of claim 1, wherein the carboxylic acid is tartaric acid, and wherein the tartaric acid or salt thereof is present in an amount from about 3.5% to about 5.5% by weight based upon the total weight of the adhesive.

10. The adhesive of claim 1, wherein the polymeric adhesive matrix comprises at least one polymer selected from a group consisting of a polyurethane, a polychloroprene, a latex, a polystyrene, a polyamide, a polyolefin, a polyacrylate, and any combination thereof.

11. The adhesive of claim 1, wherein the polymeric adhesive matrix includes at least one thermoplastic polymer selected from a thermoplastic polyurethane, a thermoplastic polyamide, a thermoplastic polyolefin, a thermoplastic polyester, a thermoplastic polyether, a thermoplastic copolymer thereof, and any combination thereof.

12. The adhesive of claim 1, wherein the polymeric adhesive matrix includes the polyolefin.

13. The adhesive of claim 12, wherein the polyolefin is selected from a polyethylene, a polypropylene, a copolymer thereof, and any combination thereof.

14. The adhesive of claim 12, wherein the polyolefin is an ethylene copolymer.

15. The adhesive of claim 1, wherein the polymeric adhesive matrix includes the thermoplastic polyolefin.

16. The adhesive of claim 15, wherein the thermoplastic polyolefin is selected from a thermoplastic polyethylene, a thermoplastic polypropylene, a thermoplastic copolymer thereof, and any combination thereof.

17. The adhesive of claim 15, wherein the thermoplastic polyolefin includes a thermoplastic ethylene copolymer.

18. The adhesive of claim 17, wherein the thermoplastic ethylene copolymer is ethylene vinyl acetate (EVA).

19. The adhesive of claim 1, wherein the adhesive is a shoe adhesive for adhering two components of an article of footwear.

* * * * *